Oct. 13, 1942.   E. H. DREHER   2,298,353
CALCULATING MACHINE
Filed March 18, 1936   46 Sheets-Sheet 1

INVENTOR
ELMER H. DREHER
BY *H. A. Sparks*
HIS ATTORNEY

INVENTOR
ELMER H. DREHER
BY *W. A. Sparks*
HIS ATTORNEY

Oct. 13, 1942.    E. H. DREHER    2,298,353
CALCULATING MACHINE
Filed March 18, 1936    46 Sheets-Sheet 6

INVENTOR
ELMER H. DREHER
BY
W. A. Sparks
HIS ATTORNEY

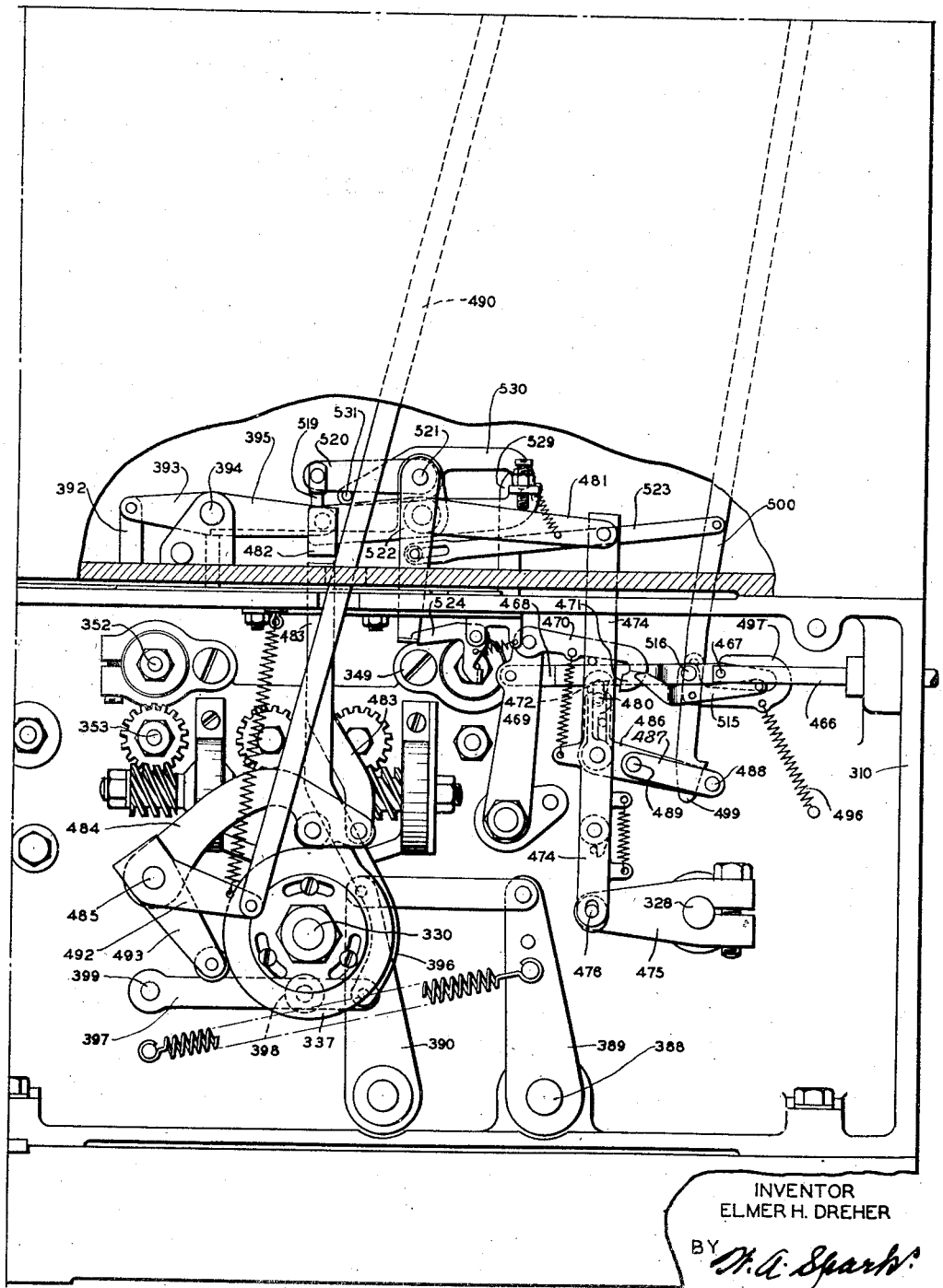

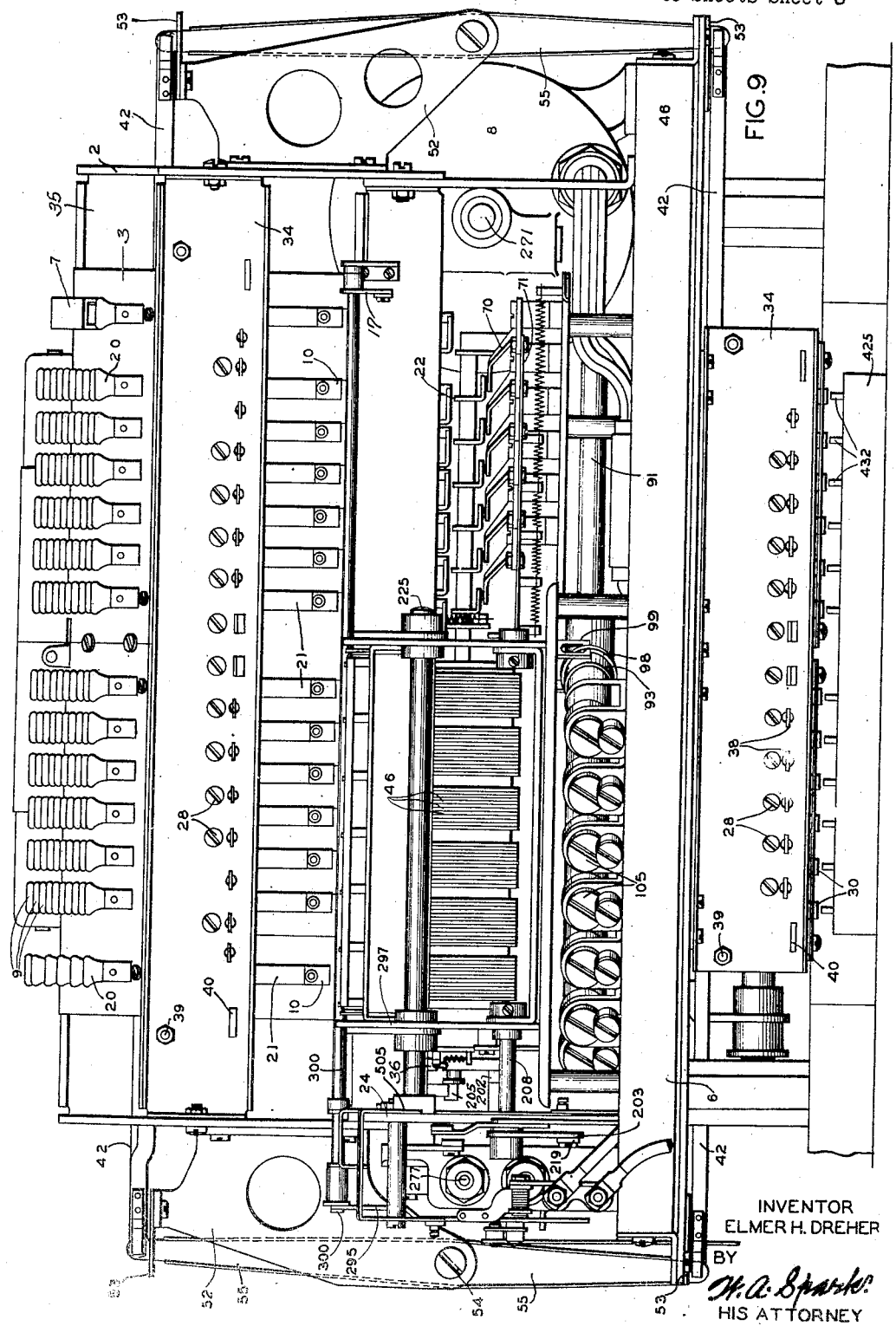

Oct. 13, 1942.          E. H. DREHER          2,298,353
CALCULATING MACHINE
Filed March 18, 1936          46 Sheets-Sheet 10

INVENTOR
ELMER H. DREHER
BY *W. A. Sparks*
HIS ATTORNEY

Oct. 13, 1942.  E. H. DREHER  2,298,353
CALCULATING MACHINE
Filed March 18, 1936  46 Sheets-Sheet 13

INVENTOR
ELMER H. DREHER
BY *W. A. Sparks*
HIS ATTORNEY

Oct. 13, 1942.   E. H. DREHER   2,298,353
CALCULATING MACHINE
Filed March 18, 1936   46 Sheets-Sheet 14

INVENTOR
ELMER H. DREHER
BY
HIS ATTORNEY

Oct. 13, 1942.   E. H. DREHER   2,298,353
CALCULATING MACHINE
Filed March 18, 1936    46 Sheets-Sheet 19

INVENTOR
ELMER H. DREHER
BY
HIS ATTORNEY

Oct. 13, 1942.    E. H. DREHER    2,298,353
CALCULATING MACHINE
Filed March 18, 1936    46 Sheets-Sheet 20
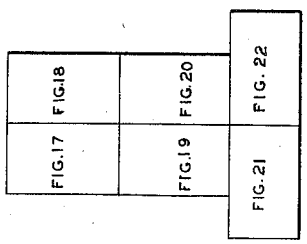
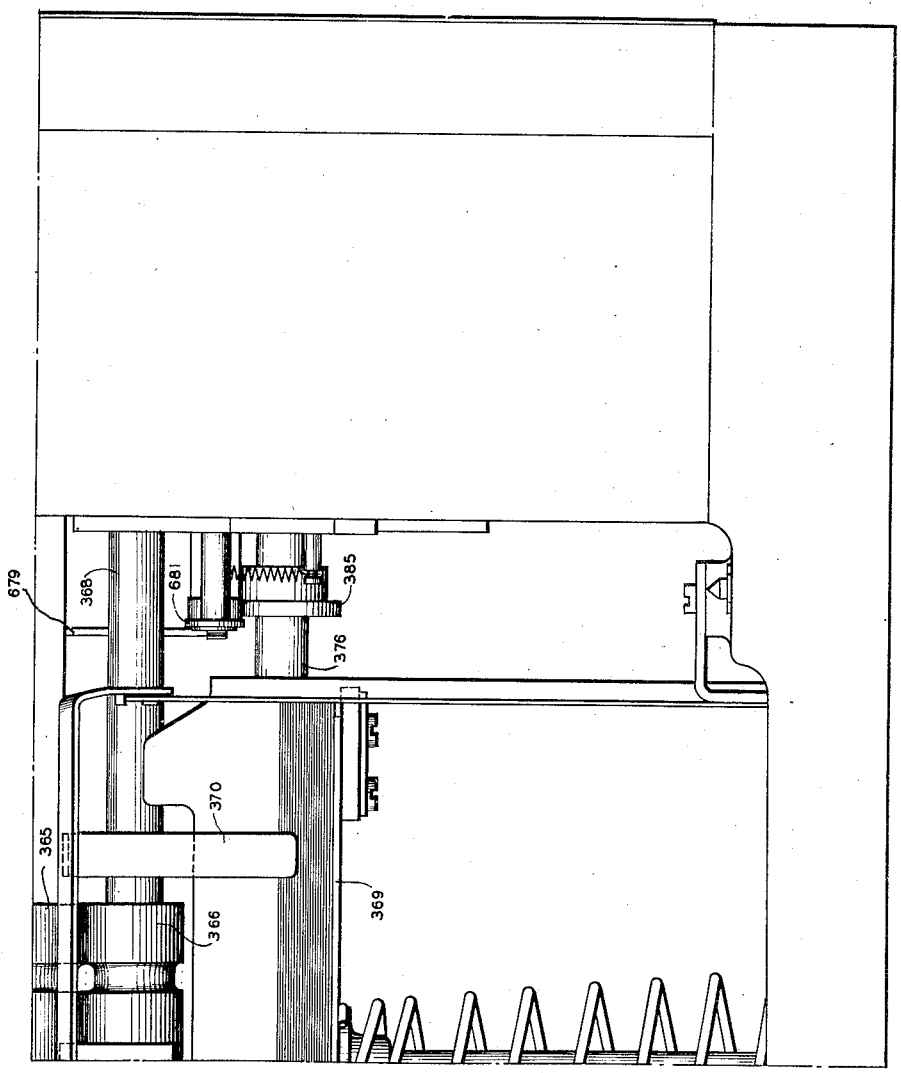
INVENTOR
ELMER H. DREHER
BY *W. A. Sparks*
HIS ATTORNEY

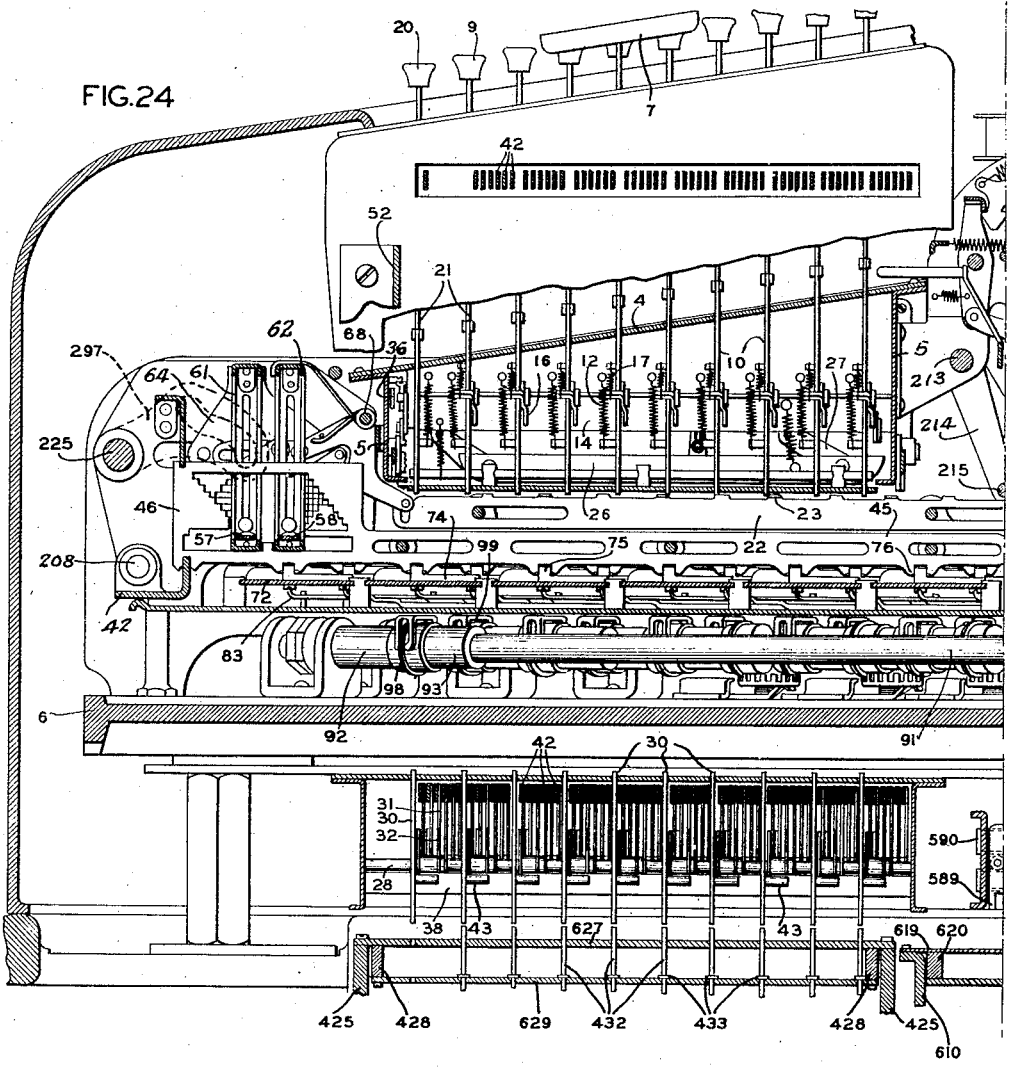

Oct. 13, 1942.　　　　E. H. DREHER　　　　2,298,353
CALCULATING MACHINE
Filed March 18, 1936　　　46 Sheets-Sheet 22
FIG. 25
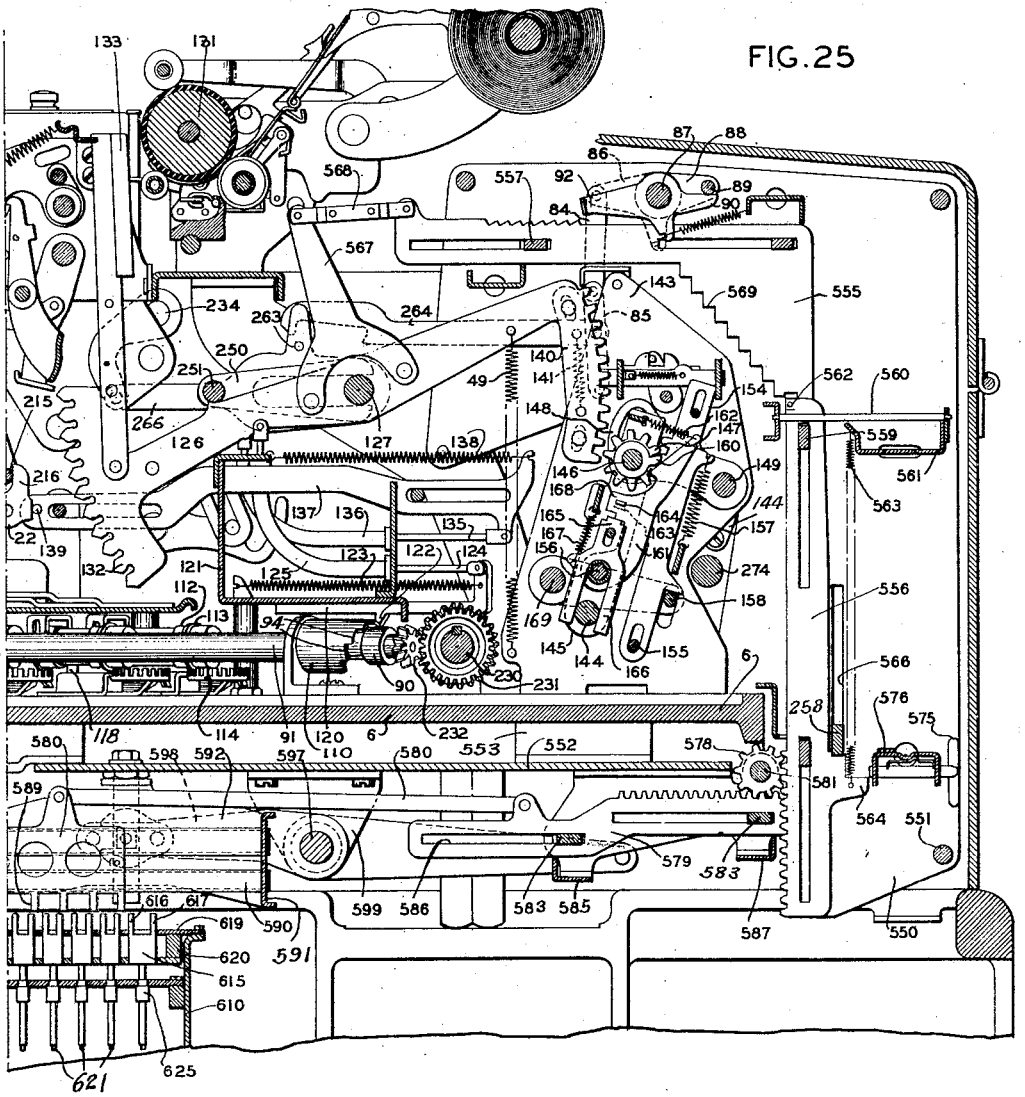
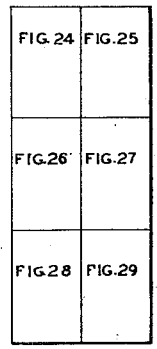
FIG. 30
INVENTOR
ELMER H. DREHER
BY
*H. A. Spark*
HIS ATTORNEY Oct. 13, 1942.  E. H. DREHER  2,298,353
CALCULATING MACHINE
Filed March 18, 1936  46 Sheets-Sheet 23

INVENTOR
ELMER H. DREHER
BY
*W. A. Sparks*
HIS ATTORNEY

Oct. 13, 1942.  E. H. DREHER  2,298,353
CALCULATING MACHINE
Filed March 18, 1936  46 Sheets-Sheet 24

INVENTOR
ELMER H. DREHER
BY
HIS ATTORNEY

Oct. 13, 1942.     E. H. DREHER     2,298,353
CALCULATING MACHINE
Filed March 18, 1936     46 Sheets-Sheet 26

INVENTOR
ELMER H. DREHER
BY H. A. Sparks
HIS ATTORNEY

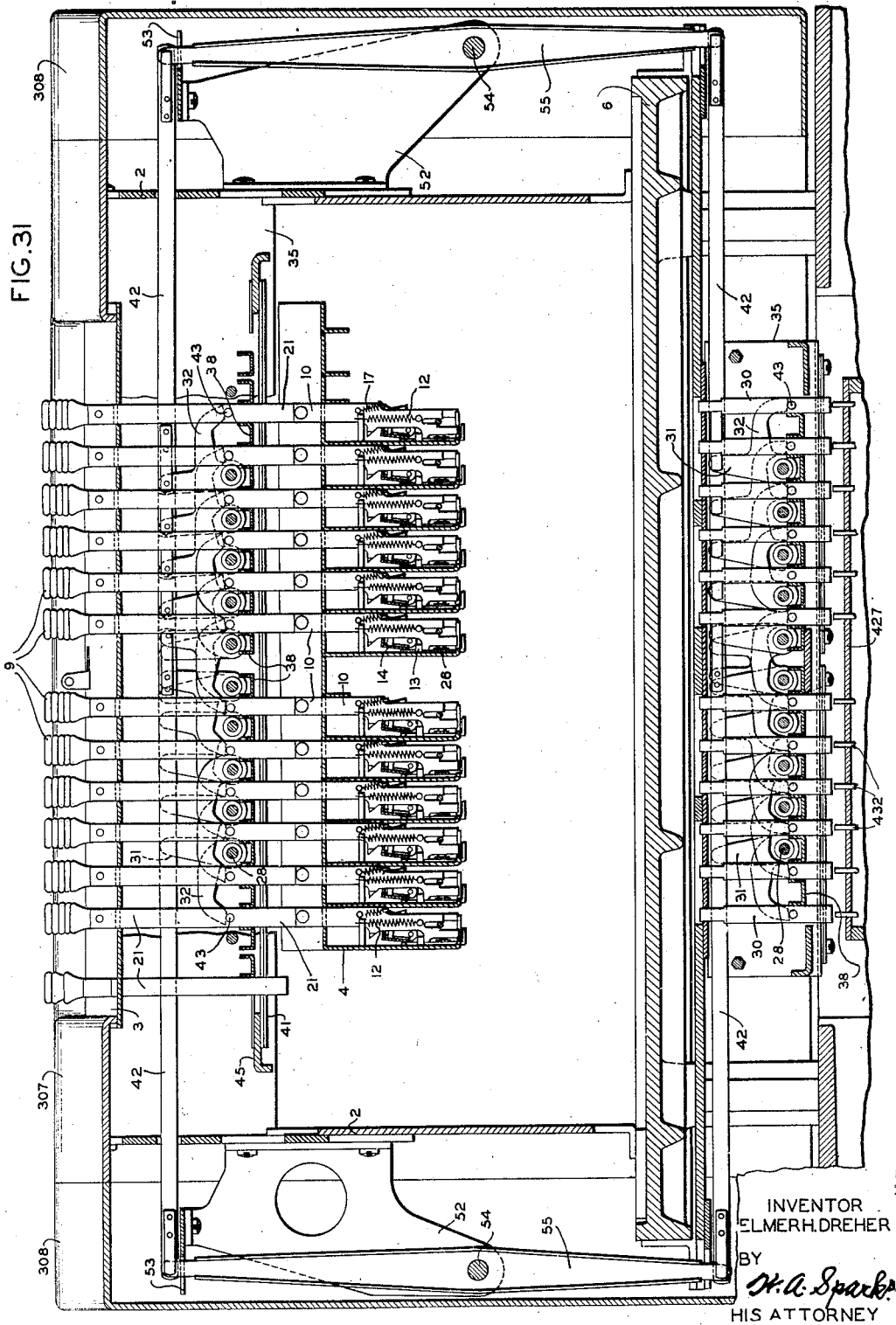

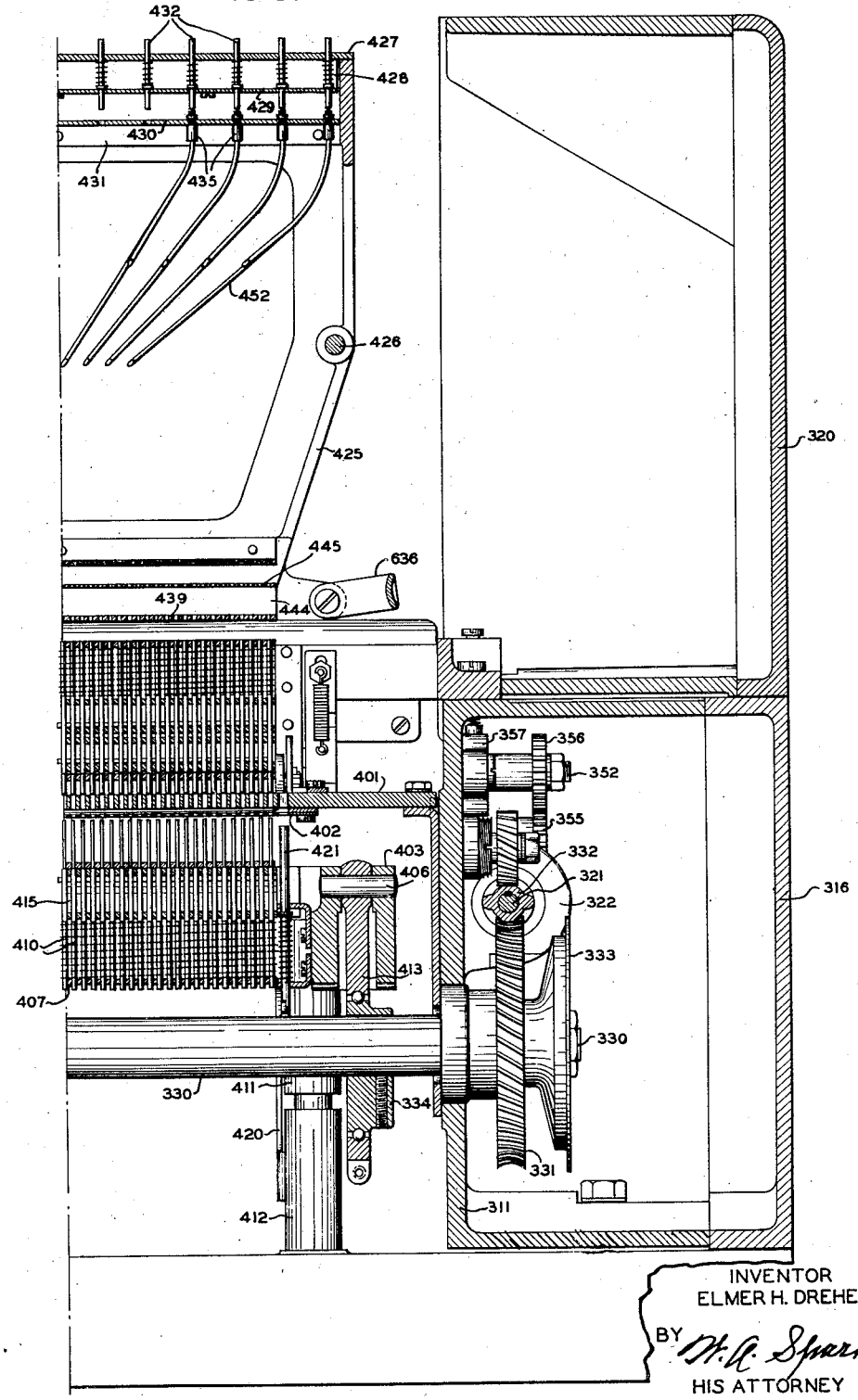

Oct. 13, 1942.    E. H. DREHER    2,298,353
CALCULATING MACHINE
Filed March 18, 1936    46 Sheets-Sheet 30

INVENTOR
ELMER H. DREHER
BY *W. A. Sparks*
HIS ATTORNEY

Oct. 13, 1942.  E. H. DREHER  2,298,353
CALCULATING MACHINE
Filed March 18, 1936  46 Sheets-Sheet 31

INVENTOR
ELMER H. DREHER
BY *H. A. Sparks*
HIS ATTORNEY

Oct. 13, 1942.    E. H. DREHER    2,298,353
CALCULATING MACHINE
Filed March 18, 1936    46 Sheets-Sheet 32
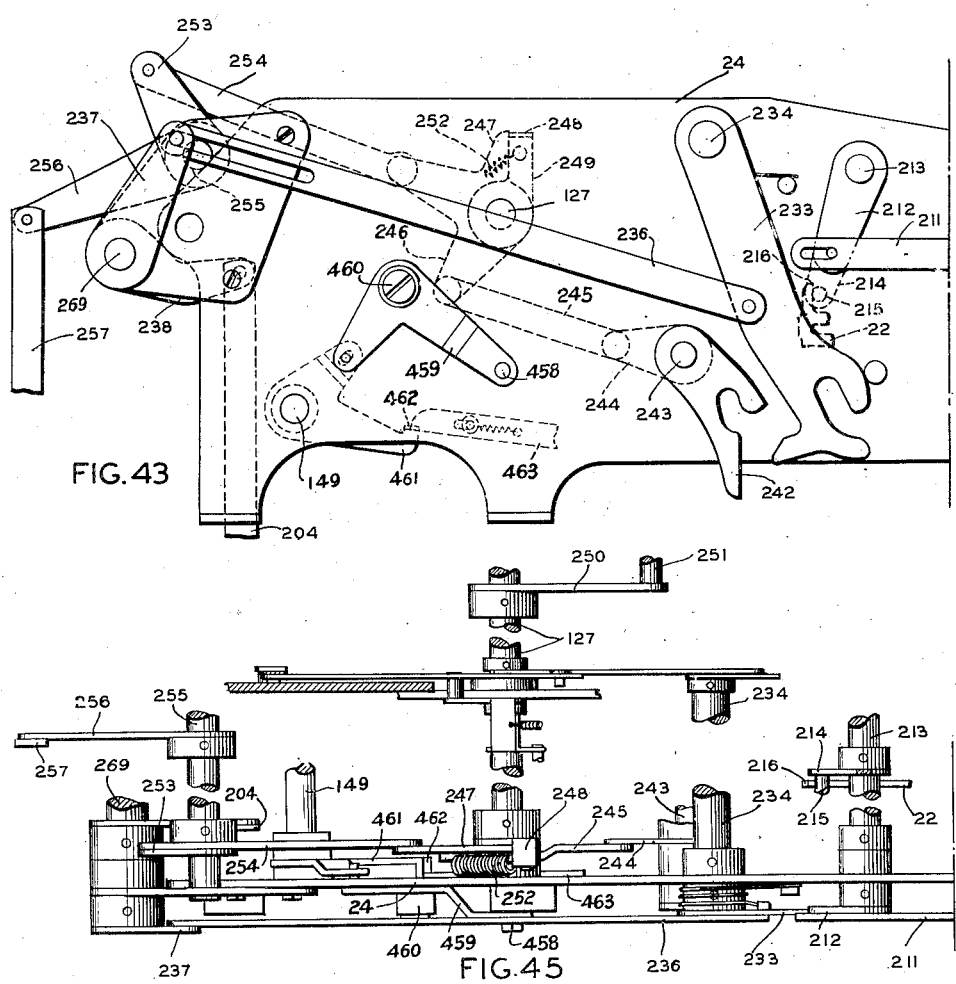
INVENTOR
ELMER H. DREHER
BY N. A. Sparks
HIS ATTORNEY

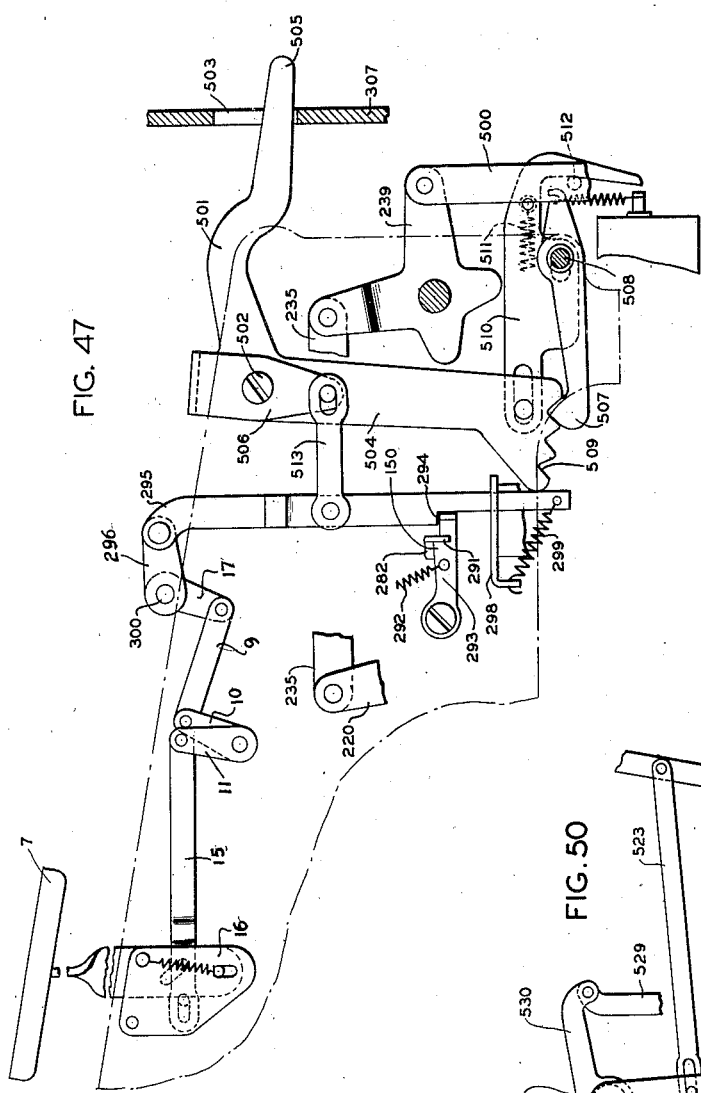
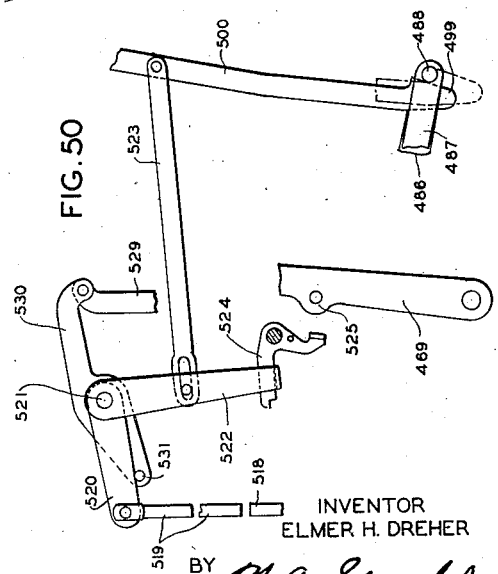

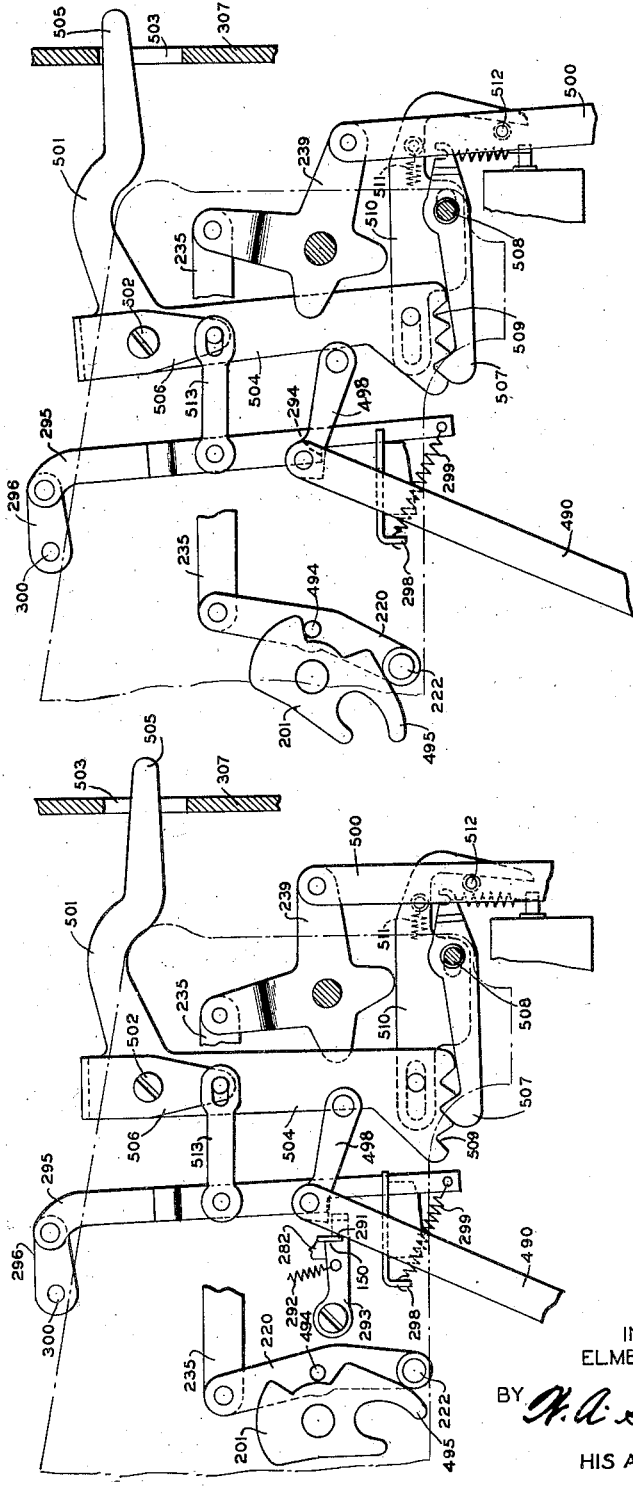

Oct. 13, 1942.  E. H. DREHER  2,298,353
CALCULATING MACHINE
Filed March 18, 1936   46 Sheets-Sheet 36
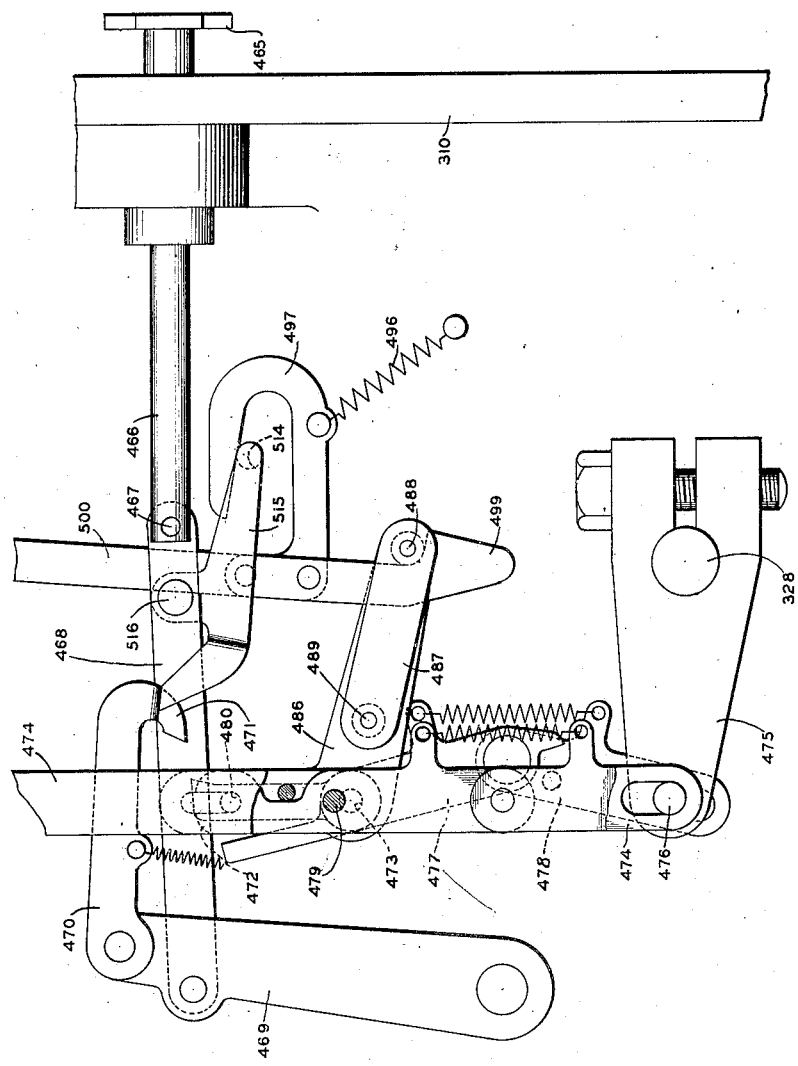
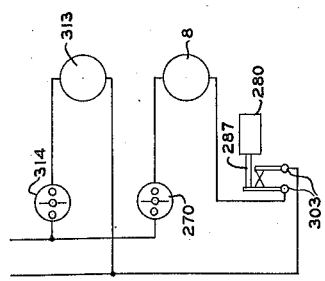
INVENTOR
ELMER H. DREHER
BY *W. A. Sparks*
HIS ATTORNEY

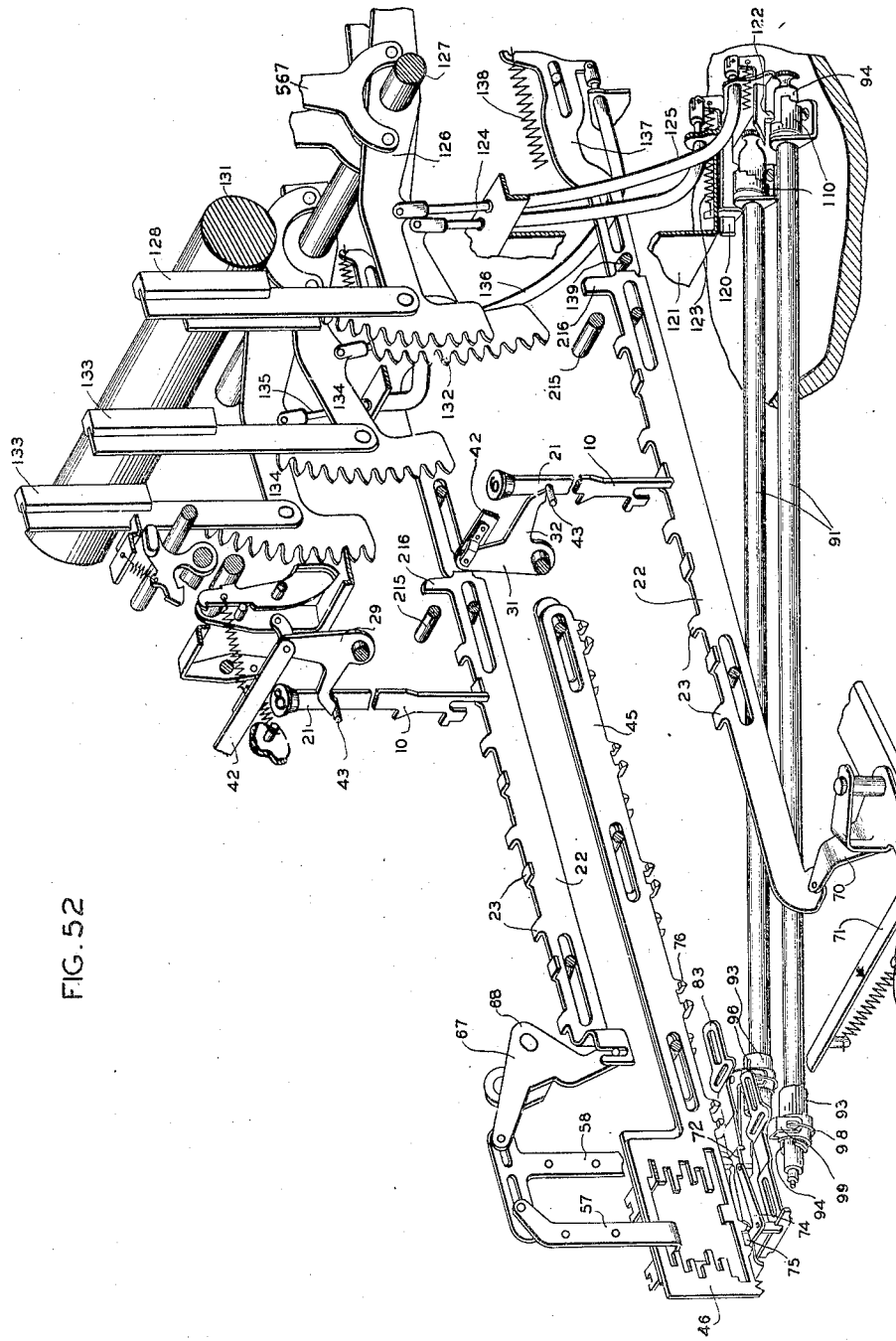

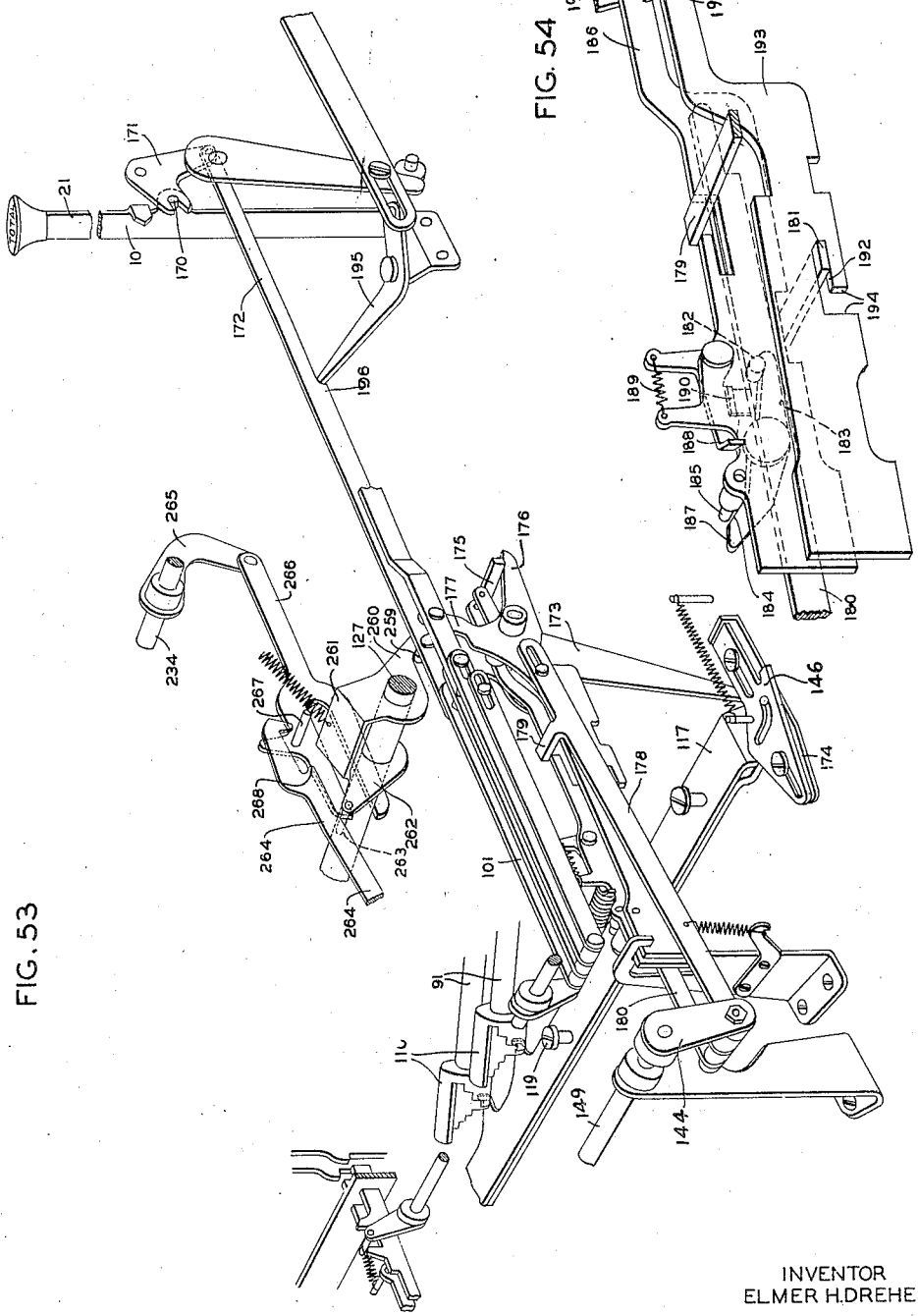

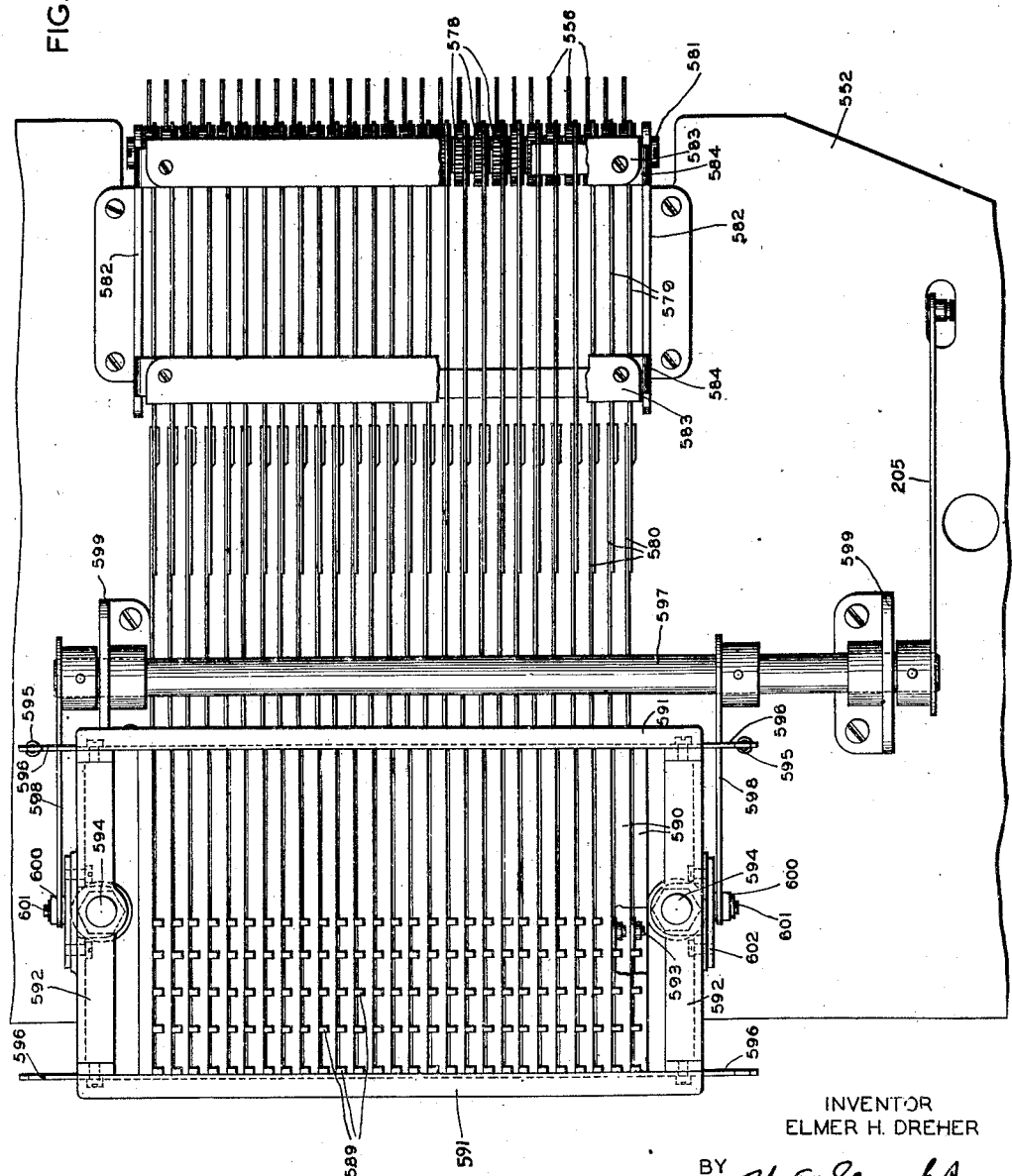

Oct. 13, 1942.                E. H. DREHER                2,298,353
                          CALCULATING MACHINE
                    Filed March 18, 1936    46 Sheets-Sheet 41
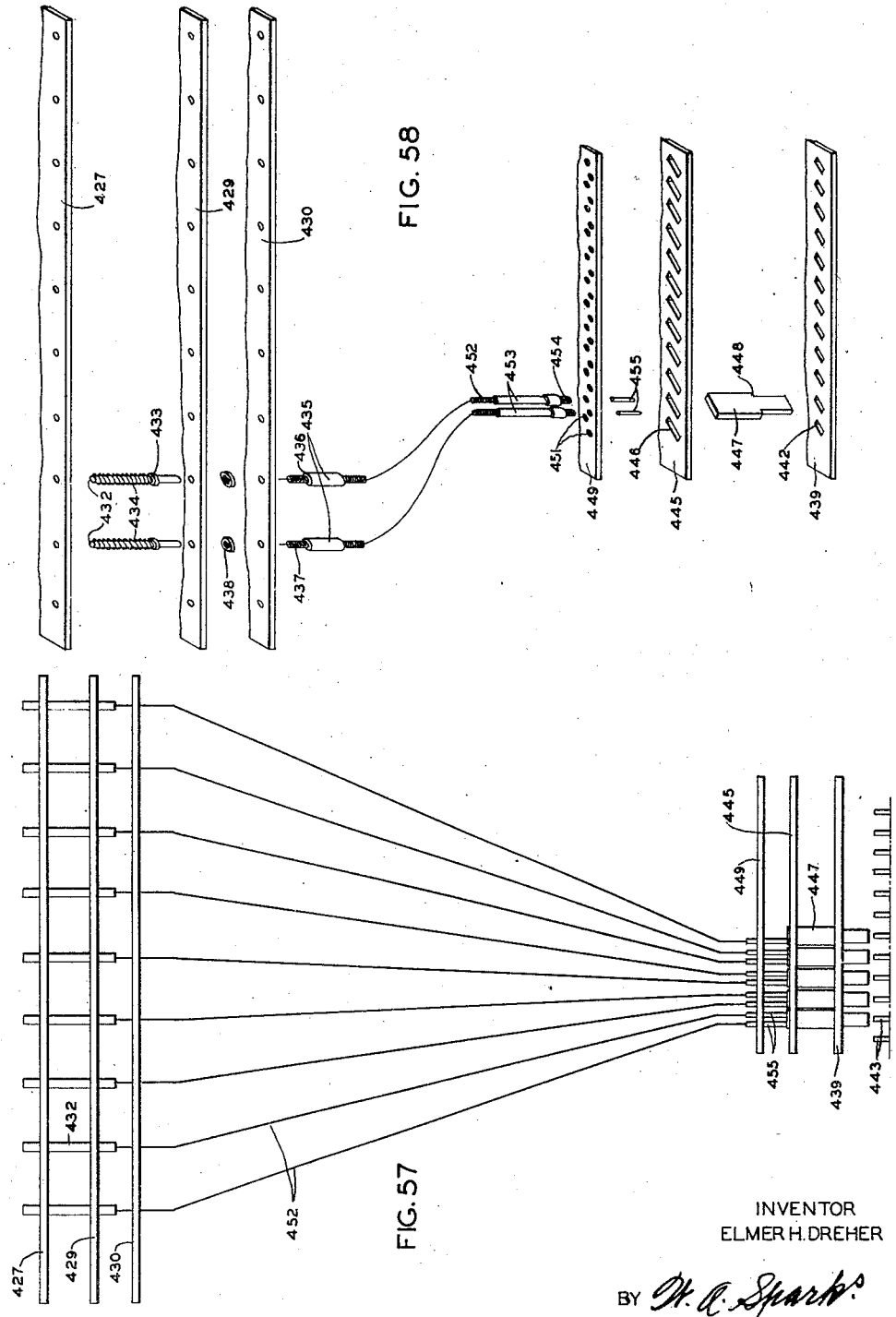
INVENTOR
ELMER H. DREHER
BY W. C. Sparks
ATTORNEY

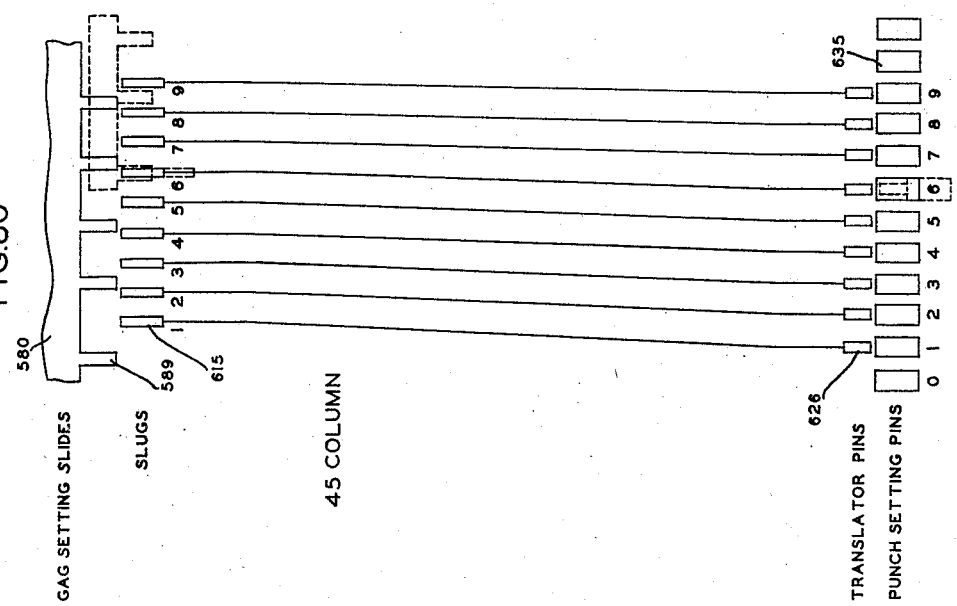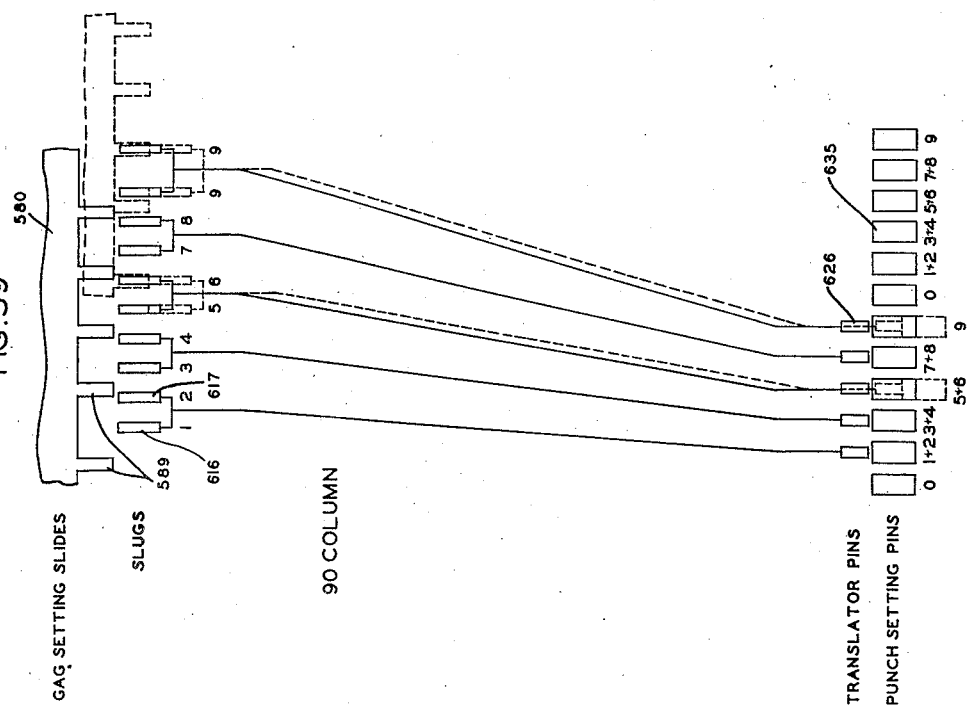

Oct. 13, 1942.　　　E. H. DREHER　　　2,298,353
CALCULATING MACHINE
Filed March 18, 1936　　46 Sheets-Sheet 43

INVENTOR
ELMER H. DREHER
BY
*W. G. Spark*
HIS ATTORNEY

Oct. 13, 1942.　　　E. H. DREHER　　　2,298,353
CALCULATING MACHINE
Filed March 18, 1936　　　46 Sheets-Sheet 44
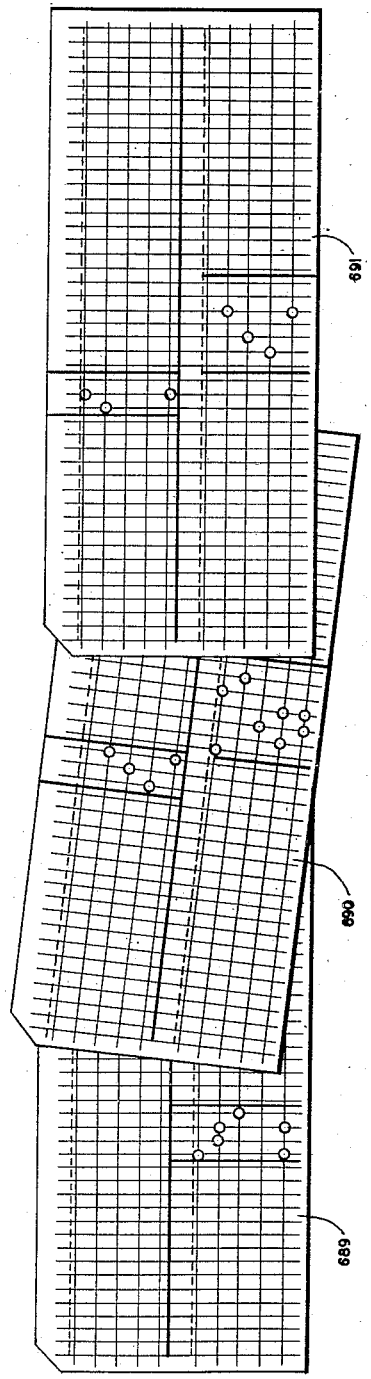
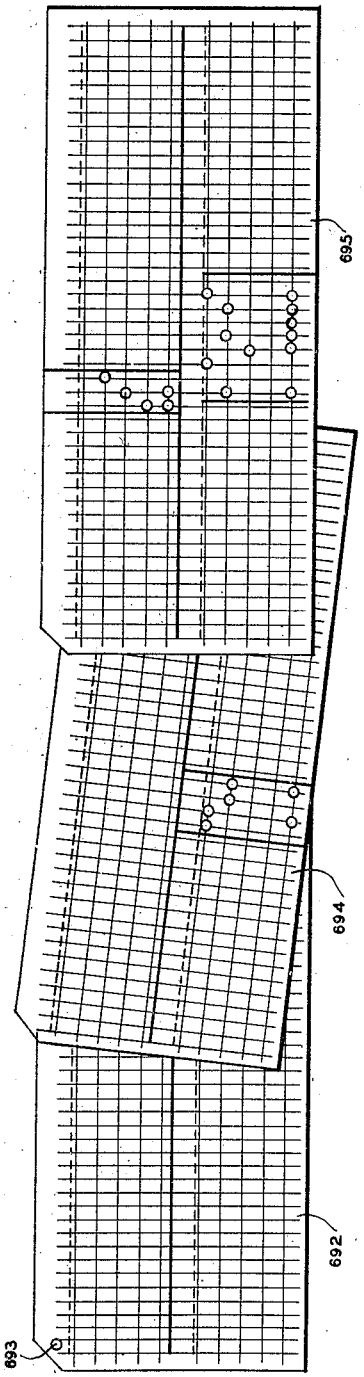
INVENTOR
ELMER H. DREHER
BY *W. A. Sparks*
HIS ATTORNEY

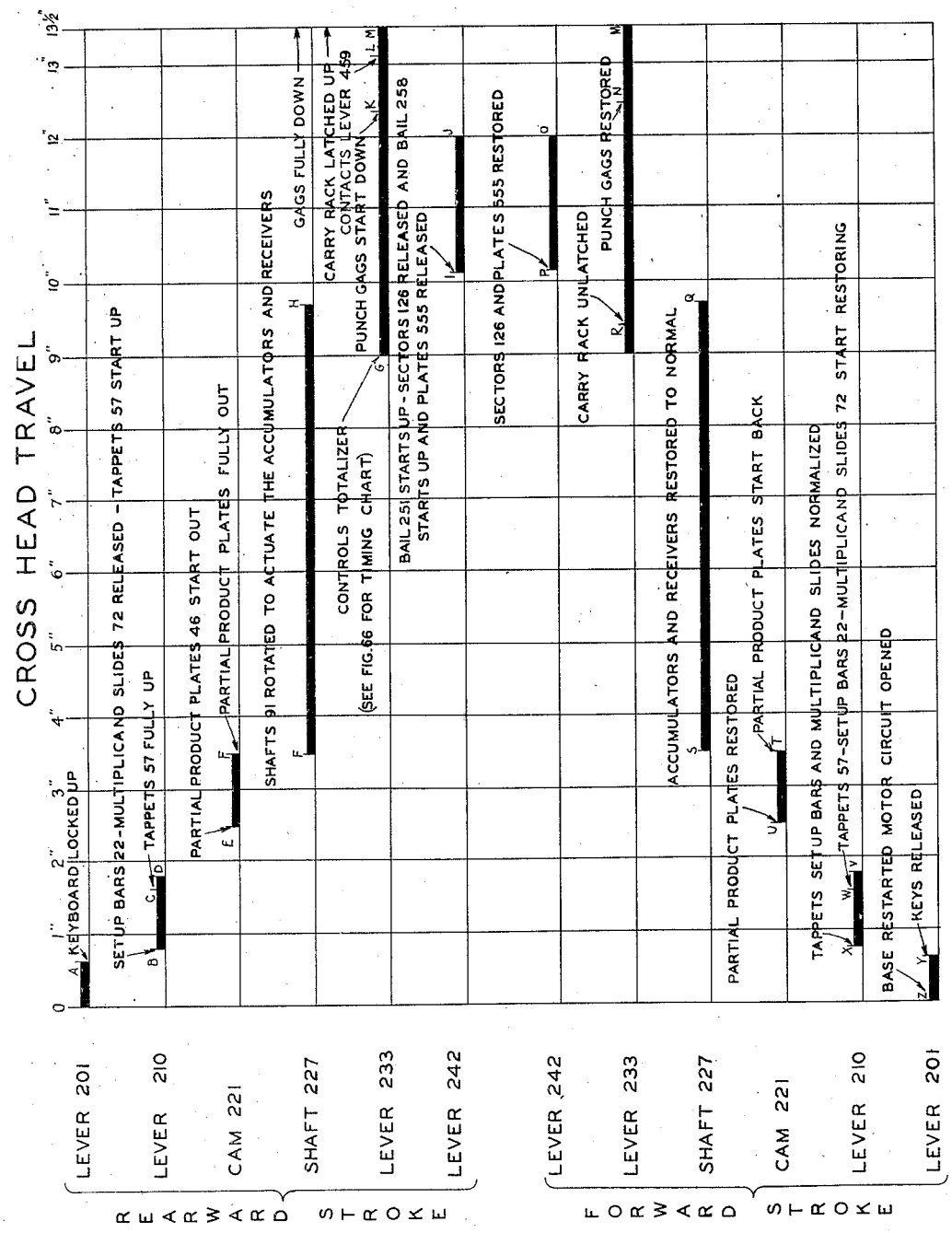

Patented Oct. 13, 1942

2,298,353

UNITED STATES PATENT OFFICE 2,298,353

CALCULATING MACHINE

Elmer H. Dreher, Rockville Centre, N. Y., assignor to Remington Rand Inc., Buffalo, N. Y., a corporation of Delaware Application March 18, 1936, Serial No. 69,570

7 Claims. (Cl. 235—61.6)

This invention relates to calculating machines, and more particularly to a perforated card machine adapted to perform the operations of addition, subtraction, and multiplication.

Heretofore machines performing the operation of multiplication, hereinafter referred to as multiplying machines, have been manually controlled.

The machine of the invention comprises three principal mechanisms (1) the multiplying mechanism which performs the actual multiplication of a plurality of digits to determine a product which is printed together with the factors on a record sheet and are also run into an accumulator from which totals may be taken at will by the operator, (2) a sensing mechanism which senses the factors from a perforated card and sets them up in the multiplying mechanism, and (3) a punching mechanism which is controlled by the multiplying mechanism to punch factors, products, and totals, in a card. In short the machine is adapted to sense six digit factors from a perforated card and compute the product which is then punched in the same card, printed on a record strip and stored in a totalizer. In the case of the punching of totals a separate summary card may be used.

The three mechanisms listed above are interconnected by suitable control devices.

The multiplying mechanism is substantially that disclosed and described in the U. S. patents to A. Baumann et al., 1,886,148, issued November 1, 1932, and 2,034,831, issued June 22, 1937.

The sensing mechanism is of the well known Powers type disclosed and described in the patent to William W. Lasker, 2,044,119 issued June 16, 1936.

The gag setting and perforating mechanism is similar to that described and disclosed in Fig. 3 of the U. S. patent to William W. Lasker, 2,004,208, for a Punching machine.

Certain structural changes have been made in all of the above mechanisms but essentially the operation and general construction is the same. These changes have been made to insure that the separate portions of the machine will operate as a flexible and unitary structure and the changes will be described in detail hereinafter. However in view of the fact that most of the structures are well known, frequent reference to the figures in the above patents will be made.

It is, therefore, the principal object of this invention to provide a card controlled and operated multiplying machine in which multiplication of a group of muitiplicands may be effected by one multiplier wherein the multiplier is punched only in the first card of a stack and different and various multiplicands are punched in the subsequent cards of the stack, the product of each multiplication being punched in its respective card.

A still further object is to provide a multiplying machine in which a control mechanism operated by a control card will clear the group multiplier out of the machine after a group multiplication is completed.

Another object is to provide a machine which may be manually controlled to permit the punching of a product in a card the multiplication factors of which has been entered in the machine manually.

A further object is to provide a machine which may be manually controlled to permit one cycle operation thereby permitting the sensing of a multiplicand or multiplier from a card and the entering of the remaining factor manually in the keyboard and the subsequent punching of the product in the card and the simultaneous printing of the factors and product on a record sheet.

A still further object is to provide a control whereby the multiplier and multiplicand is manually set up in the keyboard and a subsequent punching and printing of the multiplication factors and the product in a card and on a record sheet.

Another object is to provide a control whereby the machine may be manually operated without punching the factors and product in a card. The multiplication factors and product being printed on a record sheet.

A further object is to provide a manual control which will cause the machine to print and punch a sub total without clearing the totalizers.

A further object is to provide a manual control which will cause the machine to print and punch a total of all the products then stored in the machine.

A still further object of the invention is to provide a decoding mechanism whereby perforations in either one of two codes may cause the multiplication factors to be set up in the keyboard of the machine without any supervision by the operator except inserting the correct translator.

Another important object is to provide a perforated card operated machine which will be flexible and efficient in operation and which may be operated manually, semi-automatically or automatically at will.

Additional features and objects may be had from the following specification taken in conjunction with the accompanying drawings in which:

Fig. 1 discloses the invention in front isometric elevation.

Figs. 2 and 3 taken together form a top elevation of the invention with the covers removed.

Fig. 4 discloses the left hand side of the multiplying mechanism showing the printing mechanism and punch slides and gag setting plates.

Fig. 5 shows a portion of the left hand side of the machine disclosing the keyboard, the key set up controls, the driving cross head and the clutch control mechanism.

Figs. 6 and 7 combined disclose the drive control mechanism on the left hand side of the machine.

Fig. 8 is a schematic diagram for combining the Figs. 4-7 inclusive, to form a complete view of the left hand side of the invention.

Fig. 9 is a front view of the multiplying section of the machine showing the keyboard, key set up controls, partial product plates, integrating mechanism and clutch control members.

Figure 10:
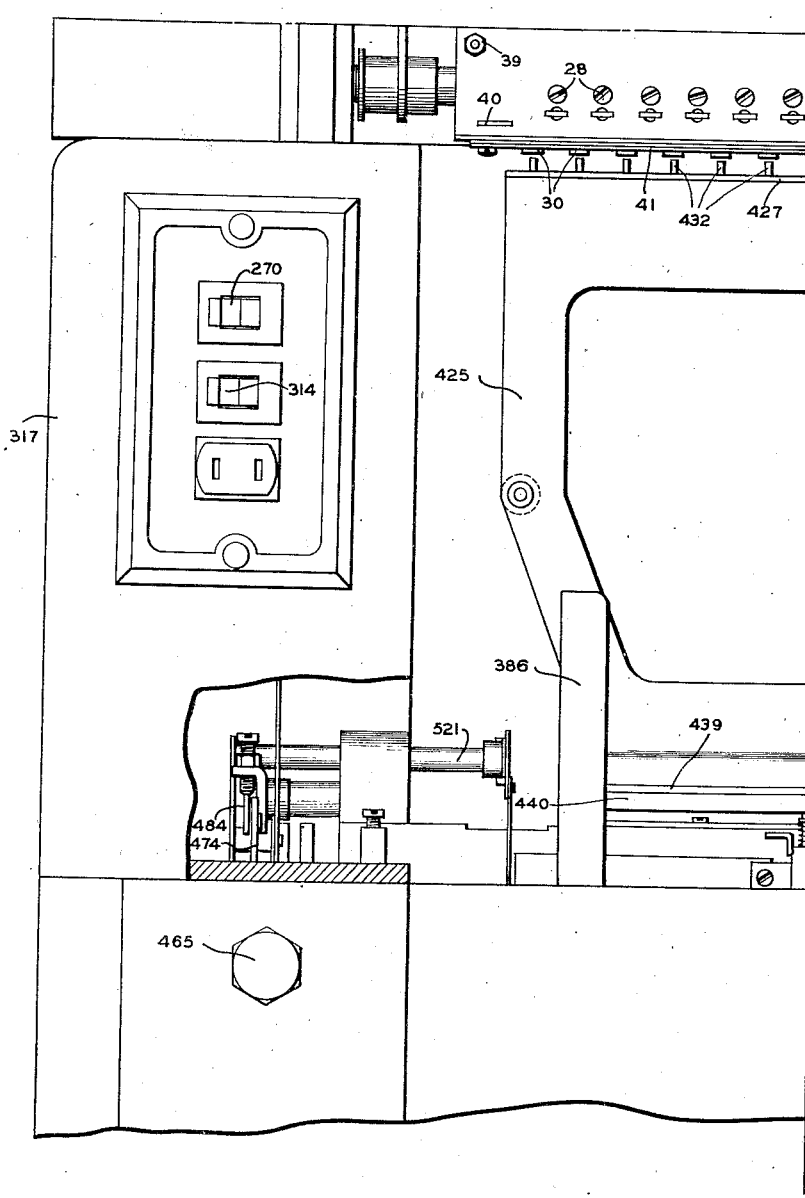
Figure 11:
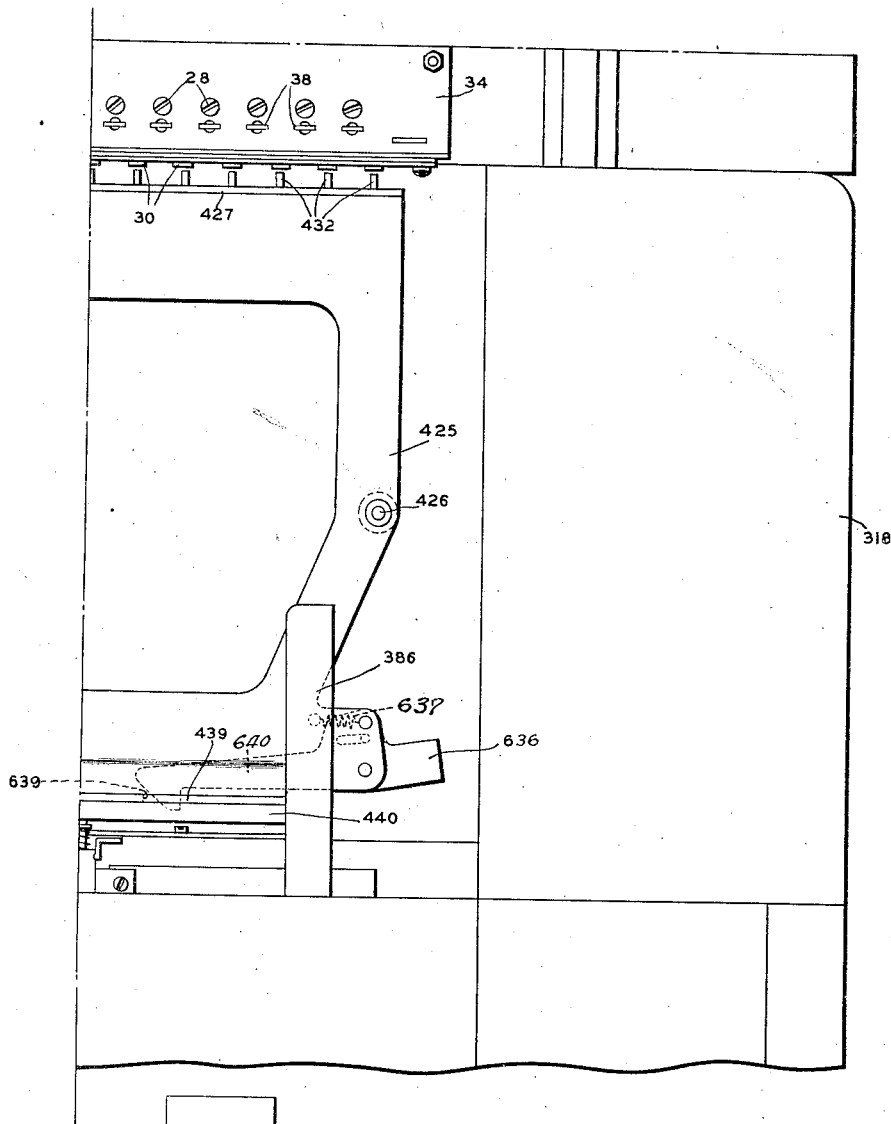

Figs. 10 and 11 combined form a front view of the middle portion of the machine disclosing the sensing translator frame, and the drive control shown through portions of the frame having been broken away.

Figure 12:
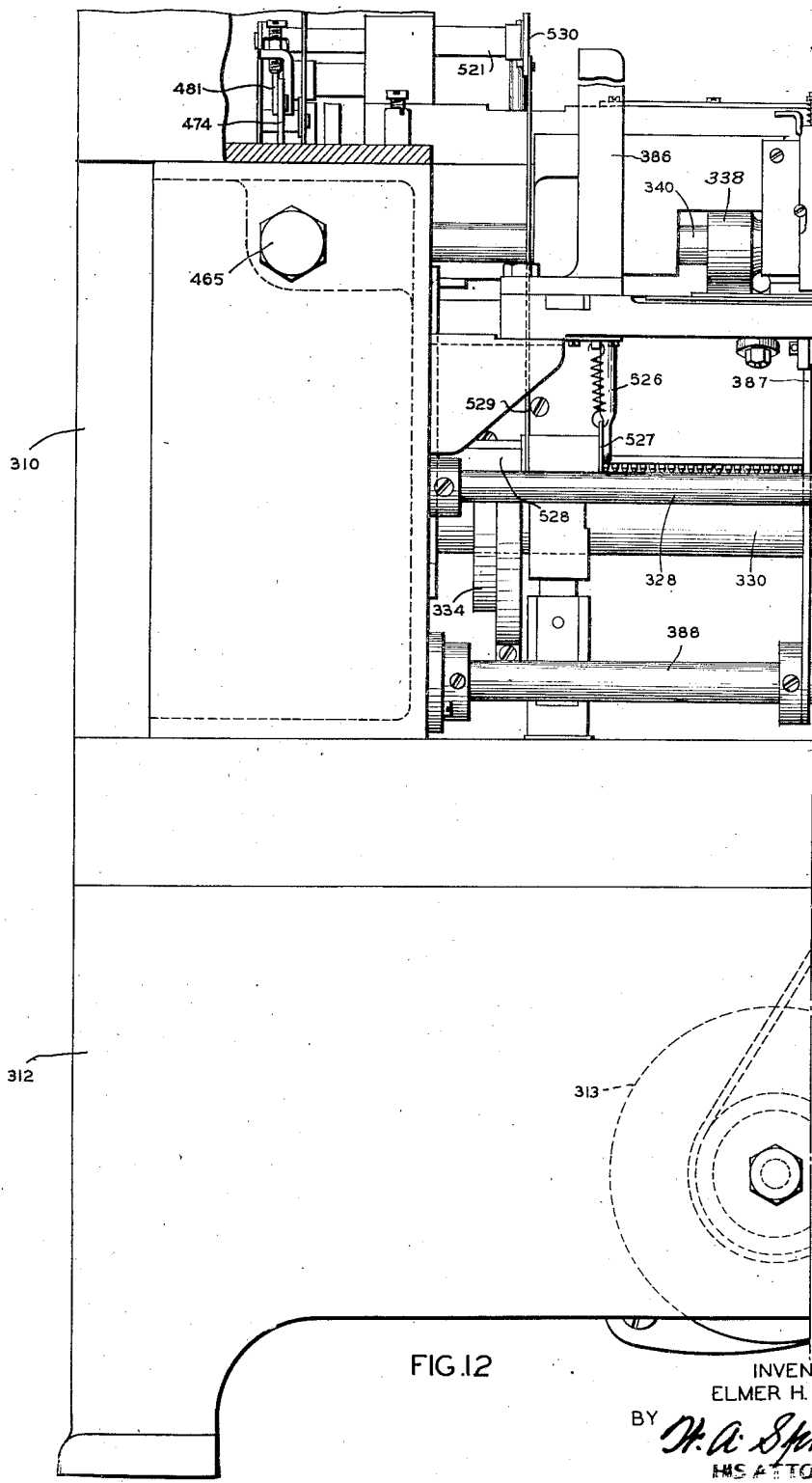
Figure 13:
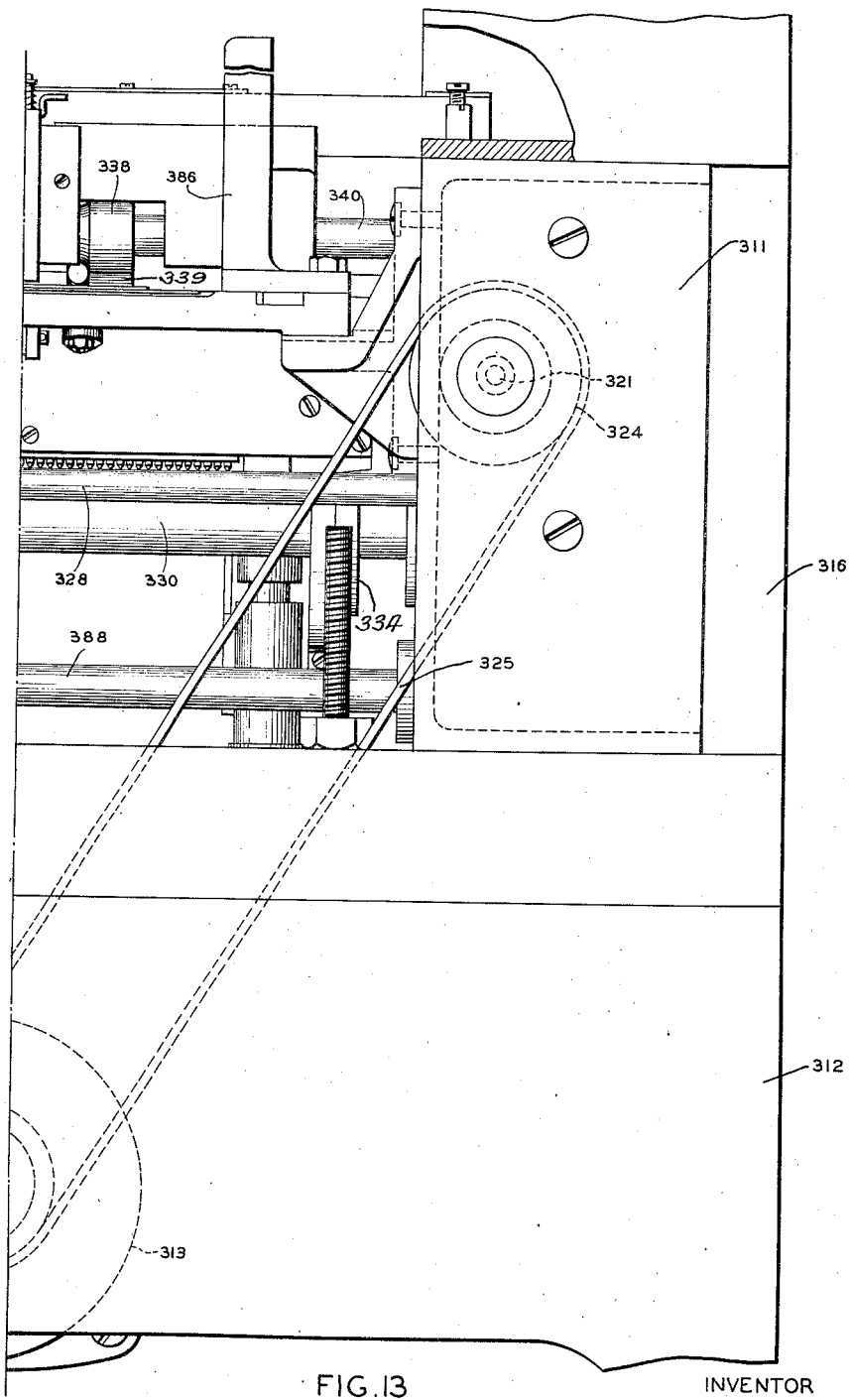

Figs. 12 and 13 combined form a front view of the bottom of the machine showing the card magazine, sensing pin box, drive mechanism through broken away portions of the frame and the driving motor.

Figure 14:
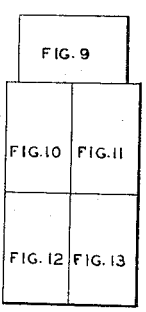

Fig. 14 is a schematic diagram for combining Figs. 9-13 inclusive, to form a complete front view of the machine.

Figure 15:
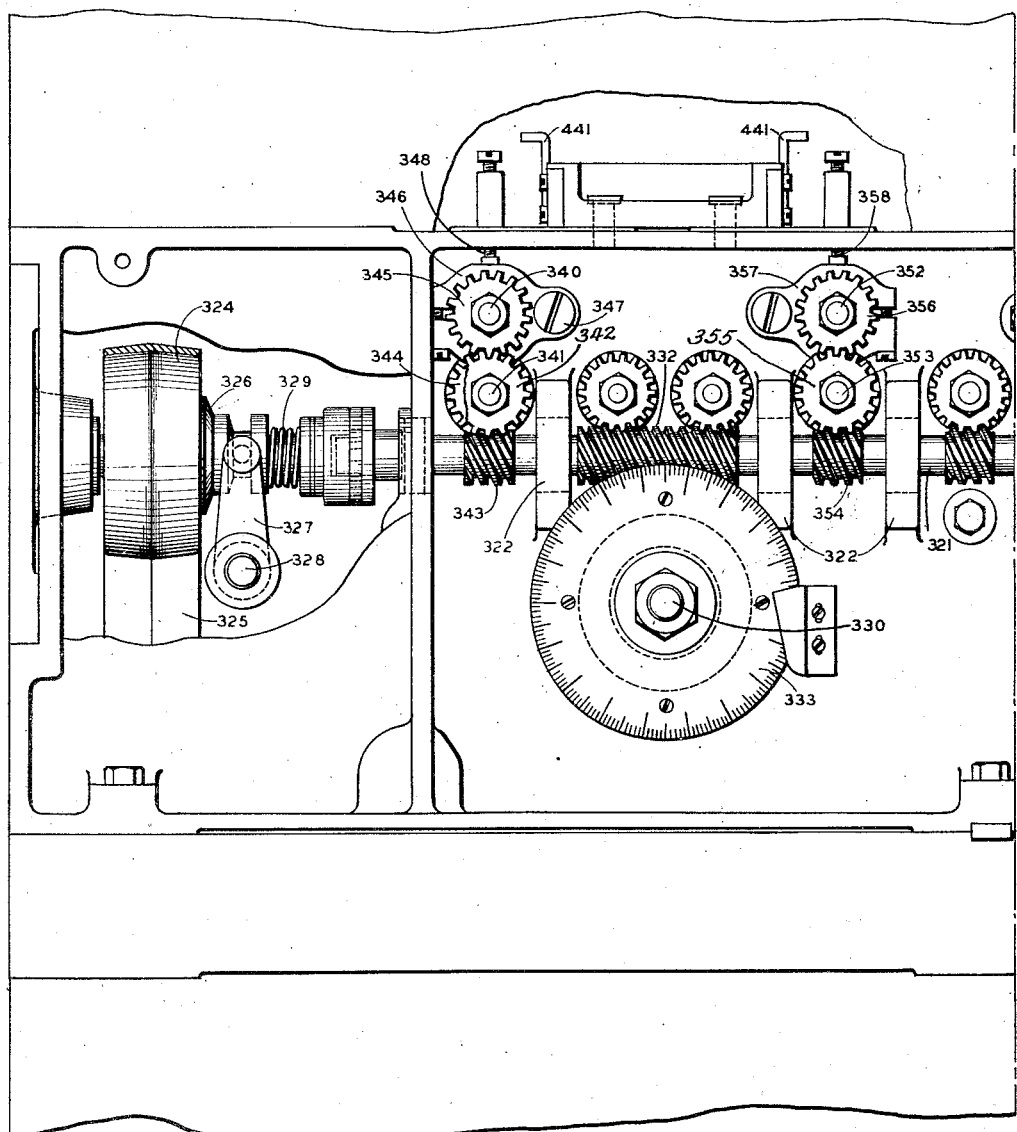
Figure 16:
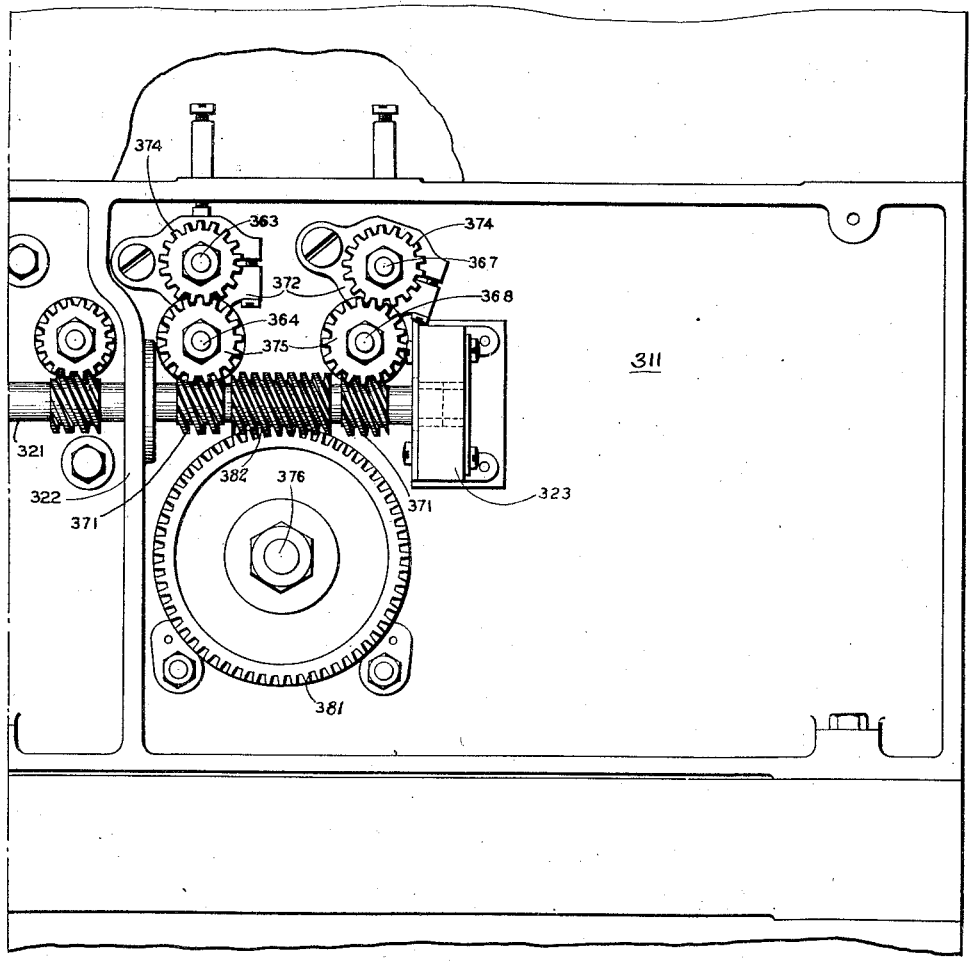

Figs. 15 and 16 combined form a view of the lower portion of the right hand side of the machine disclosing the drive means for the feed sensing and punching mechanisms.

Figure 17:
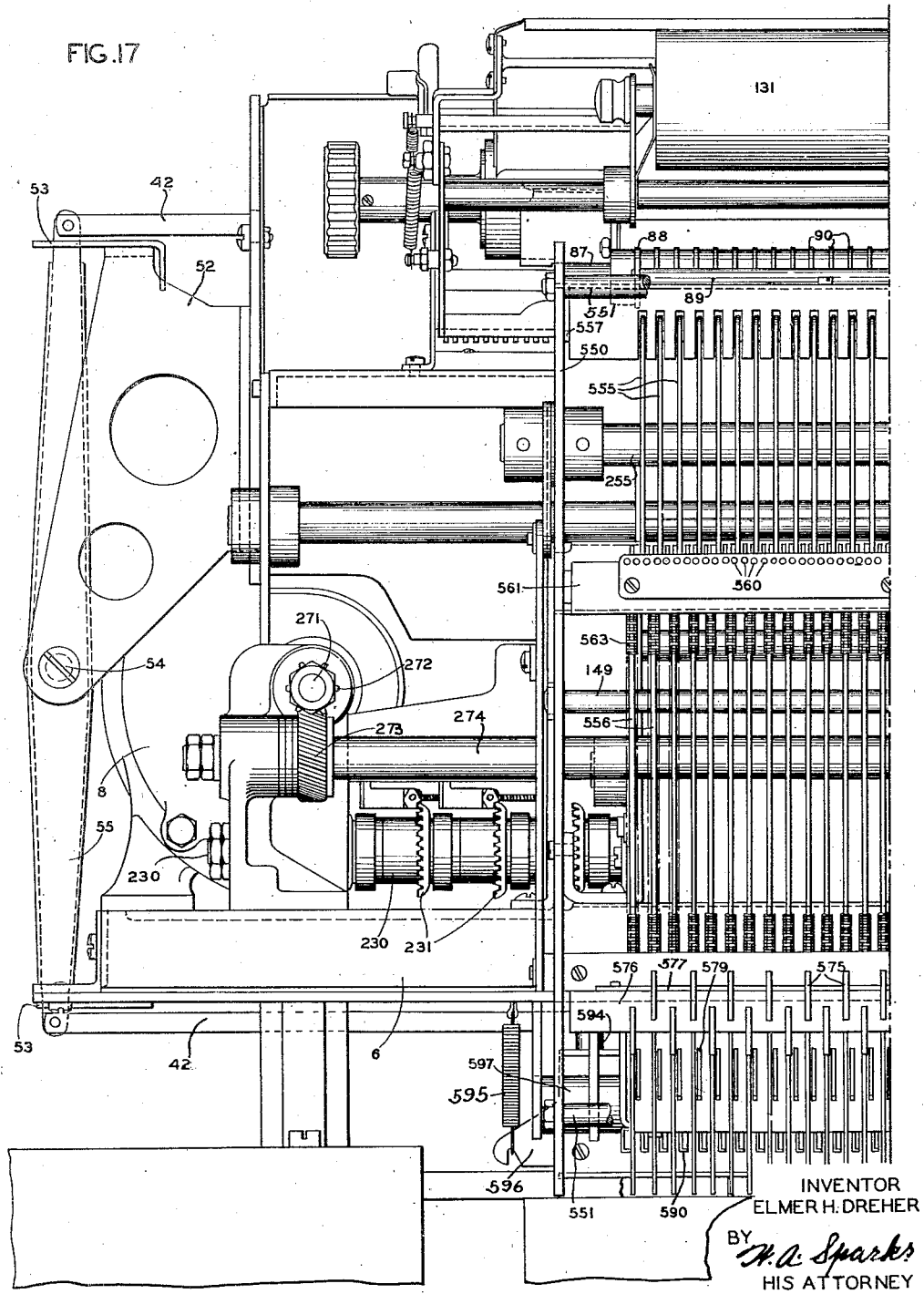
Figure 18:
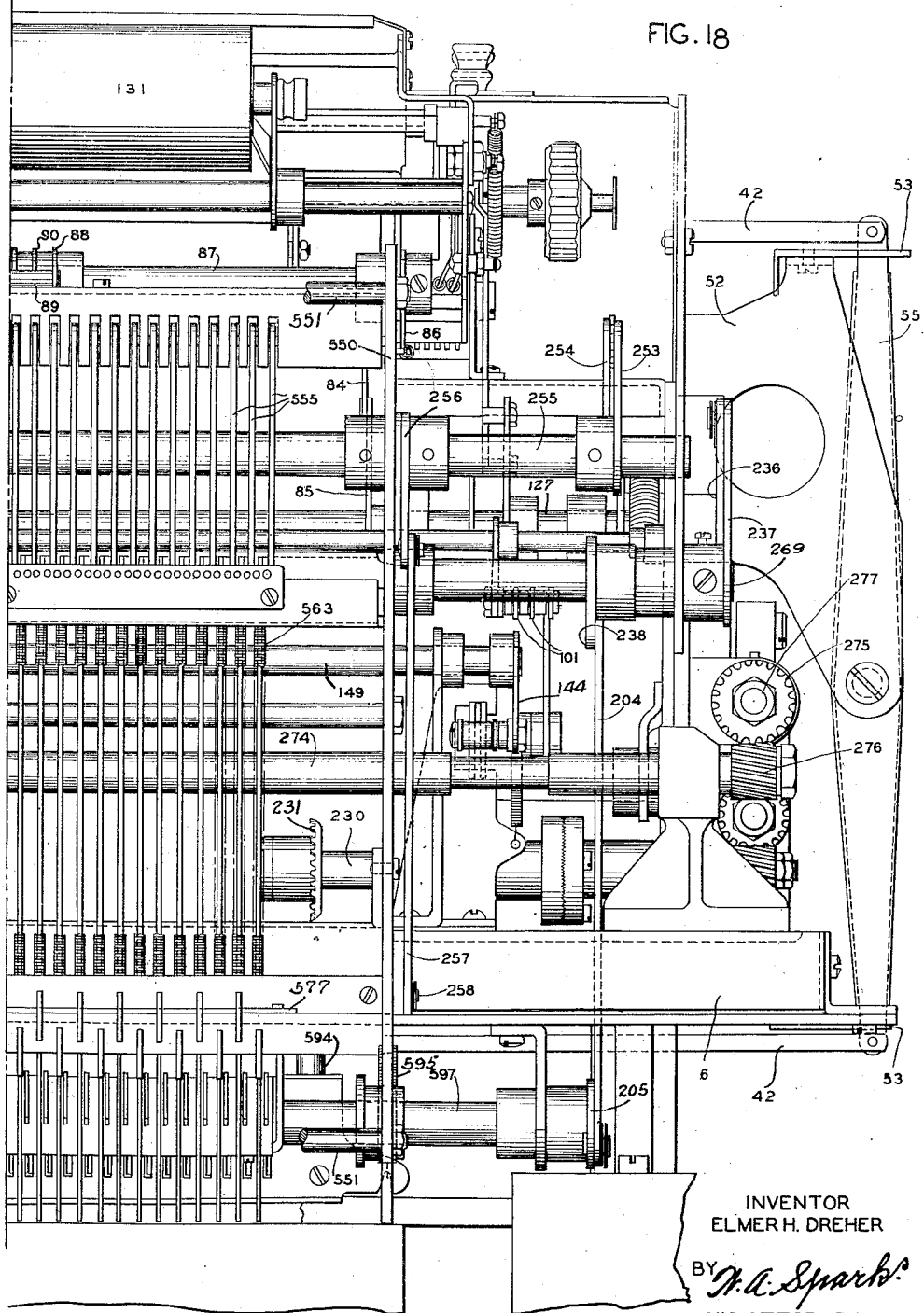

Figs. 17 and 18 combined form a rear view of the upper portion of the machine disclosing the platen, key set up control linkage, drive shaft for the cross head, total control mechanism, integrating mechanism, and the punch gag slide mechanism and the driving motor for the multiplying unit.

Figure 19:
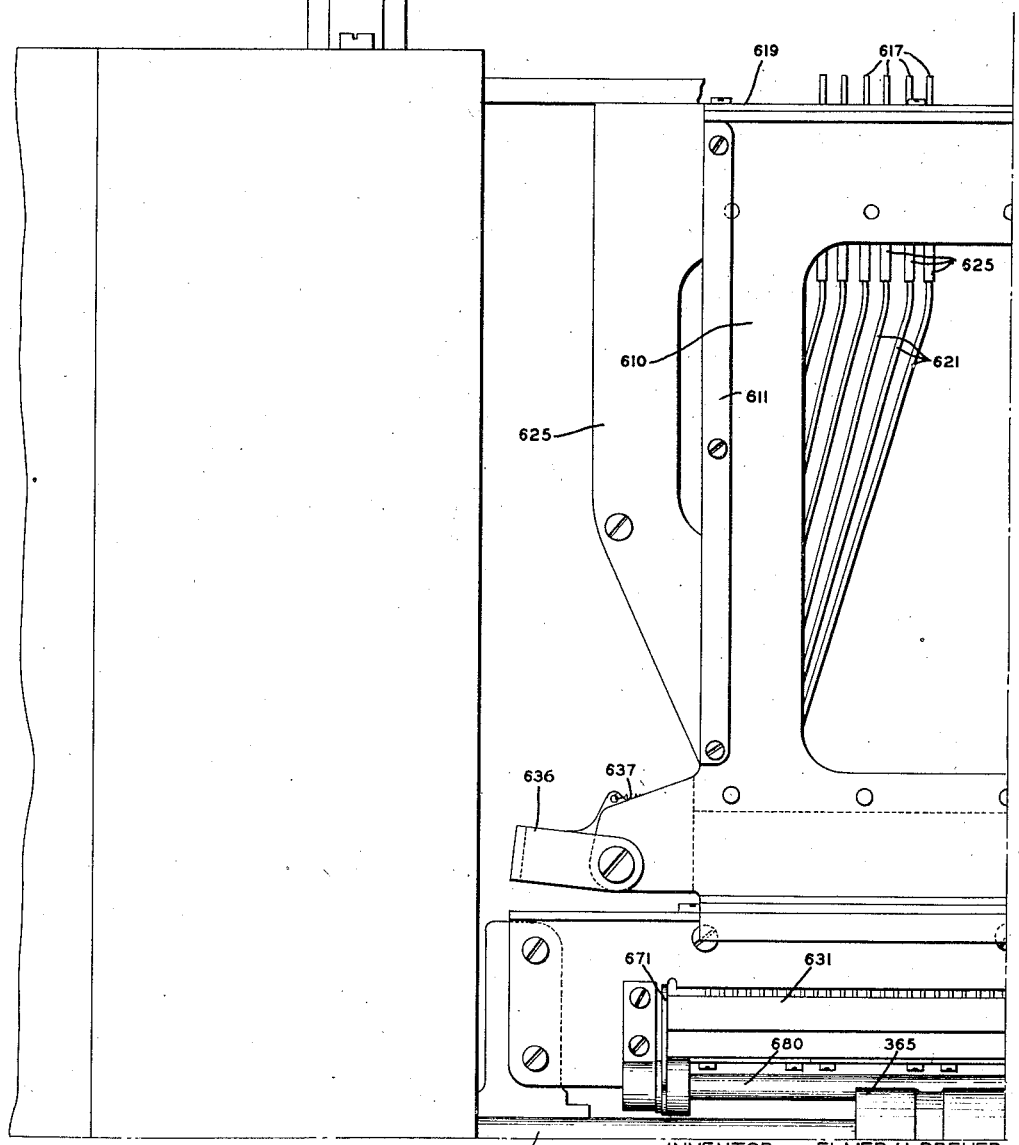
Figure 20:
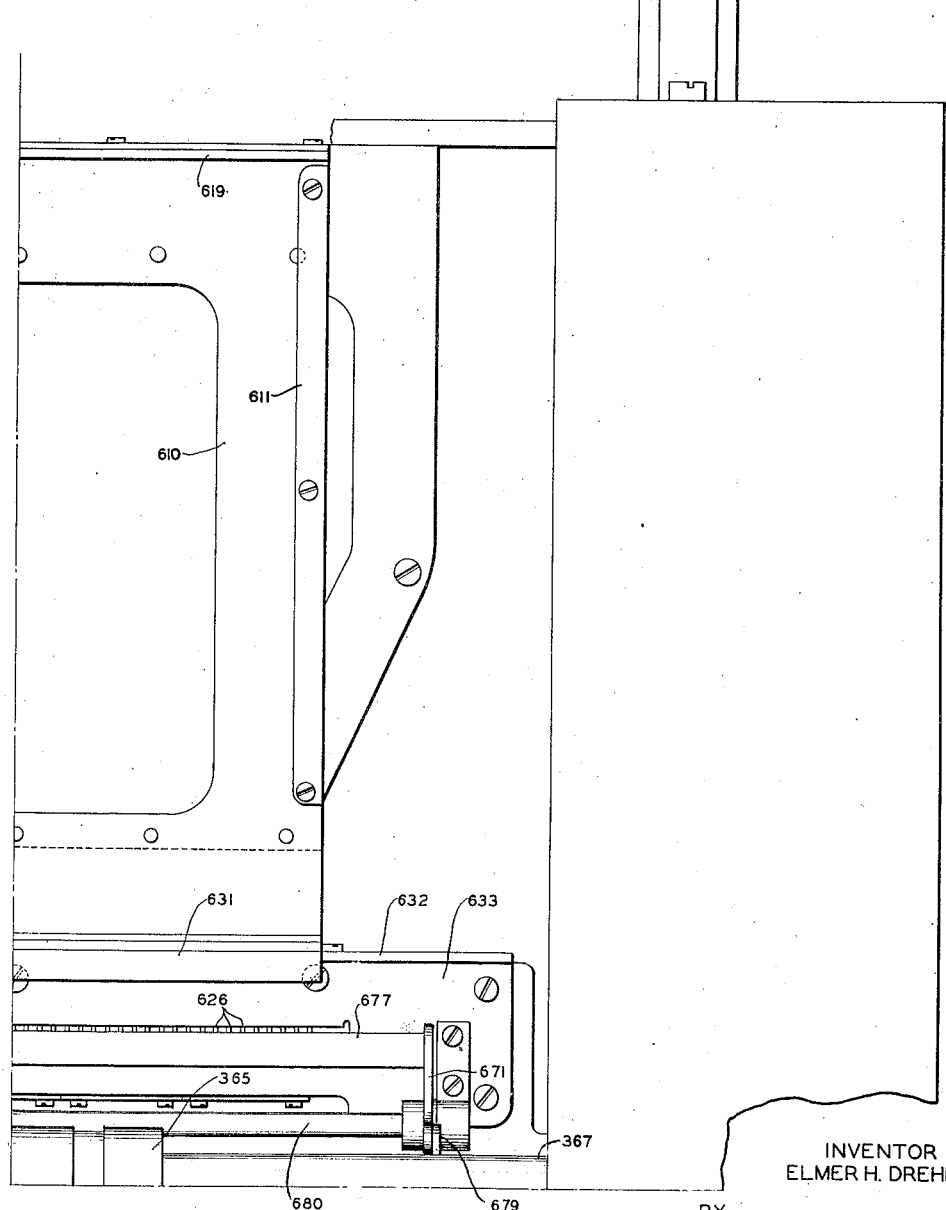

Figs. 19 and 20 combined form a rear view of the base portion of the machine disclosing the punch translator and the punch feed rolls.

Figure 21:
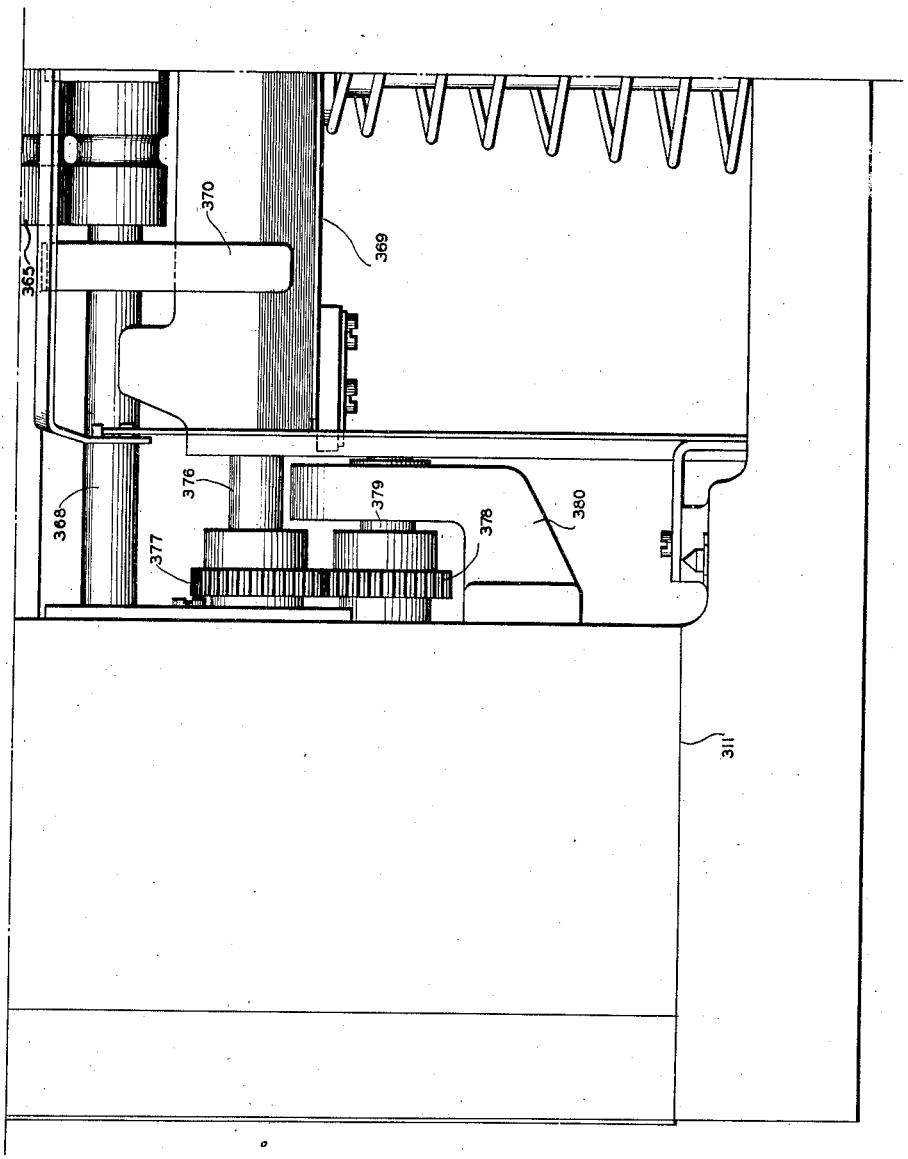

Figs. 21 and 22 combined form a rear view of the lower base portion of the machine, disclosing the card receiver feed roll drive mechanism.

Fig. 23 is a schematic diagram for combining Figs. 17-22, inclusive, to form a rear view of the machine.

Figs. 24 and 25 combined form a vertical front to rear cross section of the multiplying unit taken substantially through the center of the machine.

Figure 26:
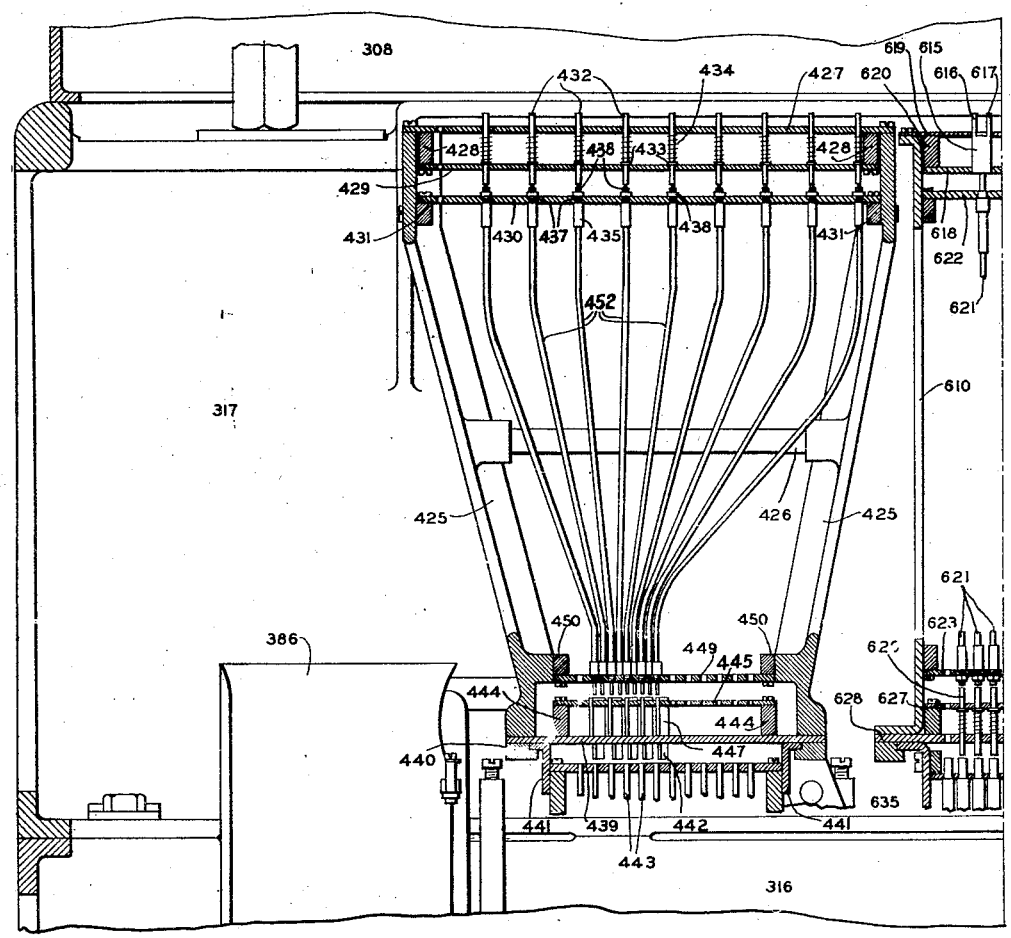
Figure 27:
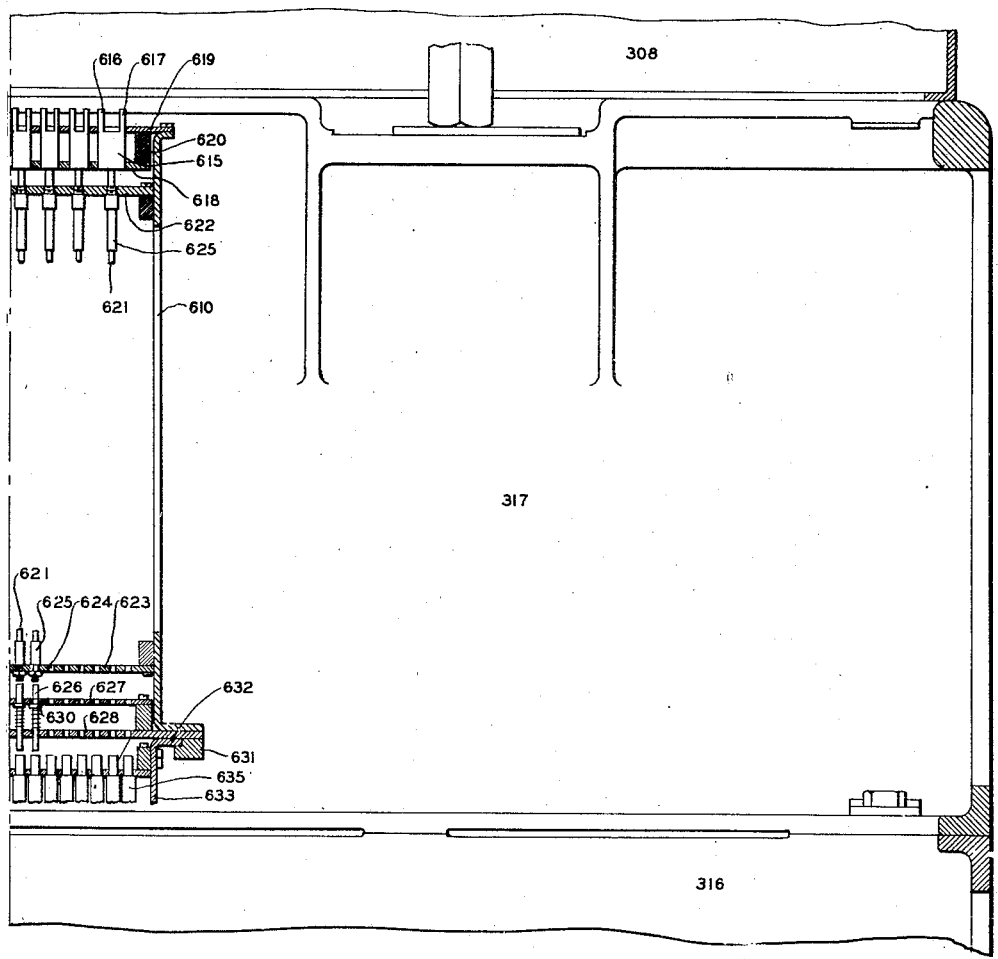

Figs. 26 and 27 combined form a vertical front to rear cross section through the punch and sensing translators taken on the same plane as Figs. 21 and 22.

Figure 28:
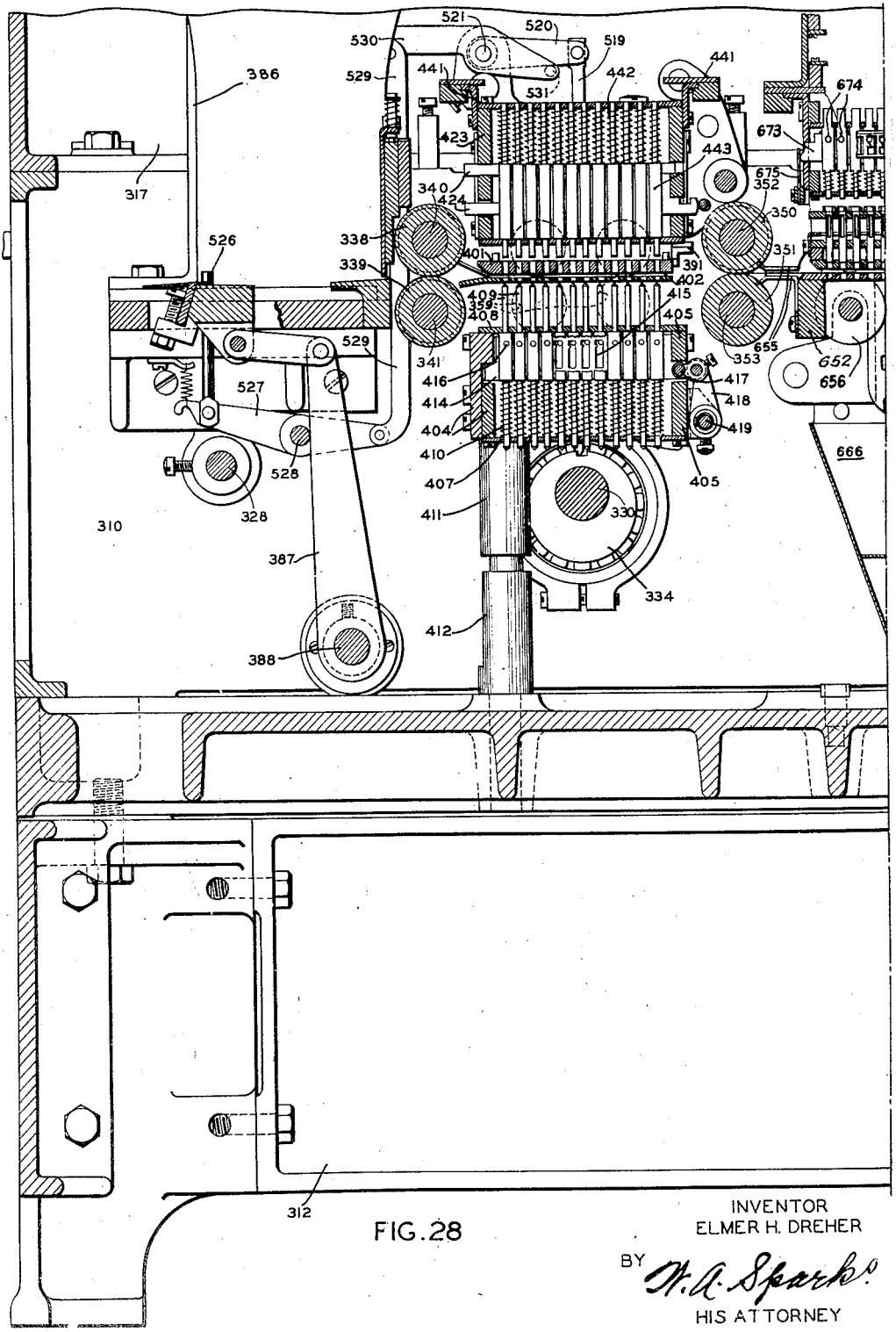
Figure 29:
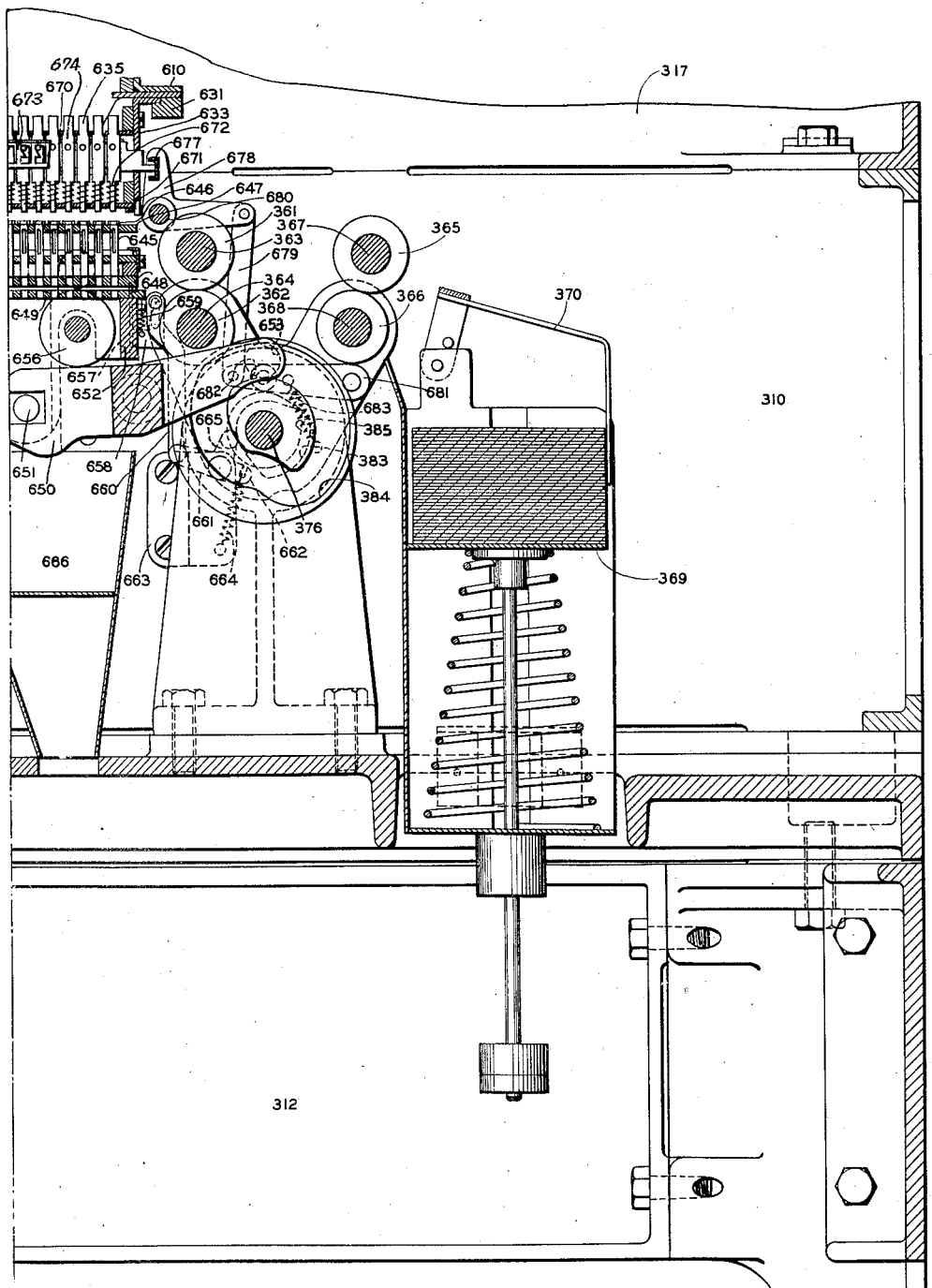

Figs. 28 and 29 combined form a vertical front to rear cross section through the card magazine, sensing mechanism, punching mechanism and receiving magazine, taken on the same plane as Figs. 24-27 inclusive.

Fig. 30 is a schematic diagram for combining Figs. 24-29 inclusive, to form a complete vertical cross section taken substantially through the center of the machine.

Figure 3:
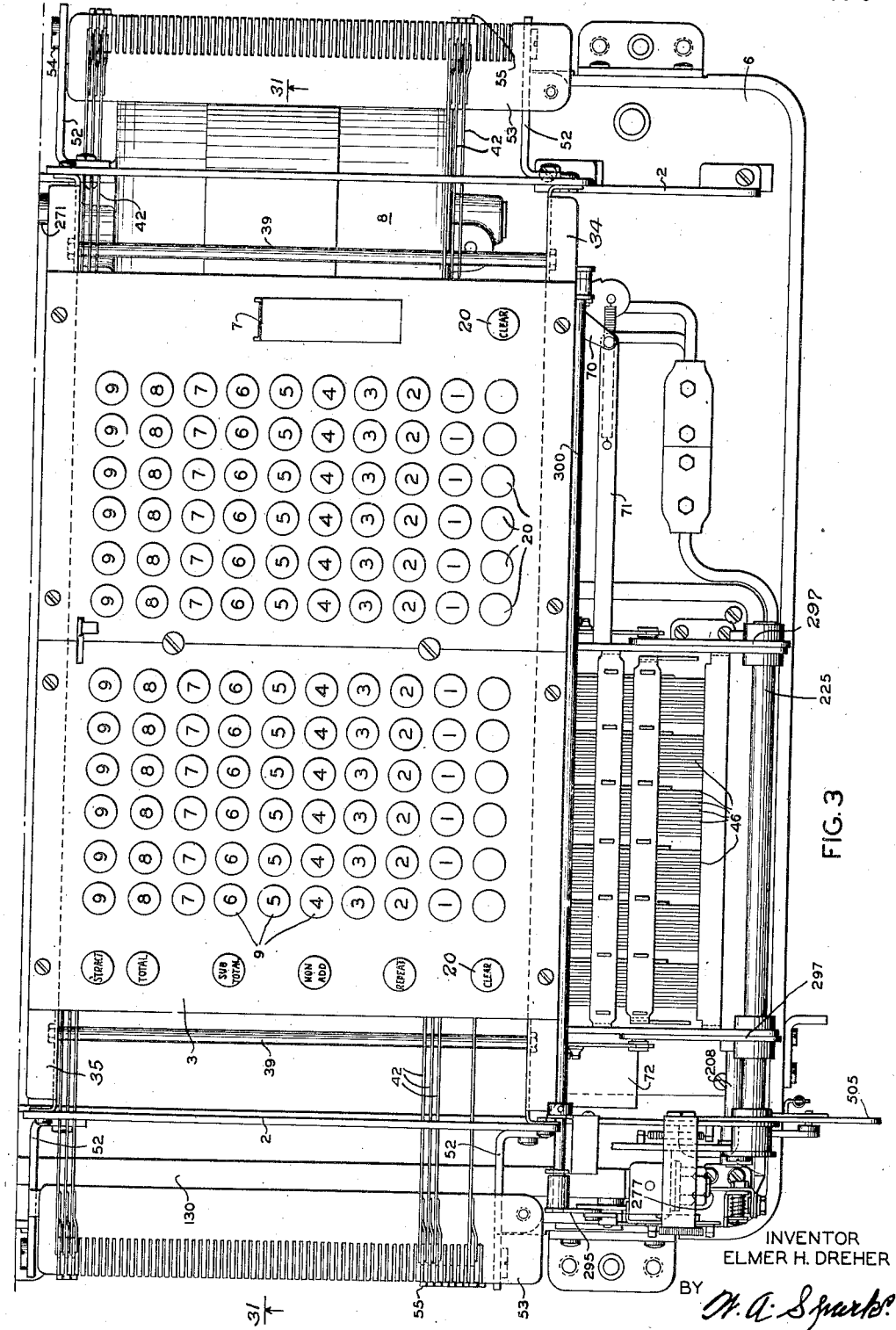

Fig. 31 is a vertical side to side cross section through the multiplying unit taken on line 31—31 of Fig. 3, disclosing the key set up mechanism.

Figure 32:
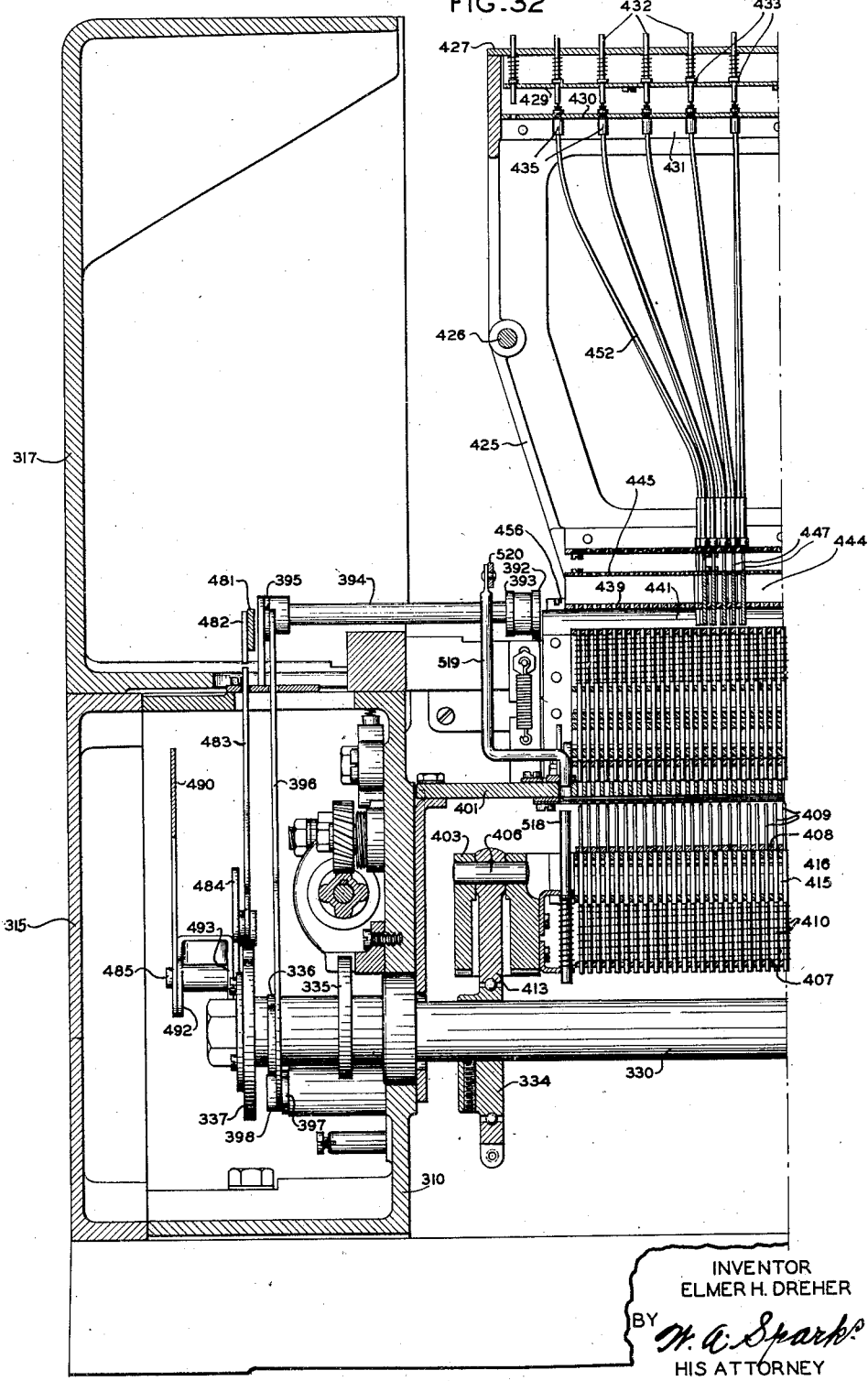

Figs. 32 and 33 combined form a vertical cross section looking toward the rear of the machine, disclosing the sensing translator, sensing and drive mechanisms and associated parts.

Figure 34:
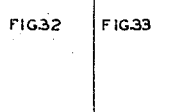

Fig. 34 is a schematic diagram for combining Figs. 31-33 inclusive, to form a cross section of the machine.

Figure 35:
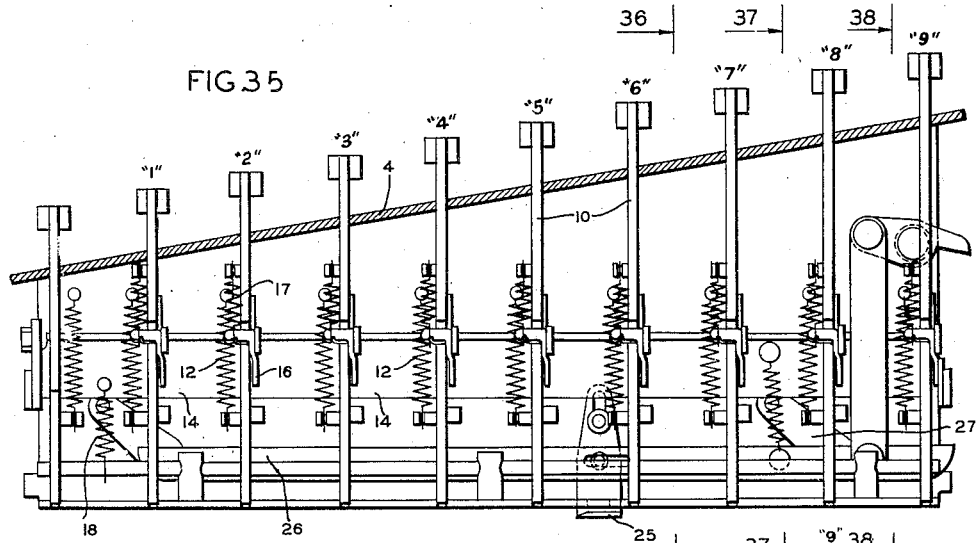

Fig. 35 discloses a key bank in detail.

Figures 36, 37, 38:
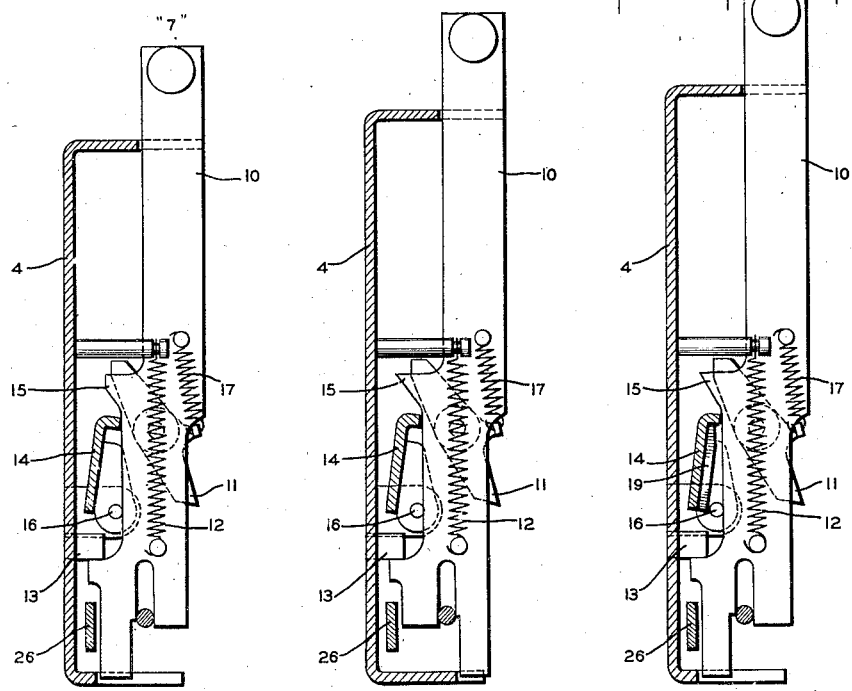

Fig. 36 is a cross section taken through 36—36 of Fig. 35 disclosing the "7" key.

Fig. 37 is a cross section taken through line 37—37 of Fig. 35 disclosing the "8" key.

Fig. 38 is a cross section taken through line 38—38 of Fig. 35 disclosing the "9" key.

Figure 39:
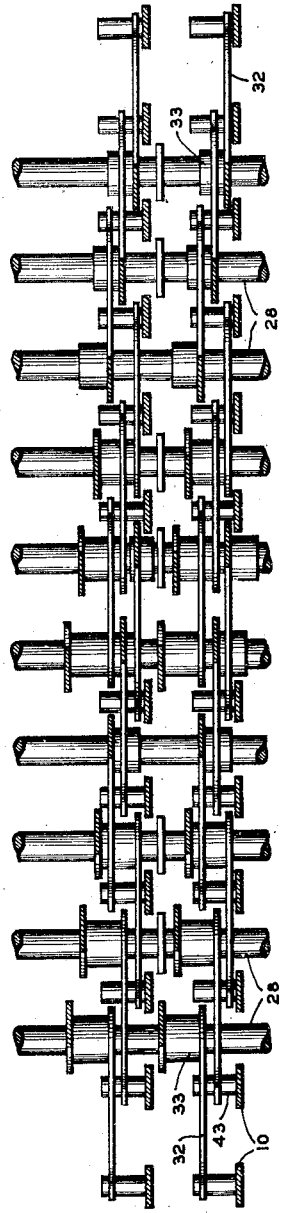

Fig. 39 is a cross section of the key set up mechanism in plan elevation.

Figure 40:
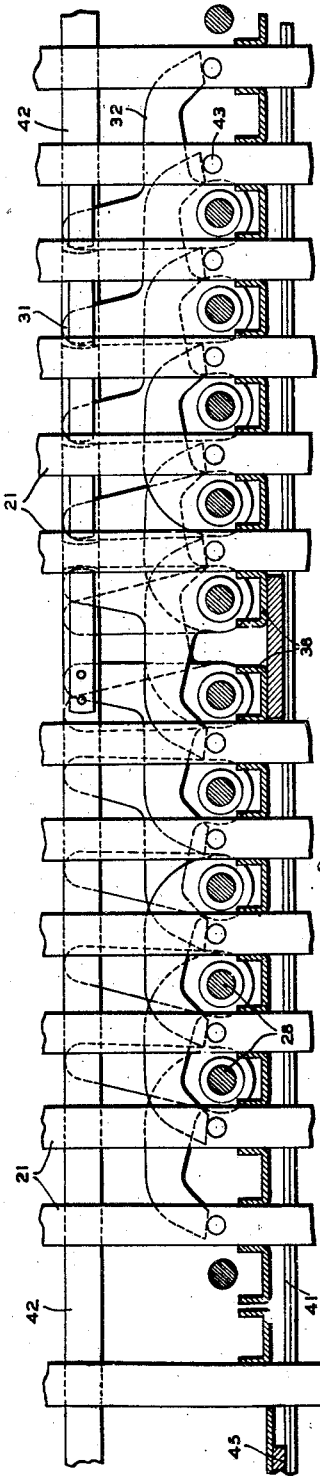

Fig. 40 is a front view of Fig. 39.

Figure 41:
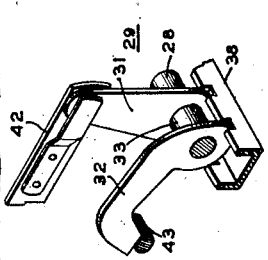

Fig. 41 is an isometric view of a bell crank in the key set up mechanism.

Figure 42:
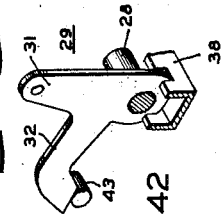

Fig. 42 is an isometric view of a second type of bell crank in the set up mechanism.

Figure 44:
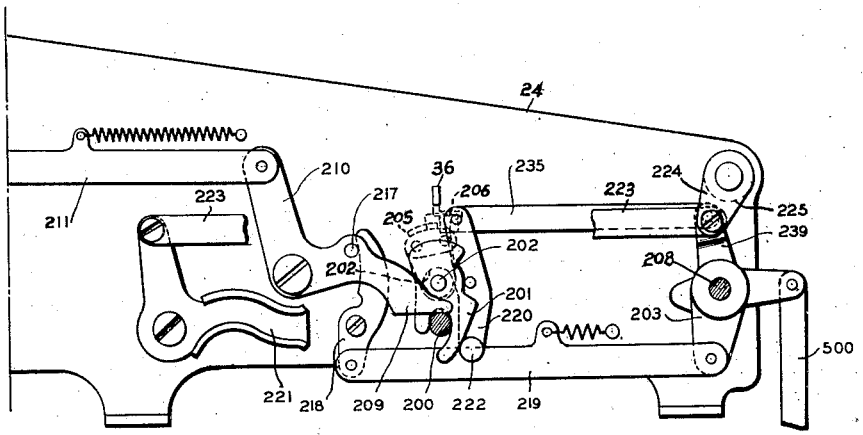

Figs. 43 and 44 combined form a detail view in elevation of a plate on the left hand side of the machine disclosing the operating cams and their associated linkages in normal position.

Figure 46:
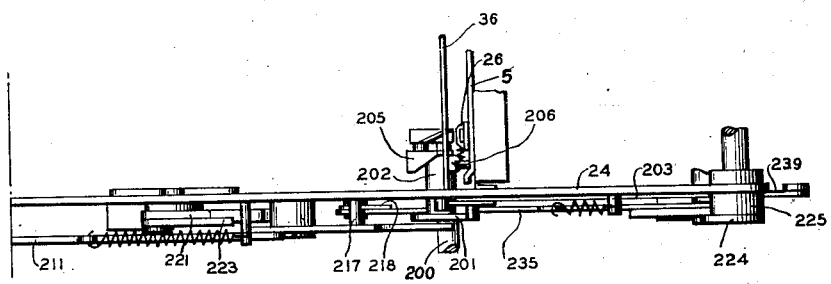

Figs. 45 and 46 combined form a plan view of Figs. 43 and 44.

Fig. 47 is a schematic detail showing the position of the operation control lever and its associated mechanism set for manual operation.

Fig. 48 is a schematic detail similar to Fig. 47 with the parts in position for semi-automatic control.

Fig. 49 is similar to Fig. 47 showing the parts in position for automatic control.

Fig. 50 is a detail view of the automatic stopping mechanisms.

Fig. 51 is a detail view of the base starting mechanism in operated position.

Fig. 52 is a detail isometric view somewhat diagrammatic in form disclosing the principal operating mechanisms in the multiplying machine used in computing a product.

Fig. 53 is an isometric view somewhat diagrammatic in form disclosing the mechanism associated with the total key.

Fig. 54 is an isometric of a detail portion of Fig. 53.

Figure 55:
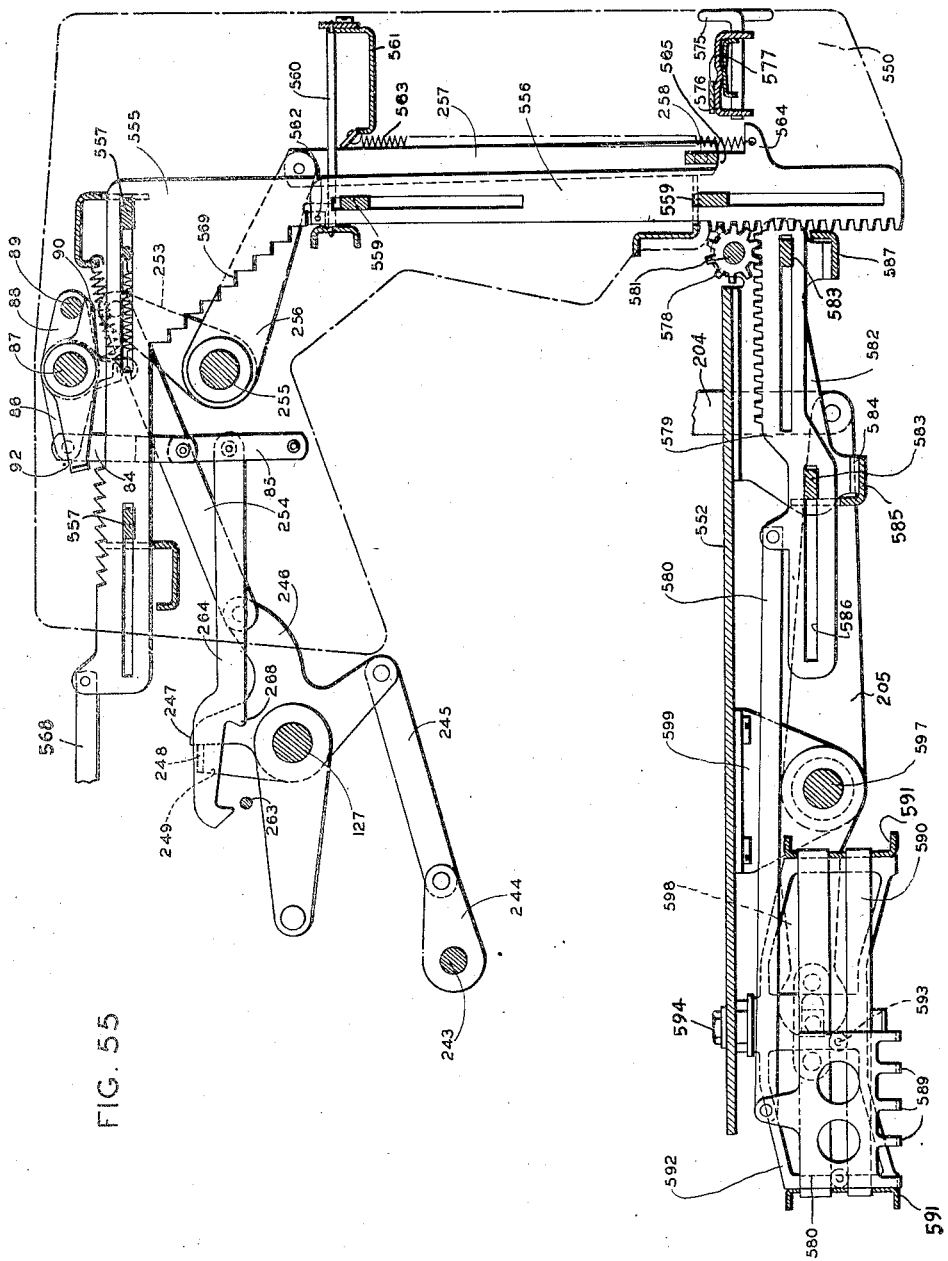
Figure 61:
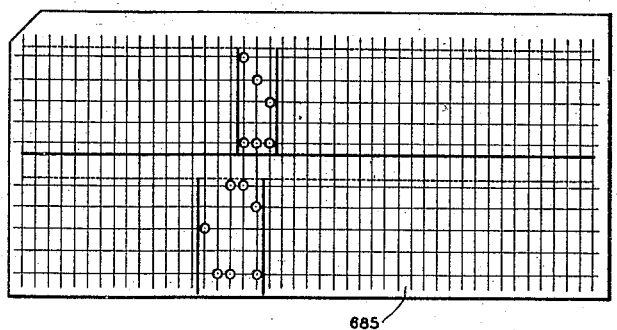
Figure 61A:
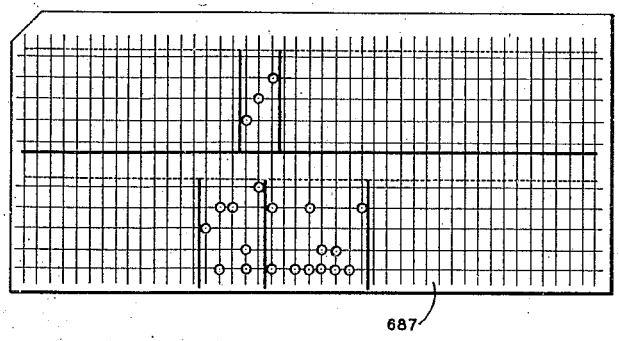
Figure 61B:
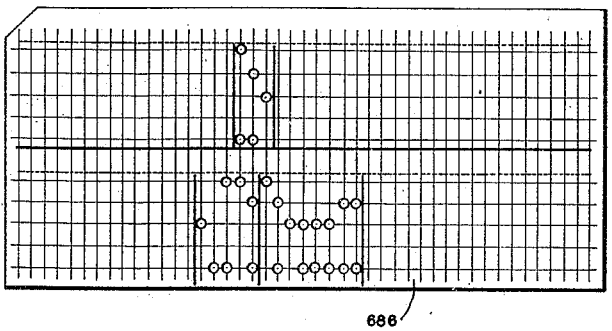
Figure 61C:
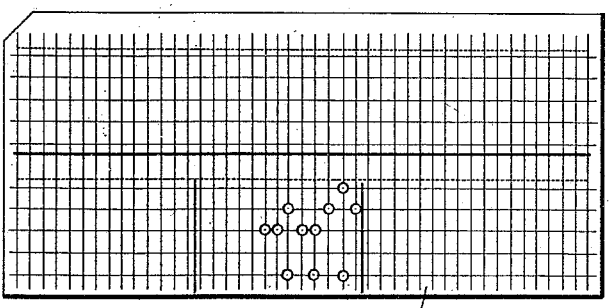

Fig. 55 is a schematic of the linkage operating the punch gag slides.

Fig. 56 is an inverted plan view of Fig. 55.

Fig. 57 is a schematic showing of the 90 column sensing translator.

Fig. 58 is an exploded isometric of the elements of a sensing translator.

Fig. 59 is a schematic diagram of a 90 column punch translator.

Fig. 60 is a schematic diagram of a 45 column punch translator.

Figs. 61, 61A, 61B, and 61C disclose a series of perforated cards used for normal operation of the machine.

Figs. 62 and 62A disclose a series of perforated cards for operating the machine during group multiplication.

Fig. 63 is a wiring diagram for the motors.

Figure 64:
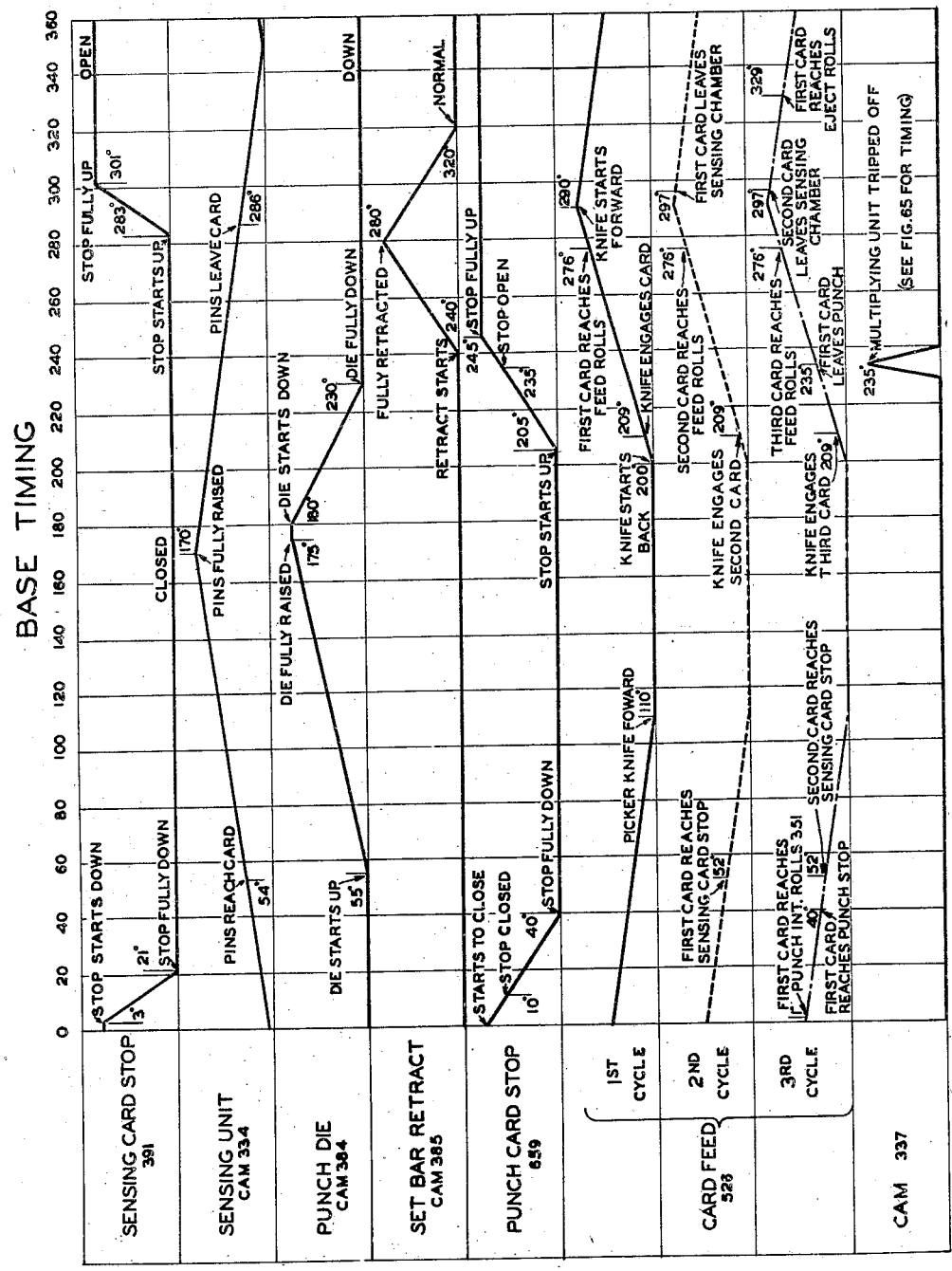

Fig. 64 is a timing chart of the base section of the machine.

Fig. 65 is a timing chart of the multiplying section of the machine.

*General description of operation*

As mentioned above the machine of the invention comprises three mechanisms which are adapted to sense a multiplier and multplicand from a perforated card, and set them in the keyboard of a multiplying mechanism which computes the product.

The sensing mechanism senses cards fed to it from a card magazine and sets up the factors in the multiplying mechanism through the medium of a translator, key set up mechanism and a decoding device.

The multiplying mechanism comprises partial product plates, which in turn control integrating devices which set the product in receivers which control the printing, total accumulating and punch gag setting mechanism.

The mechanism is adapted to print the multiplication factors and the resulting product on a record sheet. These factors are also set up in a series of punch gag setting mechanism. The multiplying mechanism is also adapted to accumulate products to form totals which may be taken out of the machine by the operation of a total key. The totals may be printed on a record strip alone or printed and also punched in a summary card.

The punch gag setting mechanism controls a perforating mechanism through the medium of a translator to punch the product in the same card from which the factors were sensed the card having been fed into the punch during the computing operation.

The machine is adapted to be conditioned for either manual, semi-automatic, or automatic operation by a manually operated control lever.

There are two driving motors in the machine one for operating the multiplying mechanism and the other for driving the feeding, sensing and punching mechanisms. Each of these motors has an individual switch.

For full manual operation the lower motor is disabled, and the multiplication mechanism is controlled manually, the factors and product being printed on a record strip.

When the machine is set for semi-automatic or single cycle operation, the keyboard is operated manually and the multiplication factors and product may be punched in a blank card. To permit this operation a starting button is provided by which cards are fed singly through the sensing head to the punching mechanism, where the factors set up manually in the keyboard and the computed product are punched in the card. The starting button is used to initiate each cycle.

When the machine is set for automatic operation the driving means for the feeding, sensing and punching mechanism is under control of the multiplying component. When a stack of cards is placed in the card magazine and the machine is started by the starting button, the cards are fed seriatim through the sensing and punching mechanisms. The feeding of the cards is automatically controlled by the multiplying mechanism in such a manner that sufficient time is allowed for sensing, computing and punching regardless of the number of digits in the factors.

With the machine set for automatic operation, group multiplication may be effected. The first card of a group is perforated with the multiplier and the following cards may have various multiplicands perforated therein. The repeat key is operated manually and the start button operated. The multiplier is set up by the first card and remains until cleared out by a control card. Each of the multiplicands set in the multiplying mechanism by the following cards are cleared out at the end of each computation and the factors and product are printed and the product is punched in its respective multiplicand card.

At the end of each group a control card is used to operate the clear key to clear out the multiplier and prepare the machine for the next group.

A decoding device is provided in the key mechanism to permit the decoding of perforations in the 90 column code. As is well known in the art the 90 column code uses two perforations to represent even numbers and it is therefore necessary that these be decided into the single digit they represent. The provision of a novel key locking mechanism permits the operation of three keys only one of which is held in the effective position. For instance, a "2" which in 90 column code is represented by a "1" and a "9" perforation is set up in the keyboard by operating the "1," "2" and "9" keys but due to the locking mechanism the "2" key and "9" key are held depressed but only the "2" key is held effective.

Suitable translators for 45 and 90 column codes are provided for inter-connecting the sensing mechanism and the key set mechanism, and the punch gag setting mechanism and the punch mechanism.

The 90 column translators for both the punch and sensing mechanisms are provided with a novel construction whereby one pin in the sensing mechanism controls one or more elements in the set up mechanism and two elements in the gag setting mechanism control one punch gag in the punch mechanism. These translators are described in detail hereinafter.

*Multiplying unit*

The multiplying unit comprises, generally stated, a number of mechanisms and their coordinating connections as follows:

Keyboard and digit decoding mechanism;
Control key mechanisms;
Key set up mechanisms;
Partial product setting up devices;
Segregating mechanisms;
Integrating and product accumulating mechanism;
Printing mechanism;
Total accumulating mechanism and control keys;
Punch and punch gag setting mechanisms;
Actuating and setting mechanism; and
Resetting or clearing mechanism.

The major portion of this unit is disclosed and described in detail in the Patents 1,886,148 and 2,084,831 mentioned above, therefore in the following description wherever possible, the same reference numerals used in the patent have been used herein. As the multiplying mechanism is the heart of the machine it will be described first.

*Keyboard and decoding mechanism*

It will be noted (Figs. 3 and 9) that the keyboard of the machine is divided in two sections, the one on the left containing in this embodiment the multiplier keys, while the one on the right consists of the multiplicand keys. In each section, the keys are arranged in banks, numbered from "1" to "9" inclusive, corresponding to the nine digits of the numerical system, the zero key being omitted as being unnecessary. There is also in each bank, in front of the "1" key, a key whose function it is to clear the settings in its particular bank. There are six banks in each section. To the left of the multiplier section and to the right of the multiplicand section are keys marked "Clear," whose functions are, each to clear the setting of its particular section. To the left of the multiplier section is a bank of control keys marked "Repeat," "Non add," "Sub total," "Total," and "Subtract" whose function it is to respectively repeat or maintain the setting of the multiplier section, render the machine non-additive, take a sub total, take a total, and set the machine to subtract an item. To the right of the multiplicand section is a trip bar 7, whose function it is to start the mechanism in operation only when a control lever described hereinafter is correctly positioned. The mechanism is in this case operated by an electric motor 8.

Secured to frame members 2 (Fig. 31) of the machine is a cover plate 3 having slots therein for accommodating the key shanks 21 of the keys 9. Located below the cover plate and in line with each bank of key shanks is the locking and decoding mechanism for holding the keys depressed in accordance with certain predetermined codes. The key shanks 21, for purposes of assembly, are adapted to cooperate with pins in the key shanks 10 of the locking mechanism.

The locking and decoding mechanisms are located in banks contained in U-shaped frame members 4 (Figs. 31 and 35). These frames are detachably mounted on cross pieces 5 (Fig. 24) secured to the frames 2. In this way the locking and decoding mechanism of a bank of keys may be removed as a unit. The top and bottom of member 4 (Figs. 35–38, inclusive) are slotted to receive the bars 10 which are normally held in raised position by springs 12 against stops 13, while a latch 14, acting over shoulders 15 on the bars, serves to hold any key in depressed position.

Each of the bars 10 is held in its respective slot by the back of the adjacent U-shaped frame member 4 as shown in Fig. 31. Pivoted intermediate the ends of bars 10 is a latch finger 11 held in its normal position by a spring 17. When the key is depressed this finger contacts latch bar 14 and its lower end is rotated until it is flush with the bar. If a key is only partially depressed the lower end will extend beyond the bar and will be caught by a restoring bar described and disclosed in the patent cited above. This restoring bar will also lock all unoperated keys from depression by accidental means after the mechanism is once started through a computing cycle. This is done by contacting the bottom of all unoperated latch fingers 11.

In Figs. 36, 37 and 38 are shown cross sections of the seven, eight and nine decoding mechanisms in a bank. It will be noted that the shoulder 15 (Fig. 36) of the odd or seven key is shorter or stubbed as compared with the shoulder 15 (Fig. 37) on the seven or eight key. This is typical of all the odd and even keys in the bank except the nine key which has a full shoulder similar to the even keys.

The latch bar 14 is pivoted at 16 and is held with its upper edge against the edge of the bars by a spring 18. When a bar is depressed the edge of bar 14 rides on the lower face of shoulder 15 until the lip snaps over the top edge thereby locking the key in its depressed position. It is obvious that in certain instances if any other key than that already operated is depressed the bar 14 will be again rocked and the operated key released. It is also obvious that the operation of an odd key with its stub shoulder 15 will not release an even or nine key but will release any other odd key. Whereas any even or nine key will release any and all operated keys when operated. Fastened to the bar 14 in line with the nine key is a lug 19 which when the nine key is operated will rock the bar 14 in a counter-clockwise direction to such an extent that none of the odd keys can be locked up due to their stub shoulders 15 being shorter than the shoulders on the even keys.

This type of mechanism is provided to decode or convert the data taken from the cards in the machine into data which will operate the multiplying mechanism.

There are two types of cards which may be used in this machine namely 45 column and 90 column cards. In the 45 column card each digit is represented by a single perforation which will cause the operation of a key corresponding to the digit. That is, a hole representing "6" punched in the card will cause the operation of a "6" key as described below.

In the ninety column cards however, the even digits are represented by two perforations i. e. each odd digit and "9" represents the next higher even digit. (1 and 9=2, 3 and 9=4 etc.) and each of the odd digits is represented by its own perforation.

If a "2" is perforated in a card the sensing mechanism will effect the depression of the "1," "2" and "9" keys. However, when the "9" key is depressed, no other odd key can be locked down by latch 14, therefore, only the "2" key will remain effective.

The clear key 20 associated with each bank is provided to permit the erasure of any error in setting up the various factors of multiplication. This key is shown in Fig. 10 of the above mentioned patent and is provided with a long shoulder 15 for rocking the latch bar 14 to its extreme disabled position.

Referring now to the operation control keys located to the left of the multiplier section of the keyboard (Fig. 3) it will be noted that there are six of these control keys. Reading from front to rear of the keyboard they are "Clear," "Repeat," "Non-add," "Sub total," "Total" and "Subtract" keys. Due to the fact that these keys are all described and disclosed in the above mentioned patents, only those keys which have been altered to effect operation of the present invention will be described. These keys are the "Clear" and "Total" keys.

The "Clear" key is adapted to be operated by the sensing head through the medium of the key set up mechanism and the "Total" key is operated manually.

The operation of the "Clear" key and its associated linkage is the same as described in detail and disclosed in the Patent 1,886,148. Upon the operation of the "Clear" key all the latches 14 are rocked in a counter-clockwise direction releasing the operated digit keys. Associated with the clear key is a link 36 (Fig. 25 and Fig. 10 of the patent) which is operated by the cross head of the multiplying mechanism on its return stroke to operate the mechanism associated with the "Clear" key to release all depressed factor keys. If however the "Repeat" key is operated, a pin 37 (Fig. 10 of 1,886,148) connecting the release bar to the clearing mechanism is withdrawn, the clearing mechanism is disabled thereby preventing the clearing of the multiplier section of the keyboard by the cross head on its return stroke.

*Key set up*

The above described digit key mechanisms including the "Clear" key may also be operated by the sensing pin box through a Bowden wire translator which cooperates with the set up mechanism shown in Figs. 31, 39, 40, 41 and 42. In Fig. 31 it will be noted that there are two units constituting the set up mechanism, one above the key mechanisms and the other below the multiplying mechanisms. These two units are interconnected so that the key mechanism may be actuated at will either manually or by perforations in a data card. The interconnecting means comprises a bell-crank and link individually associated with either the manual key shank 21 or the set bar 30 which is actuated by the sensing mechanism. These two sets of bell-cranks and links being similar in construction only one description of the construction is believed necessary. These connections are shown in enlarged detail in Figs. 39-42 inclusive. There are two forms of bell cranks used, namely the bell crank shown in Fig. 42 in which both arms 31 and 32 are integral and the bell crank shown in Fig. 41 in which arms 31 and 32 are mounted on opposite sides of a boss 33.

The set up mechanism is mounted in a frame (Figs. 9 and 31) comprising in the case of the upper unit, front and rear plates 34 and 35 which are secured to the frame members 2. In the case of the lower unit the plates 34 and 35 are secured to the base plate 6 of the multiplying unit.

Secured between the front and rear plates are a series of rods 28 on which the bell cranks are loosely pivoted. Secured in the frames 34 and 35 and located directly under each of the rods 28 is a U-shaped member 38 which is slotted at correct intervals to position the bell cranks. The edge of each arm of the bell cranks is positioned in a slot in member 38 (Fig. 41), thereby preventing endwise movement of the bell crank on its respective rod 28. These U-shaped members are reduced on their ends and positioned in slots cut in the plates 35 and 34. The rods 28 are held in place in the plates by means of screws and the plates themselves are held in assembled relation by rods 39 and bars 40.

Each of the key shanks 10 described above pass between the U-shaped members 38 which act as guides therefor. Cross strips 41 secured to a supporting bar 45 carried by the front and rear plates 34 and 35, act as separators between the horizontal rows of key shanks. The same construction is used in the lower unit. Each shank 10 is provided with a key 9 to facilitate manual operation of the key mechanism and a pin 43 is riveted therein which is adapted to cooperate with its associated bell crank as hereinafter described.

To each of the vertical arms 31 of the bell cranks is secured a link 42. The connection between these members is shown in detail in Fig. 41. The arm 31 is provided with a hole in which is positioned a pin riveted to the link 42. Also riveted to the link 42 is a strip of spring metal which forms a clip to prevent the arm 31 from being dislodged from the pin.

The links 42 extend laterally to the left and right from the center. In the upper unit they extend through a slot in the frame plates 2 and in the lower unit they extend out from under the base plate 6 of the multiplying mechanism. Secured to the frame plates 2 are two brackets 52 formed as shown (Fig. 31) with a comb 53 connecting them together at the top. A similar comb is secured to the base plate 6 to guide the lower ends of the arms 55. The brackets 52 are formed with a depending ear provided with a hole for accommodating a rod 54 on which are pivotally mounted a plurality of arms 55 which form an equalizing arm connection between the links 42 of the upper and lower bell crank units. The arms 55 are positioned in the comb 53. These arms are provided with holes at each end and the links 42 are connected thereto in the same manner as that described above for arms 31 and the links 42.

The arms 55 are pivoted below their mid points on the rod 54 due to the fact that the sensing pins do not travel as far as the key shanks. Therefore the lateral movement of the lower links 42 is slightly less than that of the movement of the upper links.

When a sensing pin in the sensing mechanism finds a perforation in a card, it passes through in a well known manner and raises the associated Bowden wires in the translator which elevate the corresponding bars 30. Each of these bars is provided with a pin 43 which cooperates with its associated bell crank. The elevation of a bar 30 in the right hand side of the machine causes a pin 43 to rotate its associated bell crank in a counter-clockwise direction about its pivot, thereby drawing lower link 42 toward the center of the machine and rocking arm 55 clockwise to draw the upper link 42 outwardly, thereby rotating the upper bell crank in a clockwise direction. This rotation of the bell crank forces link 21 down through the cooperation of the horizontal arm 32 of the bell crank with the pin 43 thereby operating the selected key of the multiplying mechanism.

It will be obvious after referring to Fig. 31 that any of the keys 9 may be operated manually without affecting any of the above described mechanism due to the fact that the pin 43 is below the horizontal arm 32 of the bell crank thereby allowing the keys to be depressed independently of the bell crank linkages.

In the case of the "Total" key the linkage disclosed and described in the patent referred to above has been amplified to permit the automatic operation of the total mechanism to set the punch gag setting mechanism. As this key is closely associated with the taking of totals it will be described hereinafter with the accumulating mechanism.

*Partial product setting up devices*

Arranged below each bank of keys is a stop bar 22 (Figs. 24 and 52) having lugs 23 positioned in the path of the key shanks 10 when depressed. These bars serve to transmit the key settings to the multiplier and multiplicand setting up devices. A zero stop 25 (Fig. 35) is normally arranged in the path of one of these lugs 23, so as to arrest the bar in zero position; and is connected with a horizontal bar 26 which is arranged to be struck by a shoulder on any depressed key shank, so as to depress the bar. The bar 26 is secured to the stop 25 by a pin and cam slot connection so that any movement of the bar causes the lug to be lowered out of the line of the lugs 23 and thus permit free movement of the bar 22 until arrested by the shank of any depressed key.

Each of the bars 22 has a lug 216 formed on the rear end thereof adapted to cooperate with a bail 215. The bail maintains the bars in their normal position and is under control of a cam lever 210 (Fig. 44) which is operated by the cross head as described hereinafter. When a digit key is operated the zero stop 25 is removed and the bars 22 are in condition to be drawn forward by springs 138 as soon as the cam lever 210 removes the bail 215, until a lug 23 contacts the leg of a depressed digit key.

The stop bars 22 located below the multiplier keys are connected by a pin and slot connection to an L-shaped arm 67 pivoted at 68. This arm is adapted to raise and lower a tappet 57 and a stop member 58 which cooperate with the partial product plates 46. The stop bars associated with the multiplicand keys are pivotally connected to L-shaped arms 70 which are in turn connected by link 71 to a plate 72 (Figs. 3 and 24) and disclosed in detail in Fig. 17 of the Patent 1,886,148. There is one of each of these plates for each bank of multiplicand keys. The plates 72 have mounted thereon a coupler 74 and a pair of positioning members 83 for the segregating mechanism described below. The partial product plates 46 are old in the art and are described in detail in the above mentioned patent, therefore they need no description at this time. Formed integral with the partial product plates is a bar 45 having notches 76 formed in the lower edge thereof for cooperation with the lugs 75 on couplers 74.

The tappet 57 and stop member 58 (Fig. 24) are mounted for vertical movement in a pair of slotted bars 61 and 62. The bar 62 is stationary while bar 61 is adapted to be rocked counterclockwise by cross head 64 operated in turn by a cam plate 297 (Figs. 24 and 44). This cam plate is operated by a cam 221 through the medium of link 223, arm 224 and shaft 225. In moving to the left the bar 61 carries the tappet 57 and the associated partial product plates along with it.

From the above it will be seen that if for instance the "8" multiplier key is depressed so as to project its shank into the path of a lug 23 on its associated stop bar 22, then the bar will move to the "8" position causing the stop and tappet members 58 and 57 to be raised to that position. This takes place before the stops are moved by the cross head 64. If now the tappet 57 is moved to the left all of the bars 45 in that group will be carried with it until the partial product plates with their "8" steps are arrested by the stationary stop 58. It is also obvious that all the other groups will remain in their zero positions as there has been no movement of their respective tappets 57. The positioning of bars 45 by the tappet 57 will cause them to assume positions in accordance with the partial products of "8" as multiplied by 1, 2, 3, 4, 5, 6, 7, 8, 9.

It is now necessary to select the correct pair of bars 45 corresponding to the multiplicand. This is done by the coupler 74 mentioned above carried by plate 72. Each of the couplers has a lug 75 arranged to enter a slot 76 in bar 45. The couplers are arranged in pairs to insure co-operation with the bars 45. The lugs 75 are so spaced that when one lug is in the notch 76 of the units bar 45 the other lug is in the notch of the tens bar 45.

It will now be seen upon reference to Fig. 52 that if for instance the "6" multiplicand key is depressed the slide 72 associated therewith will place the lugs 75 in the "6" position with respect to bars 45 and when the bars are shifted the couplers 74 will be shifted to positions determined by the "8" tens and units steps on the partial product plates 46. When the bars 45 are positioned by tappet 57 they will assume positions in accordance with the product of 6×8 namely 48. That is the tens bar 45 will be in a "4" position and the units bar will be in an "8" position.

*Segregating mechanism*

Located below the plates 72 (Figs. 52 and 24) are the elements of the segregating mechanism. Mounted on a series of hollow shafts 91 running diagonally of the machine are a plurality of sleeves 93 termed receivers. The sleeves 93 are provided with stepped portions 94 which are cut equally to represent the digits from 1 to 9. These sleeves are telescoped one inside the other and each sleeve is provided with a slot 96 through which extends a finger formed on a sliding collar 98. The finger is adapted to contact with the steps cut on the telescoped portion of the adjacent receiver. This collar has an upstanding rim or edge which is adapted to be positioned in a yoke 99 dependent from and controlled by the slidable positioning element 83 under control of the couplers 74. When the bars 45 have been positioned as described above, the collars 98 are positioned in accordance with the partial products in the above instance "48." The collar on the first receiver on the first shaft 91 is positioned to contact the "8" step on the sleeve 93 and the collar on the first receiver of the second shaft is positioned to contact the "4" step. Each shaft 91 has an individual torsion spring located in the center which is anchored on an adjustment screw 105 (Fig. 9) in the front end and is secured to the last or carry sleeve as shown in Fig. 23 of the Patent 1,886,148. The tension is adjusted by the screw 105.

*Product accumulating and integrating mechanism (Figs. 2, 9, 17, 18, 24, 25, 52)*

The means for accumulating the partial products in the receivers or sleeves 93 will now be described as well as the carry mechanism for transferring excess accumulations from one bank to the next higher bank. All of this mechanism is disclosed and described in detail in the above mentioned patent, therefore only a short description will now be given.

Figure 4:
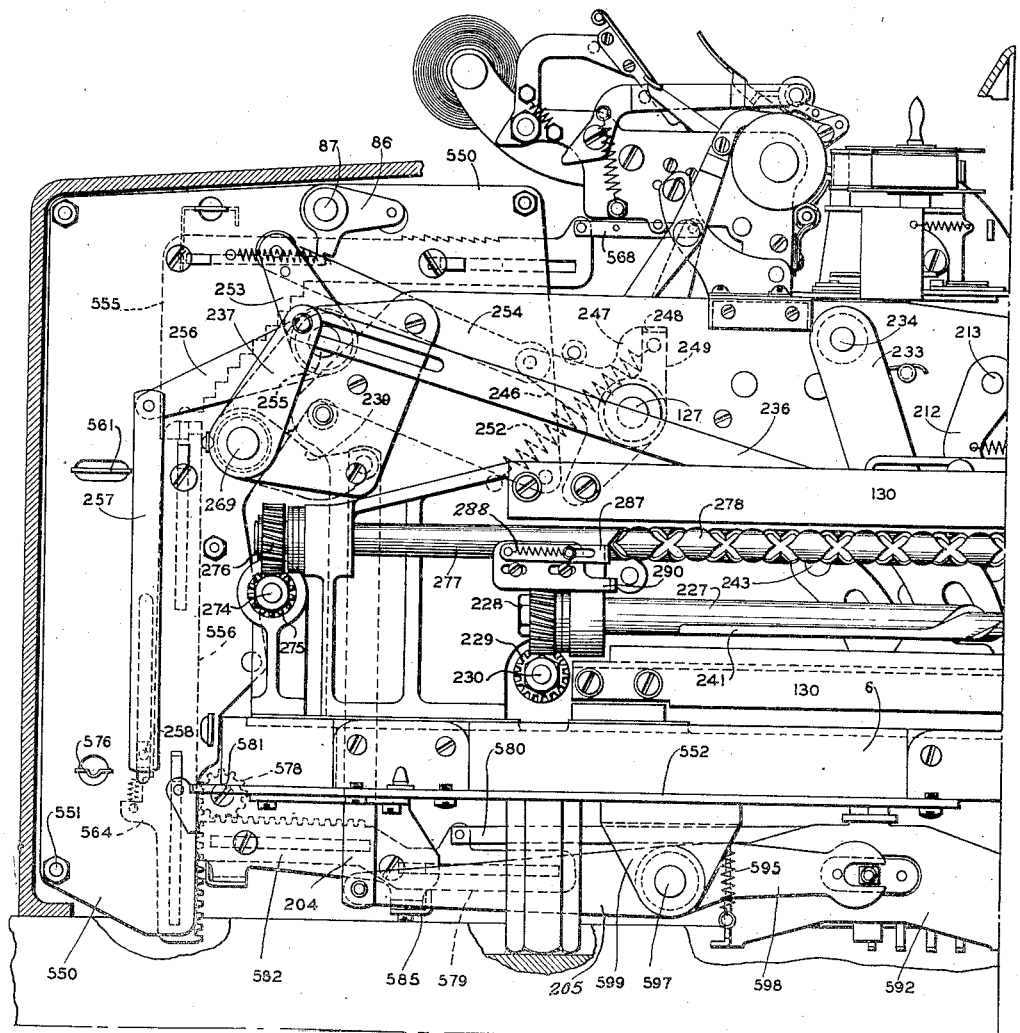

After the collars 98 have been positioned in accordance with the partial products, the shafts 91 are rotated to release the tension on the torsion spring above referred to, thereby permitting the fingers on collars 98 to limit against the stepped portions of the sleeves 93. The shafts 91 are driven by a cross shaft 230 (Figs. 4 and 18) which is in turn driven by a shaft 227. The shaft 227 has a spiral gear 240 cut therein which cooperates with the cross head. The shaft 230 is geared to the shaft 227 by mitre gears 228 and 229.

Secured to the end of each shaft 91 (Fig. 25) is a receiver 110 having stepped faces 94 cut therein corresponding to the digits 1-9 inclusive. These receivers are positioned in accordance with the partial products in the receivers 93. It is obvious that the digits in these products may exceed 9, therefore a carry mechanism is provided in the form of a collar 112 on the last receiver which has a cam face 113 thereon which cooperates with a toothed arc 114 which controls a setting finger 118 which acts on the last receiver on the next adjacent shaft to transfer the carry over one to the last recevier 93 of the next higher order.

If the example above used is followed, the receiver 110 of the first or units order will stand at "8" and the receiver of the tens order at "4."
If the multiplicand set up had been "66" then the receivers 93 would be set as follows: The first receiver 93 on the first shaft will be positioned at "8," the first receiver of the second shaft at "4," the second receiver of the second shaft at "8" and the first receiver of the third shaft at "4." If the shafts are now released the product receiver 110 on the first shaft will be set to "8." The second shaft will cause the two receivers thereon to accumulate the "4" and "8" settings and the product receiver is rotated to "2" and the excess one is carried over to the third shaft where is is accumulated with the "4" to cause the product receiver to be set at "5" thereby setting up the total "528."

When the integrating mechanism is restored to normal the shaft 230 is rotated in a reverse direction to wind up the torsion springs and reset the partial product receivers 93 to zero or normal position.

*Printing mechanism (Figs. 2, 25, 52)*

Slidably mounted in cooperative relation above each receiver 110 (Fig. 52) is a slide 120 guided in a support 121 and provided with a lug 122 urged against the steps 94 on the receiver by a spring 123, but normally held free therefrom. This slide has connected thereto one end of a flexible link 124 (formed of a closely wound spring) guided by a tube 125 also mounted in the support. The other end of the link 124 is attached to a sector 126 loosely pivoted on the shaft 127 and having pivoted thereon a type bar 128 which is provided with type, running from "0" to "9," arranged to cooperate with a platen 131. In the normal position, the type bar is held away from the platen by a spring and the "0" type is below the printing line. All the product bars are connected in the same manner and they are shown assembled in Fig. 2 at the right of the machine. These bars are moved against the platen by any well known type of print actuating mechanism, one type of which is described in detail in the Patent 1,886,148.

Figure 2:
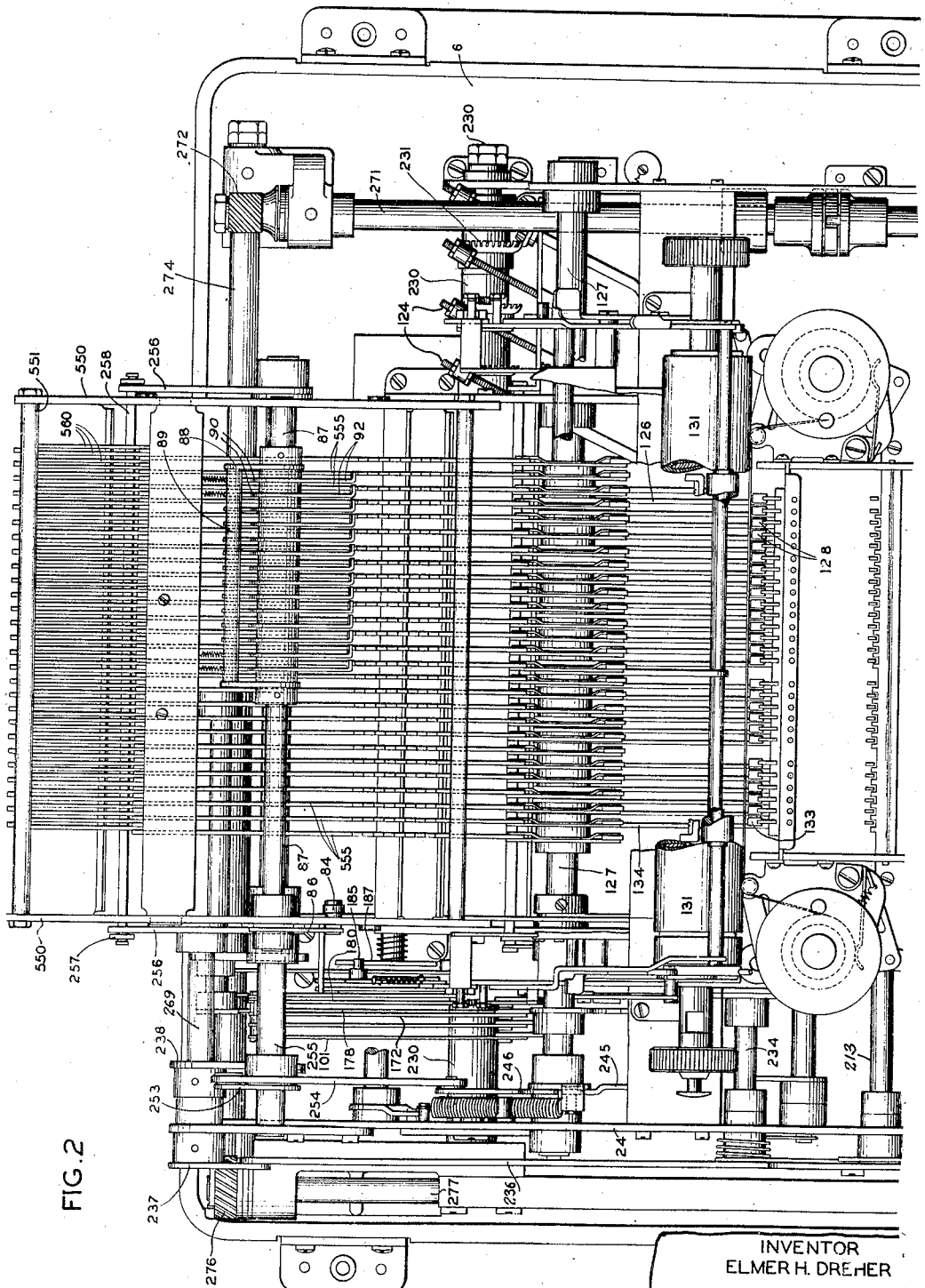

The multiplier and multiplicand type bars 133 are similar to the product bars and are similarly actuated and supported by arm 134, also pivoted on the shaft 127. Each of these arms 134 is connected by a flexible link 135 (similar to the link 124, and guided in a similar tube 136) to a bar 137 slidably mounted in the machine and positioned in line with the stop bars 22. Each bar 137 is connected by a spring 138, which causes a laterally projecting pin 139 on the bar to bear against the bar 22, as shown. It will, therefore, be seen that the settings of the multiplier and the multiplicand will be set up in the type bars 133, these bars as shown in Fig. 2 being grouped in appropriate spaced relation. Accordingly, the multiplier, the multiplicand and the product can be recorded on a record sheet on platen 131, as shown in Fig. 52.

Each product sector 126 (Fig. 25) has an alignment sector 132 formed on the forward end thereof and an accumulator sector 140 formed on the other end. Each accumulator sector cooperates with a total accumulator wheel 147.

*Total accumulating mechanism and control key (Figs. 25, 53 and 54)*

The product sector 126, as mentioned above extend rearwardly and are formed with total sectors 140 (Fig. 25) each of which is slidably mounted on the sector 126 by a pin and slot connection and is retained by a spring 141 to permit yield. A frame, consisting of connected side plates 143 mounted on the base 6 is arranged beyond the sectors 140. Pivoted at 144 in this frame is a carrier 145 provided with a shaft 146 having arranged thereon a series of pinions or accumulator wheels 147 arranged to mesh with the sectors 140. Cam arms 148 fixed to a shaft 149 cooperate with cam rolls on the ends of the shaft 146 to move the pinions 147 into and out of mesh with the sectors when the shaft 149 is oscillated by the crosshead 280 as hereinafter described.

Arranged to mesh with each pinion is a carry rack 154, sliding on cross bars 155 connecting the side frame sides and spaced relatively by engagement with notches in the cross bars as is usual in machines of this type. Each rack 154 is moved to depressed position by a spring 157 and raised by a bail bar 158 engaging lugs thereon. Each pinion 147 has a carry tooth 160 arranged to engage a pawl 161 pivoted on a bar 156 on the carrier 145 and held by a spring 162 in engagement with tooth 160. This pawl has a laterally extending lug 163 normally in the path of a laterally projecting lug 164 on the rack 154 of the next higher order, while the laterally projecting lug 165 on a latch 166 raised by a spring 167 is arranged to take behind a shoulder 168 on the pawl 161. The lug 165 also projects laterally sufficiently to be in the path of the lug 164. This mechanism is shown in detail in Fig. 7 of Patent 2,084,831.

The operation of this mechanism is such that, when the carrier 145 is moved to mesh the pinions 147 with the sectors 140, these pinions will move out of mesh with the racks 154 which are at that time held in raised position by the cross bar 158. The sectors 140, are therefore, free to turn the pinions to the extents required by the settings. The movement of any pinion beyond the "9" position causes the tooth 160 thereon to swing the pawl 161, which is retained in position by the latch 166. Before the carrier 145 moves back to mesh the pinions 147 with the racks 154, the latter are moved up so that the lugs 163 on the pawls 161, which have not been shifted, will move beneath the lugs 164 of the corresponding racks. The lugs 163 of the pawls which have been shifted will however, move out of the path of the corresponding lugs 164. Accordingly, as the cross bar 158 moves down, the springs 157 will move the racks which are free, while the others will be retained by the interaction of the lugs 163 and 164. In this way carrying is accomplished from one pinion to the pinion of the next higher order.

At the termination of the downward movement of any freed rack, the lug 164 thereon will engage the laterally extended lug 165 so as to release the pawl and permit it to return to normal position; and upon the next succeeding upward movement of that rack, it is again retained by the interaction of the lugs 163 and 164, unless the corresponding pawl has again been shifted. It will be understood that while the pinions 147 are free to turn when traveling in a counter clockwise direction, their return is limited by the interengagement of the teeth 160 with the pawls 161 corresponding to zero position. In that way the settings of the pinions can be transferred to the sectors 140.

In taking a total of a series of products or other items, set into the accumulator, the total then appearing is set into the type bars and printed, and punched in the card if desired. Thereafter the accumulator is restored to zero position. To accomplish this result, the pinions 147 are moved into mesh with the sectors 140 before the latter are set and are again moved out of mesh before the sectors are returned.

Mechanism for controlling this operation has been described and fully disclosed in the above Patent 2,084,831 and is shown in Figs. 53 and 54 and reference also being had to Fig. 25. In view of the former detail description only a general description will be included herein. The shank 10 of the "Total" key has a pin 170 (Fig. 53) engaging one arm of a bell crank 171, the other arm of which is connected to one end of a link 172, the other end of which is connected with the link 101. The link 172 is also connected with a three armed lever 173, the depending arm of which acts behind a shoulder on the slide 174. A laterally extending lug 175 (Fig. 20 of the above patent) on the lever 173 acts on an arm 176 on the lever 177, which connects with a link 178 carrying the lug 179. The link 180 (Fig. 54) has a laterally extending lug 181 and has its forward end bearing on a pin in the lever 173. This link 180 also has a laterally projecting pin 182 in the path of one arm of a lever 183 pivoted on the frame and provided at its other end with a cam face 184 positioned in the path of a pin 185 on the ram 186, the end of the cam face having a straight portion 187. A latch 188 pivoted on the ram 186 has a laterally projecting lug bearing on the upper edge of the ram and is under the tension of a spring 189. This latch is provided with a notch arranged to be engaged by a laterally projecting lug 190 on the link 180. The lug 181 on the link 180 is arranged to be received in a slot 192 in the ram 193 and between shoulders 194 thereof. The bell crank lever 195, is arranged to be struck by a shoulder 196 on the link 172. The link 180 when in normal position carries the lug 181 below the ram 193.

A pin 259 formed on bar 172 is adapted to engage a depending arm 260 on one leg of a U-shaped member 261 pivoted on shaft 127. The member 261 has an arm 262 formed on the other leg in which is secured a pin 263 which is adapted to elevate and guide a link 264. Secured to shaft 234 is a bell crank 265 to which is pivoted a fork shaped arm 266 adapted to straddle the shaft 127. The upper leg of the fork member carries a pin 267 which is adapted to cooperate with a shoulder 268 formed on the link 264. The link 264 (Fig. 25) is secured to link 85 of a toggle comprising arms 84 and 85 which are connected to lever 86 secured to shaft 87. A pair of arms 88 (Fig. 2) are secured to shaft 87 and support a bail bar 89 which overlies a tail 90 on each of a plurality of pawls 92 pivoted on shaft 87. The pawls 92 are spring biased and are adapted to cooperate with a series of teeth on step plates 555 of the punch gag setting mechanism in a manner to be described in detail hereinafter.

Upon depression of the "Total" key, the link 180 is raised so as to place its lug 181 between the shoulders 194 of the ram 193, while the link 178 is raised so that its lug 179 entirely clears the ram 186. As the ram 193 is moved, it carries link 180 with it to rock shaft 149 through arm 144, so as to move cam plate 148 and the carrier 145 with its wheels 147 into mesh with the sectors 140. This takes place before the sectors move down, so that during the subsequent movement of these sectors, the total set in the wheels 147 at that time is set into the sectors, which are arrested by the engagement of the teeth 160 with the pawls 161, so that the total then in the accumulator wheels 147 is printed. During this movement of the link 180, the pin 182 thereon moves over the arm 183, as shown in Fig. 54. As now the ram 186 moves back, its pin 185, by engagement with the cam 187 on the lever 183, will shift the lever 183 against the tension of a spring (not shown) so as to elevate the link 180 and place the lug 181 within the slot 192, as well as move the lug 190 into the path of the notch of the latch 188. The notch in the latch is long enough to permit limited movement of the latch over the lug 190, while the pin 185 slides on the straight portion of cam 187. As the ram 186 now returns, the link 180 will be carried with it, while the lug 181 slides in the slot 192. As soon as the pin 182 reaches the end of the lever 183, it again becomes disengaged, while the subsequent return of the ram 193 alines the end of the slot 192 with the lug 181, so that this lug can again drop between the shoulders 194 and permit the link 180 to drop to original position.

A pair of cam arms 151 and 152 secured to the shaft 234 (Fig. 6 of Patent 2,084,831) are adapted to control the movement of the rams 186 and 193 by means of cam slots 153 and 159 cut therein. The operation of these cams has been fully described in the Patent 2,084,831 and will be taken up in detail under the title "Résumé of operations."

*Actuating, setting and resetting mechanisms (Figs. 1, 2, 4, 5, 17, 18, 43, 44, 45, 46, 47, 63)*

The actuating mechanism comprises a motor driven cross head which sets the separate parts of the multiplying mechanism in sequence to cause it to carry on its computing operations and the cross head also resets the operated parts to normal after the computation is completed.

This mechanism is described and disclosed in detail in the patents to A. Baumann et al. Nos. 1,863,646 and 1,886,148. Heretofore wherever possible the same reference numerals as in the Patent No. 1,886,148 have been used but in this instance these numerals have already been used in describing new mechanism. Therefore, the hundreds digit will be changed from one to two, that is, wherever the number 194 was used in the patent the number 294 will now be used.

The above mentioned cross head is driven by a motor 8, which is provided with a switch 270 (Fig. 1) whereby it may be started and stopped. The motor shaft 271 (Fig. 2) is geared to a cross shaft 274 by gears 272 and 273 and the shaft 274 is geared to a shaft 277 by gears 275 and 276 (see also Figs. 4, 5, and 17). The shaft 277 has four helical grooves 278 crossing one another, each groove cooperating with its particular nut 279 journaled loosely in a crosshead 280 guided to reciprocate along rails 130 on the base. A clutch 281 is arranged to engage with either nut 279 by a shifter bar 282 slidably mounted and guided on the crosshead. These parts are clearly disclosed in Fig. 26 of Patent No. 1,886,148. Each nut 279 will rotate with the shaft 277 when not engaged with the clutch; but when either nut is engaged and held against rotation by the clutch it will travel along the shaft carrying the crosshead with it. The left nut carrying the crosshead to the left and the right nut carrying it to the right. The clutch shifter bar 282 is retained in either of its engaged positions by latches 283 held by springs 284 in engagement with lugs 285 on the shifter. A bumper 286 on each end of the shifter bar is arranged to strike against a cushion member 287 slidable on the frame and retained in projected position by a spring 288.

The tail 289 of each latch is arranged to strike against a fixed stop 290 and against a lug 291 on the shifter. The right hand latch 283 is connected by a spring 292 with an arm 293 (Fig. 47) pivoted on the crosshead 280 and arranged to be struck by a shoulder 294 on an interponent 295, pivoted to an arm 296. The latter is fixed to a shaft 300 (Fig. 3) extending across the machine and connected to be moved in a clockwise direction by the trip bar 7.

The lower end of the interponent 295 projects into a slot in a bracket 298 and is acted upon by a spring 299, tending to retain the interponent in its vertical or normal position. The arm 293 extends into a notch in the lug 291 on the shifter 282 and has a shoulder 150 taking behind the lug to hold the clutch in mid position, as shown in Figs. 5 and 26 of Patent No. 1,886,148.

Figure 5:
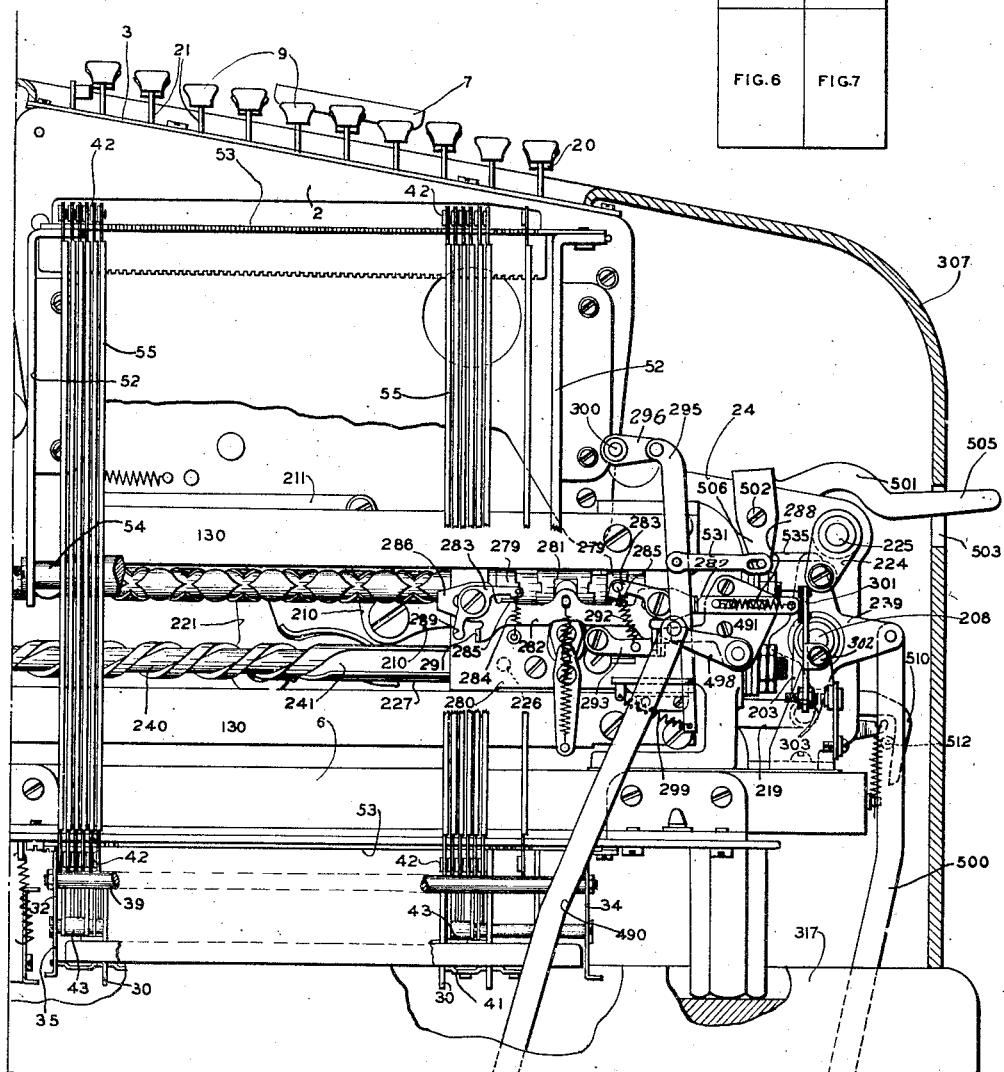

When the crosshead is moved to the right, to the position shown in Fig. 5, the stop 290 will disengage the right latch 283, while the spring 288 will move the shifter until arrested by the shoulder 150; this will cause the clutch 281 to move to neutral position and the crosshead will stop. If, now, the interponent 295 is rocked by shaft 300 through the linkage comprising arm 8, link 9, arms 10 and 11, and link 15 connected to a sliding cam plate 16 which is operated by the trip bar 7, or by mechanism in the base of the machine, as hereinafter described, the arm 293 will be depressed so as to release the shifter and cause the tensioned spring 288 to move the clutch shifter 282 to the left, in order to clutch the left nut 279. The left latch 283 then holds the clutch engaged. The crosshead will now travel to the left until the left bumper 286 strikes the cushion 287, thereby tensioning the spring 288, while further movement will cause the tail 289 of latch 283 to engage the stop 290, thereby moving the shifter 282 to the right, carrying the clutch 281 with it to disengage the left nut 279. The tensioned spring 288 will now cause the clutch to engage the right nut 279. Accordingly, the direction of movement of the crosshead is automatically reversed. As this crosshead travels back, it will again be arrested at the end of its stroke as previously described. Secured to the base 6 and positioned in line with the end of right bumper 287 is an electric contact member 301 pivoted at 302 and adapted to break contacts 303, thereby stopping the motor 8, when the crosshead returns to normal. When the latch 293 is depressed either by the trip bar 7 or a control link 490 the bumper 288 is permitted to move to the left, the contacts 303 are again closed and the motor 8 is started. A diagrammatic showing of the motor circuit is found in Fig. 63. As hereafter described, a complete reciprocation of the crosshead causes a complete cycle of operation of the multiplying unit to take place.

Referring to Figs. 5, 43, 44, 45 and 46, the crosshead is provided with a laterally projecting cam roll 200, which, when the crosshead is in normal position, is in the fork of a cam lever 201 (Fig. 44), fixed to a shaft 202, which is operatively connected to a bar 26 described above, to raise keys which have not been fully depressed and latched and in order to lock all keys which have not been depressed.

Pivoted to the frame 24 is a follower 220 having a roller 222 adapted to follow the outer surface of the cam lever 201. The follower 220 is connected by a link 235 to a bell crank 239 which operates the clutch control mechanism described hereinafter.

A cam 205 on the shaft 202 strikes against a pin 206 on a lever 207 connected through a pin-and-slot connection with the link 36, which causes the release of the depressed keys on the return stroke of the crosshead. The key release mechanism associated with link 36 has been described above.

The roll 200 on its continued movement bears against the cam face 209 on a cam lever 210 pivoted on the frame and connected by a link 211 with an arm 212 fixed to a shaft 213. This shaft has fixed thereto arms 214 carrying a bail bar 215 arranged to take against lugs 216 on all of the bars 22. The cam lever 210 has a pin 217 taking against the cam face on a lever 218 connected by a link 219 to an arm 203 on the shaft 208, on which an aligning bar 42 for the partial product plates 46 is fixed. The parts are moved by springs connected with links 211 and 219 and anchored on the frame. Accordingly, upon movement of the levers 210 and 219, the multiplier and multiplicand setting up bars 22 will not only be released, but will be permitted by their springs to move the tappet 57 and stop 58 and the multiplicand slides 72 and their connected couplers 74 to positions as determined by the depressed keys. The partial product plates 46 are also released for movement, due to the fact that the pin 217 enters the recess in the lever 218, thereby permitting the aligning bar to be moved away from the plates.

Upon continued movement of the crosshead the roll 200 will enter a cam groove in a cam lever 221 connected by a link 223 with an arm 224 on a shaft 225, having fixed thereto cams 297 for moving the crosshead 64, in order to position the tappet 57 and stop 58 against the corresponding steps of the partial product plates, as shown in Fig. 24. The partial products are thus set up in the receivers, as heretofore described.

The crosshead 280 has two cam rolls 226 (Fig. 5), which travel in grooves in a shaft 227 mounted in suitable bearings and having at one end a gear 228 meshing with a gear 229 on a shaft 230. On this shaft are mounted a series of bevel gears 231 (Figs. 17, 18 and 2), each of which meshes with a corresponding gear 232 (Fig. 25) on the shaft 91 as described above. The gears 231 are loose on the shaft 230 and each is connected thereto by a sleeve splined on the shaft and connected with the gear hub by a screw thread. When the shaft 230 and the sleeve splined thereto are turned one complete revolution counterclockwise, the gear will not turn with the shaft. Upon reverse movement of the shaft, the gear will be picked up and rotated in a reverse direction. The grooves on the shaft 227 are in duplicate, and each has a straight portion 241 running along the shaft, a helical portion 240 and another straight portion 241. The cam rolls 226 travel in these grooves.

After the cam roll 200 on the crosshead 280 has left the cam 221 and after the partial products have been set into the receiver, the rolls 226 will enter the helical grooves 240 and cause the shaft 227 to rotate the shaft 230 in a counterclockwise direction, a given number of turns (about four and one-sixth turns). This permits the rotation of the shafts 91 individually under control of their springs to an extent determined by the settings of the respective receivers until these receivers are arrested. After any shaft has thus been arrested, the shaft 230 is permitted to continue its movement on account of the splined connection of the gear 231 with it. The settings of the receivers are thus accumulated or integrated and transferred; the final product will thus appear on the product receivers.

After the rolls 226 on the cross head have left the helical grooves 240 and entered the straight grooves 241, the roll 200 will strike against and enter a lever 233 secured to shaft 234, which controls the setting of the total accumulator wheels and associated mechanism as disclosed and described in the above mentioned Patent 2,084,831. When the shaft 234 (Fig. 45) is rotated clockwise the accumulator wheels 147 are brought into mesh with the total sectors 140. Attached to arm 233 is a link 236 which is connected to arm 237 by a pin and slot connection. The arm 237 is journalled on a shaft 269 and has secured thereto an arm 238 to which is connected a link 204 which operates the punch gag setting mechanism as described below.

The roll 200 will next strike against and enter the groove in a lever 242 fixed to a shaft 243, on which is secured an arm 244 connected by a link 245 to an arm 246 loose on the shaft 127, previously referred to. The arm 246 has a shoulder 247 taking against a lug 248 on an arm 249 fixed to the shaft 127. Fixed to the same shaft are arms 250 connected by a bail 251, lying over the sectors 126 and 134 carrying the type bars 128 and 133. The arm 249 is acted upon by a spring 252, which tends to move it counter-clockwise (Figs. 43 and 45) against a stop. When the arm 242 is moved to the left or full-operated position, the crossbar 251 will be raised by the spring 252 thereby permitting the arms 126 and 134 to move up under the tension of the springs 123 and 138 (Fig. 25) so as to position the type bars, punch gag setting mechanism and the accumulator sectors. The final product as well as the multiplier and multiplicand are thus printed and the punch members prepared for operation and the product accumulated.

The shaft 243 is connected by suitable mechanism (not shown) for causing the print hammers to be operated. In view of the fact that print hammer mechanisms are well known and a typical example is disclosed and described in Patent No. 1,886,148, no detailed description is given herein.

Arm 246 (Figs. 4, 43 and 45) is connected to an arm 253 by a link 254. The arm 253 is secured to a shaft 255 to each end of which is secured an arm 256. Depending from each arm 256 is a link 257 which is connected together by bail 258 for resetting the punch gag setting mechanism as described below. When the arm 246 is rotated counterclockwise the links 257 and the bail 258 are raised permitting the stepped plates in the gag setting mechanism to be raised in a manner described below.

Lever 233 will continue to be rotated by the roll 200 after the arm 242 comes to rest. This movement brings the ear 457 (Fig. 6 of Patent 2,084,831) thereon into contact with a pin 458 on a bell-crank 459 pivoted on stud 460 secured outside the frame 24. The other arm of the bell-crank 459 is secured by a pin and slot connection to a bell-crank 461 fast on shaft 169. Rotation of the bell-crank 459 in a clockwise direction rotates shaft 169 clockwise bringing bail bar 158 (Fig. 25) into contact with the carry racks 154 to lock them from displacement.

A lug 462 on the bell-crank 461 contacts a shoulder on a bar 463 which extends toward the front of the machine and is secured to an arm 464 fast on a shaft 360 to which is secured a lever 422 which lies in the path of pin 200. The racks 154 remain locked up until the return movement of the cross head at which time the lever 787 will be rotated counter-clockwise to draw bar 463 to the right releasing the bell-crank 461 and permitting it to rotate bail 158 out of the path of the racks 154.

The operations have now been completed and the machine is in a condition to be restored. As previously described, the crosshead will have arrived at its left limit of travel, and will then be automatically reversed. Upon such reversal, the action takes place in the reverse order. The operations are briefly as follows: Upon the return of the roll 200 the arm 233 will be swung back allowing the punch set up mechanism to raise. The lever 422 will be rocked, thereby releasing the carry racks. Then arm 242 will return to normal restoring the print hammers and type bars. The type bars will come to rest with their zeros below the printing line. Also lever 242 restores the transfer racks in the punching mechanism. During this portion of the return movement, the rolls 226 will have traveled in the straight grooves 241 and will be ready to enter the helical grooves 240. During the travel along the helical portion, the receivers are restored to normal position. It will be noted that, during this return rotation of the shafts 91 cause the carry mechanism to restore. As soon as the carrying receivers move, the steps thereof will move under the stops on the carry mechanism and permit them to snap or move from step to step to final normal positions.

As the shaft 230 moves the shafts 91 back to normal position, the torsion springs are tensioned to again move the receivers when another problem is set on the keyboard and the machine operated. The receivers are finally set in their zero positions.

After the receivers have been restored, the rolls 226 will re-enter the straight groove parts 241 and the roll 200 will then engage the cam 221 (Fig. 44), which causes the movable tappets 57 to be rocked back towards the fixed stops. During this movement, the bars are restored to normal positions. The roll 200 will now engage the cam 209, causing the roll 217 to move the lever 218 and by rotating shaft 208 align the bars 45 while the lost motion between 211 and 212 is taken up. Further movement of the roll 200 causes the bars 22 to be returned by the action of the bail 215. This causes the tappets 57 and stops 58 to move down to normal, while the plates 72 are also moved back to normal.

The roll 200 will now strike the cam lever 201 (Fig. 44) causing the connected link 36 to release all operated keys 9 to normal, as heretofore described. This is true provided the "repeat" key is in raised position. If, however, this "repeat" key has been depressed, then the multiplier section will not be cleared. The restoring of arm 201 to normal rocks the follower 220 with its associated roller 222 in a counterclockwise direction to operate the bell crank 239 for placing the clutch mechanism in condition for operation on the next cycle of the machine. Finally, the return of the cross head 280 to its normal position will cause the parts to come to rest with the machine cleared. It will, of course, be understood that, by well known means not shown specifically, the paper feed and the ribbon feed have been operated.

Figure 1:
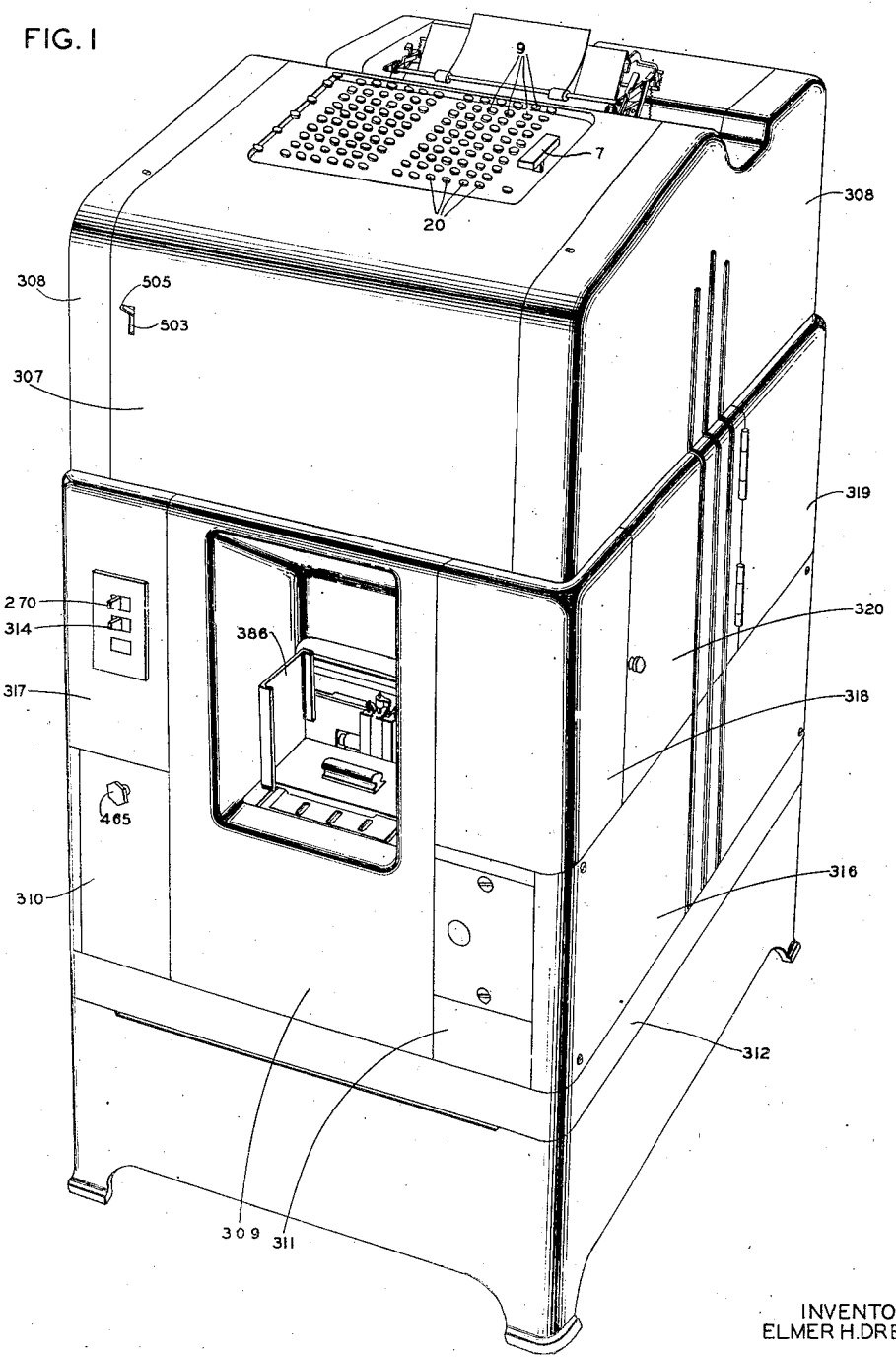

The multiplying unit is mounted on the framework of the base mechanism as shown in Fig. 1 and is enclosed in a casing 307 which has a recess therein to expose the keyboard and platen carriage. Secured to the casing 307 by screws are two side covers 308. The side covers are formed with a trough portion to permit access to the platen knobs.

The multiplying unit with its casing is supported on a base portion which will be described in detail below.

*Base mechanism, general construction (Figs. 1, 6, 12, 13 and 63)*

The base mechanism of the multiplier consists essentially of a card feeding mechanism, a card sensing mechanism, a card punching mechanism, driving means for these devices and a drive controlling mechanism all of which are suitably housed in an arrangement of castings that form the framework and outer shell of the machine. Two frame castings 310 and 311 (Fig. 1) are bolted on a base casting 312 in which is mounted a motor 313 (Figs. 12 and 13) for driving the base mechanism. Motor 313 is controlled by a switch 314 (Figs. 1 and 63). Each casting is in the form of an open rectangular box having its open side facing outwardly and its inner wall suitably pierced to provide bearing points for various transverse auxiliary drive shafts. A cover plate 315 (Fig. 6) is provided to enclose and protect the mechanism mounted in the left hand frame 310 (Fig. 1) and a similar plate 316 is provided for the right hand frame 311. Another box-like frame piece 317 is secured by bolts to the top of frame 310. The open side of frame piece 317 faces inwardly to form a shelf on which various mechanisms are supported. On the right side of the machine, an upright support 318 is bolted to the top of the forward end of frame 311 and a support 319 is attached at the rear. A door 320 is hinged on support 319 and occupies the space between the supports. The door is provided to facilitate the removal or insertion of the sensing and punch translators. At the four corners of the machine, the frame 317 and supports 318 and 319 are suitably formed to provide a seat for base plate 6 of the multiplying unit.

*Base driving mechanism*

The drive shaft 321 (Figs. 15 and 16) of the base mechanism is mounted in three ball bearing brackets 322, bolted to the inner wall of frame 311, and is held against endwise movement by thrust bearing 323. A pulley 324 is loosely mounted on the forward end of shaft 321 and is rotated by motor 313 (Figs. 12 and 13) through a belt 325. In the particular arrangement shown, pulley 324 (Figs. 15 and 16) may be engaged with shaft 321 by a friction clutch mechanism 326 controlled by a forked arm 327 fixed to a transverse rock shaft 328. When the base mechanism is idle as shown in Fig. 15, shaft 328 is held in rocked position and arm 327 compresses the clutch spring 329 to disengage the clutch mechanism. When the base is to be operated, shaft 328 is released and spring 329 will operate the clutch to engage shaft 321 with pulley 324.

The front cam shaft 330 (Figs. 12, 13 and 15) extends transversely across the machine and is suitably journaled in bearings in frames 310 and 311. The portion extending into frame 311 is provided with a worm wheel 331 (Fig. 33) that meshes with worm gear 332 on shaft 321. Mounted on the extreme right end of shaft 330 is an indicator wheel 333 by means of which the relative timing of the various mechanisms may be adjusted. Two eccentric discs 334 are fixed on the portion of shaft 330 between the frames 310 and 311 and serve to effect the reciprocation of the sensing pin box. The portion of shaft 330 (Fig. 32) extending into frame 310 is provided with a cam 335 controlling the card picker mechanism, a cam 336 controlling the sensing chamber card stop and a cam 337 controlling the multiplier starting mechanism and the base stopping mechanism. The function and operation of the various mechanisms controlled by these cams will be described in detail hereinafter.

The sensing chamber feed rolls 338 and 339 (Figs. 12, 13, and 28) are driven by the means shown in Fig. 15. These may be steel rolls mounted on transverse shafts 340 and 341 respectively, the right hand ends of which project into the frame piece 311. The lower shaft 341 is journaled in a bearing in the frame piece and has a worm wheel 342 driven by a worm gear 343 on shaft 321. The shaft 341 is also provided with a pinion 344 meshing with a similar pinion 345 on shaft 340. The latter shaft is mounted in a ball bearing on an arm 346 which is pivoted at 347 and is controlled by a resiliently urged plunger 348 which tends to urge the upper feed roll 338 against the lower feed roll 339. The other end of the shafts 340 and 341 project into the frame piece 310, the shaft 341 being journaled in a stationary bearing and the shaft 340 in a floating ball bearing pivoted at 349 (Fig. 7).

The punch feed rolls 350 and 351 (Figs. 28 and 29) are of similar construction and are mounted respectively on transverse shafts 352 and 353. At their right hand ends the shafts project into frame 311 and are rotated in the same manner as the sensing feed rolls, that is, a worm gear 354 on shaft 321 drives a worm wheel (not shown) on shaft 353 and a pinion 355 on shaft 353 meshes with and drives a pinion 356 on shaft 352. At each end the upper shaft 352 is mounted in a floating ball bearing 357 and the upper feed roll 350 is resiliently pressed against lower feed roll 351 by a suitable spring urged plunger 358 acting on the right hand floating bearing 357.

Two skid rolls 359 are arranged at each side of the sensing chamber, between the sensing chamber feed rolls 338 and 339 and the punching chamber feed rolls 350 and 351. These rolls serve to convey a card from the sensing feed rolls into the sensing chamber, urge the card against the card stop while it is being sensed and then pass it on to the punch feed rolls when the card stop is elevated. Each skid roll is fixed on a shaft mounted in the usual tubular housing secured to the frame pieces 310 and 311 and are driven in the usual manner. Each skid roll 359 is opposed by the usual spring pressed idler roll mounted on the upper plate of the card chamber, which serve to keep the card in contact with the skid rolls and assure a positive feed. Another set of skid rolls 656, similar in function and relative location to those just described, and operated in the usual manner is provided for the punching mechanism.

Figure 6:
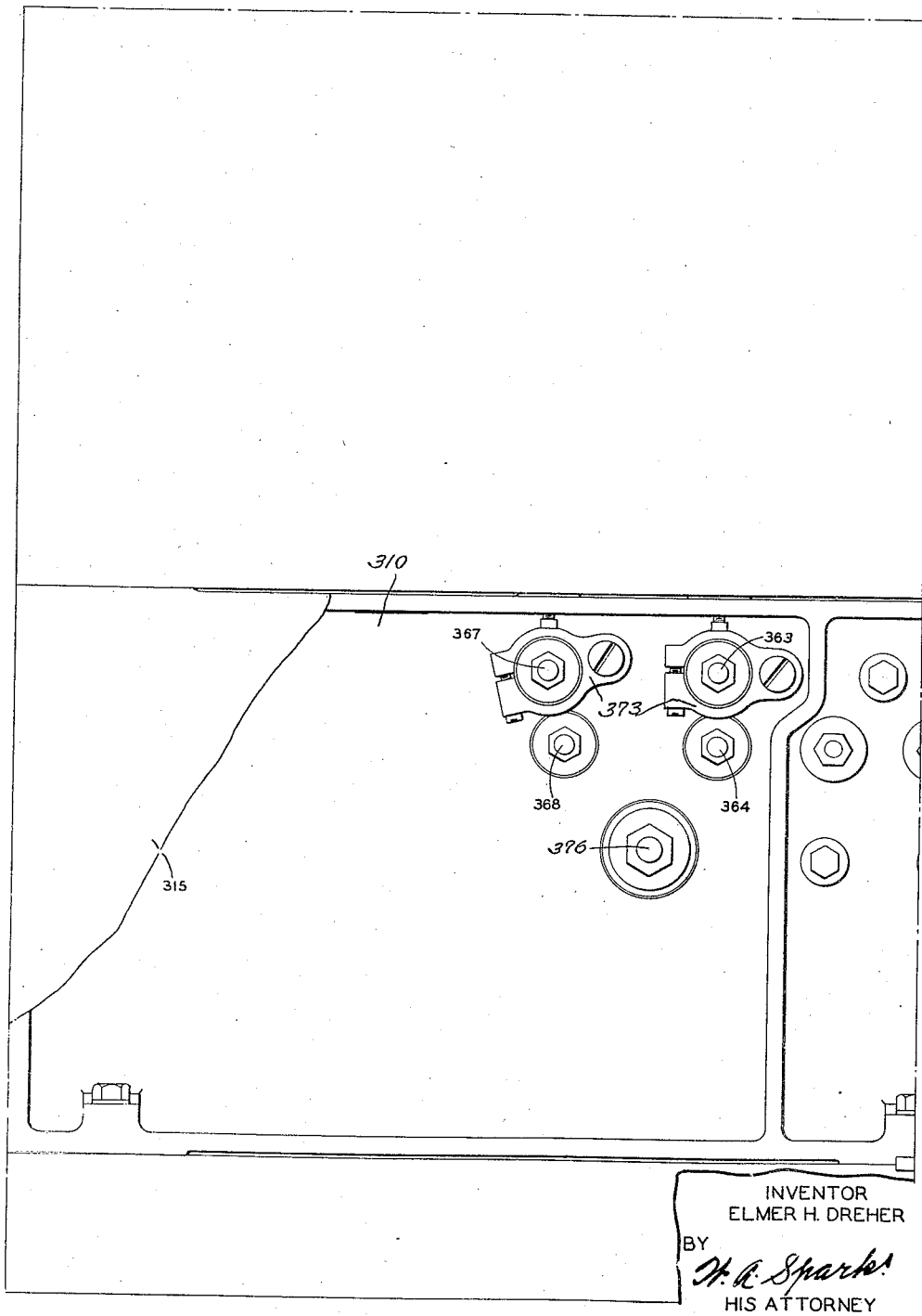

In the present form of the invention, two pairs of card ejector rolls are employed. The first pair of rolls 361 and 362 (Fig. 16), mounted on transverse shafts 363 and 364, receive the cards from the rear skid rolls of the punching mechanism and convey them to the second pair of ejector rolls 365 and 366, (Figs. 21, 22, and 29), mounted on shafts 367 and 368. The cards are passed by these latter rolls into a receiving magazine 369 which is provided with deflector fingers 370. Both lower rolls 362 and 366 are mounted and driven in the same fashion as the feed rolls 339 and 340 of the sensing and punch mechanism, that is, both shaft 364 and 368 are mounted in fixed bearings in frame pieces 310 and 311 and each is provided with a worm wheel that meshes with a worm gear 371 (Fig. 16) on shaft 321. The supporting shafts 363 and 367 for the upper ejector rolls 361 and 365 are mounted at their right hand end in floating ball bearings 372 in frame 311 (Fig. 16) and in similar bearings 373 in frame 310 (Fig. 6). Each is provided with a pinion 374 that meshes with pinions 375 on shafts 364 and 368, and each is resiliently pressed against the lower rolls by the usual spring urged plungers.

A rear cam shaft 376 (Figs. 21 and 29) is provided to control the operation of the punching mechanism. This shaft is suitably mounted at each end in fixed bearings in frames 310 and 311 and is provided with a pinion 377, at its end near frame 311, that meshes with a similar pinion 378 on stub shaft 379. The shaft 379 is suitably mounted between the frame 311 and bracket 380 and extends through frame 311 where a worm wheel 381 is mounted thereon that meshes with and is driven by a worm gear 382 on drive shaft 321. On this shaft is mounted a cam 383 (Fig. 29) that controls the punching chamber card stop, a cam 384 that controls the reciprocation of the punch mechanism, and a cam 385 for latching the punch slides. Worm wheel 381 and worm wheel 331 on the forward cam shaft are so designed that shafts 376 and 330 are synchronously driven by shaft 321. The operation and function of cam shaft 376 will be more completely described hereinafter.

*Card magazine and picker mechanism (Figures 12, 13 and 28)*

The card magazine and card picker mechanism used herewith are of the well known Powers type and is more completely disclosed in the above cited patent to W. W. Lasker, No. 2,044,119, issued June 16, 1936. The card magazine 386 (Fig. 28) is situated in the fore part of the machine in a convenient position for the operator, and is supported by suitable brackets mounted on frames 310 and 311. A bolt (not shown), mounted in a supporting bracket and entering a threaded hole in the magazine frame, is provided to adjust the lateral position of the magazine relative to the sensing chamber to assure the proper positioning of the cards. Cards placed in the magazine are urged downwardly by a weight and are passed seriatim to the sensing chamber feed rolls by picker arm 387 fixed to transverse rock shaft 388. This shaft is suitably mounted at either end in the frames 310 and 311 and an arm 389 (Fig. 7) is mounted on the portion extending into frame 310. The arm 389 is connected by a link to arm 390 pivoted on a frame stud. The arm 390 is operated in a well known manner by the cam 335 (Fig. 32) on shaft 330. The outline of cam 335 is such that it will effect the reciprocation of picker arm 387 at the proper time during a rotation of shaft 330.

*The sensing mechanism (Figs. 28, 32 and 33)*

The sensing unit used herewith is essentially the same as the familiar Powers mechanism which is more completely disclosed in the above cited patent to Lasker and consists of the usual card chamber, a lower or analyzing pin box and an upper pin box.

The sensing chamber comprises the usual upper plate 401 (Fig. 28) bolted at each end to suitable brackets secured to frames 310 and 311 (Figs. 32 and 33) and a lower plate 402 bolted to plate 401 and separated therefrom by suitable space bars. Both plates are perforated with a full complement of holes corresponding to the perforation positions in a record card.

The lower pin box consists of the usual end castings 403 (Figs. 32 and 33) frame bars 404, 405 (Fig. 28) a plate 407 spanning the bottom of this boxlike structure and a series of upper plates 408, all suitably interconnected by screws. A plurality of sensing pins 409, having flat mid-portions and reduced ends are slidably mounted in the perforations in plates 408 and 409 and are urged upwardly against plates 408 by springs 410.

Each of the castings 403 (Figs. 32 and 33) has integral therewith a depending tube 411 having a round hole in which is positioned the reduced upper end of a post 412, these two posts being rigidly mounted in the base casting 312 to which the frame pieces 310 and 311 are secured. The construction is such that the entire sensing unit is accurately guided for vertical reciprocating motion on these posts. As shown in Fig. 28 the front cam shaft 330 is directly beneath the middle of the sensing mechanism and one of the posts 412 stands in front of the shaft and the other behind it. The construction is such that the two castings 403 are identical in construction, the right-hand one being turned end for end with respect to the left one. Each of the castings is made with an opening in which a pitman 413 is situated, each pitman being pivoted to the casting by a suitable pin 406. The lower end of each pitman surrounds a disc 334 eccentrically mounted on front cam shaft 330 so that a revolution of the shaft imparts a vertical reciprocal motion to the lower pin box.

In order that the pins 409 may act positively and not merely by the power of the springs 410, the usual means are provided for locking whichever pin finds a perforation in the card. These means consist of the usual latch plates 414 (Fig. 28) that are provided with latching slots 415 for the studs 416 on pins 409, and that are slidable in the slots formed by bars 404 and 405; and means to shift the latch plates 414 comprising a rod 417 extending through holes in the rearward end of each plate 414, that is suitably connected to the upper arm of an offset lever 418 pivoted at 419. The lower arm of lever 418 is provided with a follower roller (not shown) that acts on a stationary cam 420 (Fig. 33) mounted on the right-hand post 412. At the proper time in the upward travel of the pin box the follower roller passes off cam 420 and lever 418 is rocked counterclockwise by a suitable spring (not shown) on pivot 419 to shift all latch plates 414 forwardly. The timing is such that the pins that have found perforations are latched in their upper position and impart positive upward motion to the corresponding pins 443 of the upper pin box during the remaining portion of the upward travel of the lower pin box; whereas the pins that have not found perforations are held by the card in a stationary position, relative to the lower pin box.

The usual device is employed herewith to prevent the latching of all the pins 409 in the event that there is no card in the card chamber. A resiliently urged pin 421 is mounted in the right-hand bracket 403 (Fig. 33) and is connected at its lower end to a suitably mounted lever (not shown) that is provided with a turned over ear that may cooperate with the follower roller on the offset lever 418 referred to above. The arrangement is such that if there is a card in the chamber when the pin box is elevated, pin 421 is depressed and the turned over ear on its associated lever is rocked to an ineffective position; whereas if there is no card in the chamber, pin 421 remains in the position shown and the turned over ear on its associated lever coacts with the follower roller on lever 418, preventing the latching of any pins 409 by latch plates 414. In the latter case, all the pins 409 are held in relatively stationary position as the pin box is elevated since, as is well known, the springs 442 (Fig. 28) on the pins 443 of the upper pin box are stronger than the springs 410 that tend to urge pins 409 upwardly.

The upper pin box used herewith is of essentially the same construction as that disclosed in the above cited application, and, therefore, will not be described in detail herein. In the present embodiment, it serves merely as on interponent to transmit the motion of the pins 409 of the lower pin box to corresponding pins 447 (Fig. 32) in the translator. A plurality of pins 443, corresponding in number and arrangement to the pins 409 of the lower pin box and urged downwardly by springs 442, are slidably mounted in a suitable boxlike frame 423. The plates 424 which in tabulator construction are provided with cam slots and latch slots that coact with studs on the pins 443, are disabled in the present instance and serve merely as spacing bars for the pins.

As in all card controlled machines of Powers construction, a card stop is employed to hold the card momentarily during its passage through the sensing chamber to allow a suitable interval during which the card is sensed. The usual L-shaped card stop 391 (Fig. 28) is guided for vertical reciprocation in suitable grooves and is connected to a vertical link 392 (Fig. 7) which is pivoted to the rearward end of an arm 393 fixed to a transverse rock shaft 394. The rock shaft 394 is mounted in suitable bearings in frame piece 310 and is provided with a forwardly extending arm 395 to which is connected a link 396 that extends downwardly and is pivoted at its lower end to a spring-urged arm 397 pivoted on frame stud 399. The arm 397 is provided with follower roller 398 that cooperates with the card stop cam 336 (Fig. 32) on front cam shaft 330. The contour of cam 336 is such that the card stop 391 is reciprocated at the proper time in each cycle of operation of the base mechanism to hold a card in the sensing chamber while it is being sensed.

*Translator (Figs. 10, 11, 26, 27, 32, 33, 57 and 58)*

A new and improved translator unit has been provided to convert the usual dual perforations of the 90-column code into suitable form for the key set-up mechanism.

In the particular arrangement of the translator shown, a pair of frame castings 425 (Fig. 26), suitably connected by cross bars 426, support a series of horizontal perforated plates in which are mounted a plurality of Bowden wires and associated pin elements. The plate 427, spanning the top of the boxlike frame formed by the castings 425 and rigidly secured thereto by bolts, is perforated with a plurality of holes corresponding in arrangement and in number to the keys on the keyboard. Fixed to the underside of plate 427 are two laterally extending spacer bars 428, arranged parallel and in close proximity to the frames 425. A plate 429 is bolted on the bottom of the spacer bars 428 and is perforated in the same manner as plate 427. Another plate 430, having similar perforations, is bolted to lateral bars 431 which are secured to the frames 425. The arrangement of the several plates is such that the corresponding perforations in each are in vertical alignment. As best shown in Fig. 26 a plurality of vertical pins 432 are slidably mounted in the holes in plates 427 and 429 and are of sufficient length to extend a suitable distance above and below the plates. The pins are provided with shoulders 433, which are normally urged against plate 429 by springs 434.

Immediately below the lower end of each pin 432 is the core of a Bowden wire that is mounted in plate 430. The upper end of each Bowden wire 452 in the translator is provided with a fitting 435 (Fig. 58) having a shoulder 436 that bears against plate 430 and a threaded portion 437 that extends through the holes in the plate. A slotted nut 438 serves to hold each fitting rigidly.

The bottom of the translator frame is spanned by a plate 439 that is attached to the frames 425 by bolts that also pass through and secure two L-shaped bars 440. As will be seen in the drawings, the bars 440 coact with the underside of plate 439 to form grooves that fit around the angles 441 on the upper pin box and determine the relative positions of the translator and pin box. The plate 439 is provided with a plurality of diagonal rectangular slots 442 (Fig. 58) corresponding in number and arrangement to the perforation positions in a record card so that each slot overlies a corresponding pin 443 in the upper pin box when the translator is in place. Two bars 444 (Fig. 26) fixed to plate 439, support a plate 445 having diagonal slots 446 (Fig. 58) therein, similar in arrangement but somewhat longer than those in plate 439.

Flat pin members 447 are slidably mounted in aligned slots in the plates 439 and 445. The lower portions of the pins extend below plate 439 and are in position to be elevated by corresponding pins 443 in the upper pin box. Each lower portion is reduced to form a suitable limiting shoulder 448 that bears on plate 439 and the upper portion of each pin protrudes slightly above the upper side of plate 445 when the pins are in their lower position.

Another plate 449 (Fig. 26) is bolted to lateral bars 450 that are secured to frames 425. Plate 449 is provided with a plurality of tapped holes 451 (Fig. 58) arranged in columns that correspond in number to the columns of perforation positions in a record card. The number of holes 451 in each column, is double the number of perforation positions in a column of a record card. These holes are arranged in a staggered relationship so that two holes overlie each slot 446 in plate 445.

The lower end of each Bowden wire in the translator is provided with a fitting 453 having a threaded lower portion 454 adapted to screw into the tapped holes 451 and hold the fitting rigidly against plate 449. Suitable plungers 455 are mounted in the fittings 453 to transmit the movement of pins 447 to the cores of the Bowden wires.

Bent strips 441 (Fig. 28) are secured to the front and rear of the upper pin box of the sensing mechanism and form slides on which the translator rests. Suitable limit studs 456 (Fig. 32), screwed into the strips 441, determine the relative positions of the translator and sensing mechanism. The translator is held latched in operative position by hook elements that form a part of a resiliently urged handle similar to 636 (Fig. 11) pivoted on frames 425, and fit into suitable slots 639 in strips 441.

By means of the present arrangement it is possible to adapt the coded representations employed in the usual 90-column code to effect the setting of single effective keys in the keyboard. As best seen in the diagrammatic showing of Fig. 57, the elevation of any pin 447 (except the "9" pin), in accordance with the perforation analyzed by the sensing mechanism, will effect the depression of the corresponding "odd" key and the next higher "even" key for purposes described hereinabove under the headings "Key set-up mechanism" and "Decoding mechanism."

In the event that the machine is to be operated from 45-column cards, the connections 453 overlying pins 447 may be readily shifted to different positions to effect the proper translation of the new code. In this case, the multiple connections used to translate 90-column code are not required since each digit is represented by a single perforation.

*Starting and stopped the base mechanism (Figs 1, 7, 10, 12, 15 and 51)*

The mechanism controlling the engagement and disengagement of clutch 326 is an adaptation of the usual device employed in Powers tabulating machines which is completely disclosed in the patent of W. W. Lasker, 2,185,258, issued January 2, 1940.

The base mechanism of the present embodiment disclosed in the drawings may be started by manually depressing a button or, when set for automatic operation, by the return of the multiplier crosshead to normal position and is stopped at the completion of each cycle of operation by the action of a cam fixed on the front cam shaft.

A button 465 (Figs. 1 and 51) is fixed on the forward end of plunger 466 (Fig. 7) which protrudes through and is slidably mounted in a housing on the forward wall of frame piece 310. The plunger is provided with suitable limit stops and is normally held in the position shown in Fig. 7 by a suitable spring (not shown). A pin 467 connects the plunger 466 to a link 468 that extends rearwardly and is connected to an arm 469, pivoted on a frame stud. A forwardly extending arm 470, pivoted at the upper end of arm 469, is provided with a bent hook element 471. The lower portion of the hook lies in the same vertical plane as an upwardly extending toggle breaking arm 472 pivoted on frame stud 473. The arm 470 is urged downwardly by a spring extended from the mid point of the arm to a rearwardly protruding ear on link 474 and is held in the position shown in Fig. 7 by a pin on the same link.

The transverse shaft 328 referred to above is suitably journalled at either end in the frames 310 and 311 and its left end passes through frame 310 and is provided with a substantially horizontal arm 475. A pin 476 fixed in the rearward end of arm 475 serves as a pivot point for the lower arms of two toggles 477 and 478 and also protrudes through a slot in the lower end of link 474. The upper arm of toggle 477 is pivoted on frame stud 473 and the upper arm of toggle 478 is pivoted at 479 to link 474. Each upper toggle arm is provided with a finger that lies in the path of a pin 480 fixed in the toggle breaking arm 472.

When the base mechanism is in its normal position, both toggle links are straightened as shown in Fig. 7 and toggle 477 holds shaft 328 in rocked position through arm 475 to disengage the clutch mechanism 326. When button 465 is depressed, hook 471 effects the breaking of both toggle links through the toggle breaking arm 472. Shaft 328 is then rocked by spring 329 (Fig. 15) and drive shaft 321 is engaged with pulley 324 to begin a cycle of operation.

The link 474 (Fig. 7) referred to above extends upwardly through suitable slots in frame pieces 310 and 317 and is connected to the forward end of an adjustable two-part lever 481. Lever 481 is pivoted near its mid-point to a suitable frame stud and is provided at its rearward end with a lug 482 that overlies the upper end of link 483. The lower end of link 483 is connected to the forward end of an arm 484 suitably pivoted on a frame stud 485 and is provided with a follower cooperating with cam 337. Immediately after the machine has been started, toggle 478 is straightened by the action of its spring thereby elevating link 474 to the limit of its slot and rocking lever 481 to place the lug 482 in close proximity to the upper end of link 483. Thus, it will be seen that when link 474 is in its elevated position, a rigid connection is established between lever 481 and arm 475 consisting of the upper portion of link 474 and toggle 478. Therefore, as the high spot on cam 337 elevates link 483, arm 475 will be rocked to disengage the clutch 326 and stop the base mechanism. As the arm 475 is rocked, toggle 477 is straightened by its spring and holds arm 475 in rocked position until the toggles are again broken.

Also pivoted on frame stud 473 is a two armed lever 486 having a slot in its upwardly extending arm encompassing the pin 480 on the toggle breaker 472. A short link 487 is suitably affixed to the forwardly extending arm of lever 486 by pins 488 and 489 to form a slot in which the lower hooked end of link 500 may operate. It will be seen that a counter-clockwise rotation of lever 486 will also break the toggle links 477 and 478, to initiate a cycle of operation of the base mechanism.

*Base control for starting multiplying unit (Figs. 5, 7, 47, 48 and 49)*

In the foregoing description it has been pointed out that the multiplying mechanism is not operated until factors have been set up on the keyboard. After the factors are set up the crosshead 280 may be started on its rearward travel by tripping the crosshead shifter latch 293 which allows the shifter bar 282 to close the circuit of the multiplier drive motor and clutch the drive nut of the crosshead to its helical driving shaft.

When the machine is set for manual operation, depression of the trip bar 7 effects the tripping of latch 293 through an obvious linkage comprising link 15, arms 10 and 11, link 9, and arm 8 as shown in Fig. 47. However, when the machine is set for semi-automatic or automatic operation, the trip bar 7 is disabled in a manner to be described hereinafter and means are provided to trip latch 293 as an incident to each cycle of operation of the base mechanism.

Overlying a turned-over ear on latch 293 (Fig. 48) is an arm 498 pivoted at its forward end on a stud in a rigid plate 491 (Fig. 5) supported by frame plate 24. Connected to the forward end of arm 498 is a link 490 that extends downwardly into frame piece 310 through suitable slots in the several intervening frame pieces. The lower end of link 490 (Fig. 7) is connected to an arm 492 of an offset bell crank pivoted on frame stud 485. The other arm 493 of the bell crank is provided with a follower that rides on cam 337. When shaft 330 is rotated through approximately 235 degrees of a revolution, the high spot on cam 337 rocks the offset bell crank which pulls link 490 downwardly to effect the tripping of latch 293 and thereby initiates a cycle of operation of the multiplying unit.

The relative timing of the various mechanisms of the base is such that, during the period in which the high spot on cam 337 is traveling from its starting position as shown in Fig. 7 to a position immediately before it rocks the follower on arm 493, the feed rolls will have passed a card into the sensing chamber and the sensing mechanism will have effected the depression of the various keys 9, corresponding to the perforations in the card. During the final third of a revolution of shaft 330 the base mechanisms are returned to normal position and are stopped when the high spot on cam 337 effects the disengagement of the clutch 326. The multiplying unit, having been started during the base cycle, continues through its cycle after the base component has been stopped and is finally brought to rest when the crosshead 280 is returned to its home position. Thus, it will be seen that a complete cycle of operation of the machine consists of a cycle of the base component and a partially overlapping cycle of the multiplying unit.

*Multiplying unit control for starting base mechanisms (Figs. 5, 7, 49, 50 and 51)*

One function of the key reset cam lever 201 has been described under the heading "Actuating, setting and clearing mechanisms." As explained therein, the lever 201 is rocked in a clockwise direction as the crosshead begins its rearward travel and is returned to its original position when the crosshead reaches its home position. This rocking motion is utilized to restart the base mechanism and thereby enable the machine to operate automatically.

A lever 220 (Fig. 49) is pivoted on the limiting stud 494 of cam lever 201 and is provided with a follower roller 222 on its downwardly extending arm that rides a cam face 495 on the cam lever. A horizontal link 235 connects the other arm of lever 220 to the substantially vertical arm of a bell crank 239 pivoted on a stud in frame plate 24. The horizontal arm of bell crank 239 is connected to the upper end of a link 500 that extends downwardly into frame piece 310 and terminates in a hook element 499 that fits in the slot formed by the horizontal arm of lever 486 and the link 487. The lower end of link 500 is urged forwardly by a spring 496 extended between a suitable stud on frame 310 and a hook element 497 fast on link 500. Therefore, the leading face of hook 499 normally bears against pin 488 as shown in Fig. 50, unless the link 500 is held in disabled or retracted position by other means, as shown in Fig. 7.

Fig. 49 shows the operated position of the above described linkage. The crosshead shifter latch 293 has been tripped to initiate a multiplying cycle and cam lever 201 has been rocked enabling the link 500 to drop downwardly due to its own weight. The vertical movement of the link is sufficient to lower hook 499 (Fig. 51) below pin 488 and enable spring 496 to pull the lower end of the link forwardly, thereby engaging the hook with the pin.

When crosshead 280 is returned to its home position at the end of a multiplying cycle, cam face 495 on lever 201 urges follower 222 forwardly thereby effecting the elevation of link 500. Since hook 499 is engaged with pin 488, this motion serves to rock lever 486 in a counter-clockwise direction to break toggle links 477 and 478 and initiate a cycle of operation of the base mechanism. Thus, means have been provided to enable the machine to function automatically under the supervisory control of a group of record cards and independently of any attention on the part of the operator.

At times, of course, it is undesirable that the machine should function or continue to function automatically. These occasions arise when, 1. The machine is set for manual control
2. The machine is set for semi-automatic control
3. The supply of cards in the card magazine is exhausted
4. The sensing chamber is empty
5. A stop card is fed into the sensing chamber
6. The operator should desire to stop the machine during automatic operation It is apparent that if the lower end of link 500 is held in a rearward or disabled position when the link is elevated by the return of the multiplier crosshead, the hook 499 will be out of engagement with pin 488 on lever 486 and, therefore, will not effect the breaking of the toggles to restart the base mechanism for the subsequent machine cycle.

Suitable controlling devices have been incorporated with the present invention to disable link 500 in all of the above mentioned cases and each will be described in detail hereinafter.

*Operation controlling lever (Figs. 5, 7, 47, 48 and 49)*

The particular machine shown in the associated drawings may be operated automatically, semi-automatically or manually. When set for automatic operation, the machine will function under the supervisory control of a group of record cards independently of any attention on the part of the operator. When set for semi-automatic operation, the machine functions through a single cycle of operation with each depression of the starting button. When manually controlled, the base mechanism is entirely inoperative and the machine may be used only as a computing unit.

The control member for selecting the type of operation desired is a three-armed lever 501 (Fig. 5) pivoted on a stud 502 fixed to the frame plate 24, having a forwardly extending control handle 505 that protrudes through a slot 503 in the multiplier cover plate 307 and having its rearward portion suitably shaped to form two downwardly extending arms 504 and 506 (Fig. 49). The control arm 505 may be manually shifted to any one of three positions and in either case is centered by a resiliently urged positioning pawl 507, pivoted on stud 508 on plate 24, that engages V-shaped notches 509 formed on the lower end of arm 504. A slidable latch element 510 mounted on stud 508 is joined by a pin-in-slot connection to arm 504 and is resiliently urged rearwardly by spring 511. The forward end of latch 510 is provided with a downwardly extending arm that latches over a pin 512 on link 500 and is sufficiently long to engage the pin in either vertical position of the link. The other arm 506 of lever 501 is connected by a short link 513 to the swingable interponent 295. The upper end of interponent 295 is connected to an arm 296 fixed to transverse rock shaft 300 controlled by the multiplier motor trip bar 7 on the keyboard. The intermediate portion of the interponent has a shoulder 294 formed thereon that overlies a crosshead shifter tripping latch 293 (Fig. 38) and the lower end is guided in a slotted element 298 fixed to the frame.

When the machine is to be manually controlled, handle 505 is set in its lowest position as shown in Fig. 47. When lever 501 is in this position, the pawl 507 engages the foremost notch 509 on arm 504. Then slidable latch 510 has been moved to its rearmost position by the pin on arm 504 to disable link 500, and interponent 295 has been swung to its rearmost position by arm 506 so that its shoulder 294 overlies latch 293. Since the base mechanism is rendered inoperative during manual operation the latch 293 may be tripped to release the multiplier crosshead only upon depression of the motor trip bar 7. When handle 505 is moved to its intermediate position as in Fig. 48, the machine is set for semi-automatic operation.

In this case, the pawl 507 engages the middle notch 509 on arm 504; the pin on arm 504 is moved to the forepart of the slot in latch 510 but the latch is retained in its rearmost position by spring 511 to disable link 500, interponent 295 is shifted forwardly by arm 506 to a position wherein its shoulder 294 is ineffective on latch 293. Thus, it will be seen that a cycle of operation of the multiplying unit may not be initiated by depression of the trip bar 7, but only as an incident to a cycle of operation of the base mechanism.

When handle 505 is moved to its uppermost position, as shown in Fig. 49, the machine is set for automatic operation. In this case the pawl 507 engages the rearmost notch 509 on arm 504; the pin on arm 504 shifts latch 510 forwardly against the tension of spring 511 and link 500 is then free to move forwardly under control of spring 496 (Fig. 7) so that hook 499 may bear against pin 488 on the forwardly extending arm of lever 486, unless the link 500 is disabled by other means; interponent 295 is shifted to its foremost position wherein its shoulder 294 is ineffective on latch 293. Whereas the position of interponent 295 in the automatic setting varies from that in the semi-automatic setting, its effect in both cases is to prevent the tripping of latch 293 from the trip bar 7.

*Disabling base starting button (Figs. 7 and 51)*

Since the multiplying unit does not complete its cycle of operation until some time after the base mechanism has been stopped, means have been provided to nullify the effect of an inadvertent depression of the base starting button 465 during this period.

A hook element 497, riveted to the lower portion of link 500, is designed to encompass a pin 514 on the forwardly extending arm of lever 515. The lever 515 is pivoted on link 468 at 516 and the rearward arm of the lever extends under an ear formed by the bent portion of hook 471. When the multiplying unit is tripped by the action of cam 337, link 500 drops downwardly as described above and the upper portion of hook 497 depresses pin 514. This motion rocks lever 515 about its pivot and the rearward arm thereof raises hook 471 to a position out of the path of the toggle breaking arm 472. Fig. 51 shows these elements in their operated position. It will be seen that the start button mechanism is ineffective during the period in which the link 500 is in its lower position. When link 500 is raised at the end of a multiplying cycle, lever 515 is released and hook 471 is returned to operative position by the spring on arm 470.

*Automatic controls to stop machine during automatic operation (Figs. 26, 28 and 50)*

Devices similar in function to those employed in the Power's tabulating machine construction have been incorporated with the present invention to stop the machine when the sensing chamber is empty or when the supply of cards in the card magazine has been exhausted.

The usual spring pressed pin 518 Figs. 28 and 50) is mounted in suitable supports on the left-hand casting of the analyzing pin box and is adapted to be arrested by a card in the sensing chamber when the pin box is moved upwardly. If pin 518 is not arrested, it moves upwardly through suitable holes in the card chamber and elevates a pin 519 connected to the rearward end of an arm 520 (Fig. 50) that is secured on rock shaft 521. The rock shaft is mounted in suitable supports in frame piece 317 and has a downwardly depending arm 522 fixed on the extreme left-hand end thereof. The arm 522 is joined by a pin-in-slot connection to a link 523 that is connected at its forward end to link 500. When there is no card in the card chamber, pin 518 rises and effects a clockwise rocking of shaft 521 and the pin on arm 522 pulls link 523 rearwardly thereby moving link 500 to its disabled position to effect the stopping of the machine.

Since the rocking motion caused by pin 518 is only momentary, a spring urged latching element 524, mounted on frame 310, is designed to engage a turned-over ear on arm 522 when the arm is rocked. Thus, link 500 is held disabled until the operator restarts the machine by a subsequent depression of the starting button 465. When the button is operated as in Fig. 50, a rearward protrusion 525 on arm 469 engages a turned-over ear on the pendent arm of latch 524, rocks the latch out of engagement with arm 522 and allows pin 519 to drop to its undisplaced position over the card chamber. The turned-over ear on arm 522 slides under latch 524 holding it in a substantially horizontal position and link 500 is free to swing forwardly to its normal position.

The card magazine is provided with the usual spring-urged pin 526 (Fig. 28) that is normally held in its depressed position when there are cards in the magazine. The lower end of the pin is connected to the forwardly extending arm of an offset lever 527 that is pivoted on frame stud 528. The other arm of lever 527 is connected by a vertical link 529 (Fig. 50) to the forward end of a lever 530 that is loosely mounted on rock shaft 521. The rearwardly extending arm of lever 530 is provided with a pin 531 that projects under arm 520. It will be seen that as the last card is passed out of the magazine, pin 526 will be elevated to effect the rocking of arm 522, thereby disabling the link 500 and causing the machine to be stopped at the end of the cycle. When a new group of cards are placed in the magazine the above described linkage is returned to normal operating position as shown in Fig. 50 and the machine may be restarted by a subsequent depression of button 465.

*Card control to stop machine during automatic operation*

As described under the heading "Description of automatic operation" it may be necessary to stop the machine during an automatic run to enable the operator to set certain auxiliary mechanisms that are to function in the course of the run. This condition arises, for example, when a total is to be taken from each of the several series of cards that comprise the pack. In this case, a stop card is inserted in the pack at the end of each series of item cards. The card used herewith is the familiar stop card employed in tabulating machines and is blank except for a deep notch cut into the left-hand margin. The position of the notch is such that it overlies the pin 518 when the card is in the sensing chamber. Pin 518 is then enabled to rise as if there were no card in the chamber and effect the disabling of link 500 in the manner described under the heading "Automatic control to stop machine during automatic operation."

*Manual control to stop machine during automatic operation*

If for any reason it should become necessary to stop the machine during an automatic run, this may be accomplished by holding button 465 depressed until the end of a cycle. The pin 467 (Fig. 51) connecting plunger 466 with link 468 protrudes beyond the surface of the plunger and extends into the plane of link 500. Depression of button 465, during the period in which crosshead 280 is being returned to its home position, causes pin 467 to hold link 500 in its disabled position when the link is elevated.

*Punch and associated mechanisms*

The punching mechanism is of the well known Powers type disclosed and described in the above mentioned Patent 2,004,208. The punch mechanism (Figs. 26–29 inclusive) is operated by a gag setting mechanism which is controlled by the printing mechanism of the multiplying unit. Connecting the elements of the gag setting and punching mechanisms is a translator. The punch perforates the multiplication factors, products, or totals of a series of products, in the cards fed through the machine. The gag setting mechanism is included in the head multiplying unit and is disposed at the rear of the machine, while the translator unit and the punching mechanism are included in the base mechanism and are disposed below the gag setting unit.

*Gag setting unit (Figs. 2, 17, 18, 25 and 55)*

The gag setting unit, is enclosed within two side plates 550 (Figs. 17 and 18) which are connected by four tie rods 551. The side plates are supported by a bracket which is attached to the top of the base plate 6, and by a plate 552 (Fig. 25) which is disposed beneath the base plate and spaced from it by brackets 553 attached to its sides. A plurality of step plates 555 (Figs. 24 and 25) and an equal number of transfer racks 556 are supported within the side plates 550.

The step plates control the punching of the cards as they are fed through the machine. In the embodiment of the invention illustrated herein, one of the step plates controls the punching of control perforations, such as a perforation for controlling the clear key, twelve control the punching of the two multiplication factors and the remaining fourteen control the punching of a total of a series of products. Twelve of the fourteen step plates that control the punching of a total are used alternatively to control the punching of a single product. Thus, twenty-seven step plates are provided to control the punching of multiplication factors, products, and totals of products, in the cards fed through the machine. It is to be understood, however, that additional step plates may be added, if it is desired, to increase the capacity of the machine and enable it to punch multiplication factors, each having more than six digits, their products, or the total of a series of such products in the cards fed through the machine.

The step plates are supported by bars 551 (Fig. 55) secured to the side plates 550 and extending through longitudinal slots near the upper edge of the plates. A series of transfers racks 556 one for each stepped plate are supported by bars 559 which are secured to the side plates 550 and extend through vertical slots in the racks. Between each rack is disposed a rod 560 which forms a tooth of a comb. The rods are supported by brackets 561 secured to the side plates. The upper end of each rack is provided with a lug 562 which is adapted to engage the lower edge of a step plate 555. The transfer racks are tensioned upwardly by individual springs 563, secured between shoulders 564 on the racks and the bracket 561. The step plates are normally held in their lowered position by a bail 258 operated by lever 242 as described above (Fig. 43).

This bar engages a second shoulder 565 on the racks and its opposite ends extends through slots 566 in the side plates 550.

The step plates 555 are adapted to be moved longitudinally by the factor, product, and total plates, through a yoke arm 567 secured to each of the sector arms 126 and 134. The arms 567 are each operatively connected to one of the step plates by a link 568.

Each step plate 555 is provided with nine steps 569, the lowest of these steps corresponding to 1, and each higher step corresponding to one of the ascending numbers up to 9. When a step plate is moved to the right by its associated factor, product or total sector arm 126 or 134, as the case may be, a step 569 corresponding to the number represented by the movement of the sector arm is positioned above and in the path of the lug 562 on the associated transfer rack. Thus, if a sector arm has been moved a distance representing the number 8, the 8th step of the associated step plate is positioned above the lug 562. After the set plates have been variably set, the bail 258 is raised to permit the transfer racks, associated with step plates that have been moved longitudinally, to rise under tension of springs 563 until the lug 562 on each step plate engages the step 569 which has been positioned in its path. The upward movement of the transfer racks is guided by the spacer rods 560. Each of the remaining transfer racks is held against upward movement by the lower edge of its associated unoperated step plate, which corresponds to zero and remains in the path of the lug 562 on the transfer rack. The ball 258 (Fig. 55) is lifted at the proper time by a rock shaft 255 mounted in suitable bearings in the side plate 550. To each end of the shaft is secured a lever 256 and links 257 connected in turn to the ends of the bail 258. Secured to the shaft 255 outside the frame is a lever 253 which is connected to crank 246 by a link 254. The crank 246 is operated as described above by the sector restoring arm 242 secured to the shaft 243.

The step plates 555 are operatively connected to the factor, product and total sector arms 126 and 134, as previously stated, and hence the fourteen step plates associated with the plates in the product and total sections will slam when the accumulator wheels 147 disengage from their associated racks during a clearing operation, unless means are provided for preventing this result. For this purpose, each of these fourteen step plates is provided on its upper edge with a rack having one less tooth than the number of steps 569 on the step plates. Cooperating with these racks are fourteen pawls 92 loosely mounted on a rock shaft 87 described above under the heading of "Total accumulating mechanism and control key." When the accumulator wheels 147 in the product or total section are disengaged from their associated racks 126 during a clearing operation, the pawls 92 cooperate with their associated racks 555 to restore the step plates to their normal position without slamming. These pawls are controlled by the operation of the "Total" key. The remaining step plates 555 in the gag setting unit, being operatively connected to the arms 134 in the factor sections, do not require this pawl and ratchet control to prevent slamming of the step plates during a clearing operation, as they have no accumulator wheels associated therewith.

It is sometimes desired to run a stack of cards, each bearing pre-punched multiplication factors, through the machine, without punching the products of these factors on the cards. Instead the products are accumulated in the totalizer of the multiplying head and then the total of these accumulations is punched in a summary card. It may also be desired to prevent the punching of either the multiplicand or multiplier in the individual cards, as in group multiplying, when one of the multiplication factors is contained only in the first card of the group. To carry out these objects, there is provided a series of stops 575 for preventing the actuation of the transfer racks when the release bar 258 is raised. There is one of these stops for each transfer rack, and they are slidably mounted in a bracket 576 secured to the side plates. These stops are manually positioned to engage the shoulder 564 on any of the transfer racks to prevent the upward movement of the racks when the release bar 258 is lifted. A number plate 577 mounted on top of the bracket 576 serves to identify each of the stops. The locking of a transfer rack, as will be seen later, prevents the operation of its associated gag setting member.

The movement of the transfer racks 556 is transmitted through the pinions 578 to the horizontal slide racks 579 which actuate the gag setting slides 580 hereinafter described. The pinions 578 are mounted on a shaft 581 provided with suitable bearings in a bracket 582 which is secured to the plate 552. There is one of these slide racks for each transfer rack, and they are supported by bars 583 which are secured to the lugs 584 and the bars 585 secured to the bracket and extend through slots 586 provided in the slide racks. The slide racks are disposed between the teeth of the front comb bar 587 and of rear comb bar 585 which serve to guide the movement of the racks. The pinions 578 are wide enough to permit both a slide rack and a transfer rack to engage the teeth of the same pinion, while the slide racks are sufficiently spaced from one another to permit the passage of a transfer rack between adjacent slide racks.

The gag setting slides 580 are equal in number to the number of slide racks. The slides 580 are substantially rectangular in shape with five L-shaped gag setting lugs 589 depending from the bottom edge. Associated with each gag slide are two U-bars 590 which have their opposite ends fixed in similarly shaped openings in the side plates 591 which are attached to the opposite side of the castings 592. One of the U-bars 590 associated with each gag slide is disposed above the other and the gag slide is slidably mounted between the two bars by means of rollers 593 which are mounted on studs on the slide 580. Each gag slide is connected to one of the slide racks 579 whereby the gags on the gag slides may be variably set through the slide racks 579, the pinions 578 and the transfer racks 556, by the step plates 555.

The gag setting slides 580 are adapted to be lowered after the gags have been set to control the punch mechanism through a translator. The castings 592 are slidably mounted on studs 594 secured to the base plate 552. The castings are normally biased upwards towards the plate 552 by springs 595 which extend between arms 596 at each end of the side plates 591 and the base plate. A rock shaft 597 serves to lower the gag unit at the proper time. This shaft is operatively connected to the castings 592 by two bifurcated arms 598 and is supported by brackets 599 secured to the base plate. Each arm has one end rigidly secured to the shaft, and the other end engaging opposite sides of a square shaped collar 600 (Figs. 25 and 26) which is loosely disposed on a stud 601 extending from a plate 602 fixed to the castings. The collar is bored eccentrically to enable the distance between the bottoms of the gag setting lugs 589 and the top of the translator unit to be adjusted by reversing the position of the collar on the stud 601. The collars may be retained on the studs 601 by any suitable means, such as a keeper (not shown) which fits into a groove (not shown) cut on the stud. The shaft 597 is rocked by lever 233 (Fig. 43) in the multiplying mechanism, through the medium of bellcrank 238, link 204 and lever 205 which is connected to the shaft.

*Punch translator (Figs. 19, 20, 26, 27, 59 and 60)*

The punch translator is housed in a casing consisting of side plates 610 (Figs. 19 and 20) and end plates 611 attached thereto to form a rectangular frame. A plurality of slugs 615 (Figs. 25 and 26), Bowden wires 621 and pins 626 are supported within this casing. It may be mentioned at this point that the translator unit employed when forty-five column cards are punched differs in some respects from the one employed when ninety-column cards are punched. These differences will be pointed out later. At this time, the translator used when 90-column cards are punched will be described.

There are twenty-seven rows or columns of slugs (Fig. 59), five in each column of the ninety-column translator. There is thus one column of these for each gag setting slide 580. The slugs are each provided with a body portion 615 and fingers 616 and 617 projecting upwards from the body portion. The body portions of these slugs are disposed in slots in the plate 618 and the fingers 616 and 617 extend through openings in a plate 619. The plate 619 is fixed to a top flange of the side plates 610 while the plate 618 is fixed to blocks 620 which depend from the lower surface of the plate 619. As the openings in the plates 618 and 619 are arranged in rows and columns in the same manner as the rows and columns of a punched card, the slugs are similarly arranged. The Bowden wires 621 are connected in an upper terminal plate 622 and a lower terminal plate 623. The upper and lower terminal plates are supported on blocks fixed to the side plates 610. These terminal plates have a plurality of holes 624 equal to the number of openings in each of the plates 618 and 619, the holes in the upper plate being tapped and those in the lower plate being untapped, and like the openings in the plates 618 and 619, the holes in the terminal plates are arranged in rows and columns. Each of the Bowden wires 621 is provided with a sleeve 625 covering the casing of the wire at its end, and is provided with a threaded end portion terminating in the shoulder. The Bowden wires are connected to these terminal plates by screwing the threaded portion of the upper sleeve into a tapped hole in the upper plate until the shoulder abuts the plate, and then inserting the reduced end portion of the lower sleeve into one of the holes in the lower plate and securing it in place by means of a split nut. When thus connected, each Bowden wire operatively connects one of the slugs and a pin member 626. By varying the location of the Bowden wires in the upper and lower terminal plates, the punching mechanism may be caused to perforate the multiplication factors, product and total in any desired area of the cards as they pass through the machine. The pins 626 are disposed in holes in the plates 627 and 628. The plate 627 is supported by blocks which rest on the plate 628, which is secured to lugs on the bottom of the side plates 610. As the openings in the plates 627 and 628 are arranged in rows and columns, the pin members are likewise arranged in this manner. The pin members are provided with individual springs, tensioned between the plate 628 and shoulders 630, which normally hold the pins in raised position. As the pin members are individually associated with the Bowden wires, and these wires are individually associated with the slugs, the spring associated with each pin member, serves to hold its associated slug in its raised position, and the depression of any slug will accordingly depress the corresponding pin member.

As different translators are employed when forty-five and ninety column cards are to be punched, the translators are adapted to be removed from the machine and replaced by another one. An L-shaped block 631 is attached to the bottom of each side plate 610 of the translator casing. The grooves provided by these blocks fit over the top flanges 632 of the side plates 633 of the punch unit, whereby the translator unit may be slidably moved over these top flanges both into and out of its operative position. To insure that the translator unit will be invariably positioned in the proper relation to the gag setting lugs 589 and the punch gags 635, means are provided for locking the translator unit to the top flanges 632 when it is moved into its proper position. A latch 636 is pivotally secured to one of the end plates 611 of the translator unit and is normally biased downward by a spring 637. The latch 636 is formed with a long arm 640 (Fig. 11) which cooperates with a notch 639 in the top flanges 632. To place the translator in the machine, the grooves in the blocks 631 are engaged with the flanges 632, and the translator is pushed into the machine until the finger 640 snaps into the notch 639 and locks the translator in position. To remove the translator from the machine, the finger 640 is lifted out of the notches against the tension of spring 637, and the translator unit is then easily removed from the machine.

It is well understood in the art that 90-column cards are perforated in a five unit code. The 90 column cards are divided into an upper and lower zone in which only five perforations are used to represent odd numbers by a single perforation corresponding to the number, while even numbers are represented by two perforations corresponding to the next lower odd number and to nine. Thus, 1, 3, 5, 7 and 9 are represented by a single perforation corresponding respectively to these numbers, while 2, 4, 6 and 8 are each represented by two perforations corresponding respectively to 1 and 9, 3 and 9, 5 and 9, and 7 and 9. The gag slides 580 are so designed that when an odd number is to be punched, finger 616 of slug 615 corresponding to that number, is depressed by one of the lugs 589, and when an even number is to be punched, fingers 617 on two slugs 615, corresponding to that number and to 9, are depressed. It is evident from the above description and frim (Fig. 59) that the depression of a finger 616 on a single slug causes the depression of a pin 626 corresponding to the same number, and that the depression of a finger 617 on a slug 615 and a finger 617 on a nine pin 626 causes the depression of a punch gag 635 corresponding to the next lower odd number and the depression of the nine punch gag 635.

The 45-column translator is similar in construction ot the 90-column translator except that there are ten slugs 615 (Fig. 60) in each column instead of five and there is only one finger formed thereon. As is well known, in 45-column cards each digit is represented by a perforation so there are therefore ten pins 626 in the lower portion of the translator. The Bowden wire connections are varied so that each slug 615 is connected to a pin 626 in the same column. It will be seen from Fig. 60 that the operation of a "1" slug will cause the operation of a "1" pin 626, a "2" slug a "2" pin and so forth.

Punch mechanism (Figs. 28 and 29)

The punch mechanism consists of a plurality of punches 645 corresponding in number and arrangement to the layout of twenty-seven columns of a punched card. The punches are supported by their heads 646 from an upper plate 647 and their shanks are arranged to slide in openings in a guide plate 648 and are aligned with the openings in the stripper plate 649. The upper and lower die plates 648 and 649 are spaced to form a card chamber in which the cards are suitably arrested and held before being punched. The plate 647 is stationary but the plates 648 and 649 are vertically reciprocable so that a card in the card chamber is raised into engagement with the punches 645. Unless the punches are held against upward movement, they are pushed up by the cards and the card will remain unperforated.

The guide plate and the stripper plates are reciprocated in proper timed relation to the cycle of operation of the machine by means of a rock arm 650. One end of this arm is bifurcated and cooperates with a stud 651 fixed to the frame 652 which carries the plates 648 and 649, while the other end is provided with a follower 653 which cooperates with a cam 384. This cam is mounted on the cam shaft 376. The driving means for this cam is described in detail under the heading "Base drive mechanism."

After the cards have been sensed, they are ejected from the sensing chamber and conveyed by feed rolls 350 and 351 (Figs. 28 and 29) through guides 655, attached to the frame 652, and into the path of skid rollers 656 which cooperate with pressure rollers in a well known manner to draw the card into the card chamber. To arrest the cards when they are properly positioned in this chamber, a card stop 657 is provided which is normally in its raised position in which it arrests any card that enters the card chamber. This card stop is in the form of a bracket 658 slidably mounted on the frame 652 and held in raised position by a spring 659 tensioned between the bracket and the frame. The card stop is an arm of this bracket and extends through an opening in the stripper plate 649 and into an opening in the guide plate 648.

To reciprocate the card stop there is provided a link 660, a lever 661, an arm 662, and a cam 383. The link 660 is connected to the card stop bracket 658 by a pin and slot connection and is pivotally connected to the lever 661. The lever 661 is pivoted to an angle plate 663 attached to one of the side castings. A spring 664, tensioned between the angle plate 663 and the lever 661, holds the follower 665, carried by the arm 662, in engagement with the cam 383. The cam 383 is suitably mounted on the shaft 376. When the follower 665 engages the high portion of the cam, the link 660 is lowered, thereby depressing the card stop bracket 658 and retracting the card stop 657 out of the path of the card positioned in the card chamber.

After the arrested card is punched, a receptacle 666, disposed below the punch unit, catches the card punchings and conveys them through an opening in the head of the machine, where they may be caught by a receiver and disposed of when desired.

When the card stop 657 is retracted, the skid rollers 656 eject the card from the card chamber into the path of eject rollers 361 and 362, which deposit the cards in the card receptacle 369. This receptacle includes a casing having two spring fingers 370 for deflecting the ejected card into the card receptacle. The receptacle is provided with a spring pressed plunger plate for supporting the stack of cards. Interposed between the punches and the translator is a gag unit which performs the function of preventing the upward movement of predetermined punches 645 when the punches are raised, thereby causing them to be gagged to perforate the card in the card chamber.

The gag bar unit consists of a plurality of gags 635 reciprocally mounted between an upper plate 670 and a lower plate 671 with their upper and lower ends extending through openings in these plates. The plates 670 and 671 are secured to side plates 633, which are supported on brackets attached to the side castings of the frame. Each of the gag pins is disposed above and aligned with one of the punches 645, and is normally held out of the path of this punch, when the punching unit is raised, by a spring 672 disposed between the lower plate 671 and a shoulder on the gag pins. When the pins are depressed, they are held in this position and in the path of the raised punches by means of latching slides 673. Like the punches, the setting pins are arranged in rows and columns in the same manner as the layout of a card, and there is one of these latching slides for each column of setting pins. This slide is provided with a cut-out portion forming a nose shaped projection for each of the gag pins and each pin is provided with an extrusion 674 which is engaged by the projection when the gag is depressed. The latching slides are biased towards the right by a comb-shaped leaf spring 675, having teeth individual to the latching slides, which is secured in a vise-shaped bracket attached to one of the side plates 633. The latching slides are actuated, after each card is punched, to release the locking pins 674 on the depressed gags 635 from the nose-shaped projections on the associated latching slides. A universal U-bar 677, supported by a bell crank 678 cooperates with an extension on one end of each latching slide. The bell crank 678 is supported on a rock shaft 680 provided with bearings in the side castings of the frame. The bell crank 678 is rocked by a lever 681 which is connected to the bell crank 679, which cooperates with a cam 385, mounted on a shaft 376. The lever 681 is pivoted at one end to a slide casting on the frame, and a spring 683, tensioned between the lever and one of the side castings of the frame, holds the follower 682 in engagement with the cam 385. When the follower 682 engages the high portion of the cam, the latching slides 673 are moved to the left against the tension of the teeth of the leaf springs, thereby releasing any of the previously depressed gag pins 635; but when the follower reengages the low portion of the cam, the latching slides are again moved to the right, where they are held by spring 675, and are again in position to lock the setting pins 635 in their depressed position.

*Résumé of operations*

From the preceding description the operation of the machine will be clear. In Figs. 61, 61A, 61B, and 61C are shown a group of the cards used in a normal problem performed by the machine. The card 685 is a sample of a prepunched card. The multiplier is perforated in the upper zone and the multiplicand in the lower zone. The card 686 is the same card after being passed through the machine with the product perforated therein. The card 688 is a summary card in which is perforated the total of the products in the cards 686 and 687.

In Figs. 62 and 62A are shown a group of cards for performing group multiplication, that is multiplying a plurality of different multiplicands by one multiplier. In card 689 is perforated the group multiplier, in cards 690 and 691 are perforated two different multiplicands and their products. Card 692 is a control card having a control hole 693 perforated therein. This control hole causes the operation of the clear key in the multiplier section thereby clearing out the group multiplier. Card 694 contains a new group multiplier and 695 the first of a series of new multiplicands. These cards are run through the machine in the order shown in Fig. 62 and if a total is desired a blank card is positioned in the stack at the point where a total is desired. Before the blank card is positioned a stop card (see description under heading "Card control to stop machine") which stops the machine to permit the operator to depress the "Total" key. The depression of this key causes the machine to take a total which is perforated in the blank or summary card.

In view of the fact that group multiplication requires the full operation of the machine a brief description referring to Figs. 64, 65, and 66 will now be given.

To prepare the machine for group multiplication the multiplier "Repeat" key is depressed and the lever 505 is set in the uppermost position to obtain full mechanical operation. The stack of cards grouped as shown in Fig. 62 is placed in the magazine 386. The starting button 465 is operated thus starting the base mechanism which operates the picker knife 526 in the feed mechanism. The picker knife (Fig. 64) engages the first card at approximately 209 degrees of the first cycle and carries the card between the feed rolls 338 and 339 at about 276 degrees of the first cycle. The end of the cycle finds the card positioned between the feed rolls. The machine stops at this time due to the fact that there is no card in the sensing chamber; therefore "no card" pin 518 is effective.

The starting button is again operated and the drive mechanism causes the card stop 391 to start down into the path of the card at about 3 degrees of the second cycle. The same operation occurred on the first cycle but had no effect as there was no card entering the sensing chamber. The card stop is down in fully effective position at about 21 degrees. In the meantime the first card has been carried into the sensing chamber by the feed rolls and comes to rest against the card stop 391 at about 52 degrees of the second cycle. Simultaneously therewith the lower pin bar of the sensing head containing sensing pins 409 is rising until the pins reach the card at about 54 degrees of the second cycle. This box was also raised during the first cycle but did not cause a set-up due to there being no card in the sensing chamber. At about 170 degrees the sensing pins are fully raised, thereby operating the bars 30 in the key set-up mechanism through the Bowden wires 435 in the sensing translator.

After the sensing pins have set the bars 30 they immediately start down again. The bars 30 depress the multiplier digit key shanks 10, in the multiplying unit, thereby setting the ends thereof in the path of bars 22, which in turn determine the position of the tappet 57, thereby selecting the correct step on the partial product plates 46 of the particular group selected by the multiplicand bar 22.

At about 209 degrees of the second cycle the card picker engages the second card and moves it toward the feed rolls and at 235 degrees the link 490 is drawn down by cam 337 to trip the latch 293 to release the cross head 280.

During the above period the card stop 391 has remained down holding the card in the sensing chamber. At about 283 degrees the stop starts up and is fully raised at 301 degrees. The sensing pins which have started down will leave the card at about 286 degrees and the card will leave the sensing chamber at about 297 degrees. In the meantime the second card reaches the feed rolls at about 276 degrees. It is apparent from the above that at the end of the second cycle of the base mechanism the first card is leaving the sensing chamber and the second card is just between the feed rolls 338 and 339.

As the operation of the multiplying unit is controlled by the operation of the cross head 280 independent of the base except for its start which is mentioned above occurred at about 235 degrees of each cycle of the base, the timing thereof will be taken up later on.

During the forward and backward travel of the cross head the data sensed from the first card is multiplied and the multiplier and multiplicand and product are printed and the product is set up in the set bars 674 awaiting the operation of the punch.

When the cross head 280 returns to normal the link 500 is raised thereby automatically starting the base mechanism on its third cycle. About the first degree of movement the first card reaches the intermediate rolls 350 and 351 at the same time the punch card stop 659 starts down and is closed at about 10 degrees. At about 40 degrees the stop is fully down and the card reaches the stop at approximately the same time.

At about 52 degrees of the third cycle the second card reaches the sensing card stop and is being sensed while the first card is being perforated. At about 55 degrees the punch die 649 starts up under control of cam 348 and at approximately 175 degrees the die is fully raised thereby perforating the card. The die remains up until about 180 degrees when it starts down and at about 205 degrees the card stop starts up. The stop is raised sufficiently at about 235 degrees for the card to leave the punch. In the meantime the die 649 is restored to normal at about 230 degrees. The set bar retract bail 677 is started in by the action of cam 385, at about 240 degrees and the locking slides 673 are fully unlatched at about 280 degrees. The cam 385 restores the retract bail 678 to normal at about 320 degrees. At about 329 degrees the first card reaches the eject rolls 365 and 366 and enters the storage magazine 369 shortly thereafter. At the time the first card leaves the punch, i. e., 235 degrees, the multiplying unit is tripped to start multiplying the data taken from the second card. Approximately 41 degrees later the third card is picked up by the card picker and started through the machine.

In the type of problem being described, i. e., group multiplication, the first card 689 (Fig. 62) contains the group multiplier which is set up in the multiplier section of the keyboard and although the cross head 280 goes through a complete cycle of movement no multiplying action occurs and the multiplier is printed. When the second card, i. e., 690, containing the first multiplicand of the group is sensed, the cycle of movement of the cross head causes the two items to be multiplied and the product to be punched in the card and the product stored in the totalizer.

It will be apparent from the above that a card is being punched with the product of the factor or factors contained in the card at approximately the same time that a second or following card is being sensed for data. Also the base unit controls the starting of the multiplying unit at about 235 degrees of each cycle which is completed and the base stops until the multiplying unit ends a complete cycle at the end of which it restarts the base unit.

When a control card 692 (Fig. 62A) reaches the sensing chamber and is sensed the control hole 693 sets the bar 30 associated with the "Clear" key, thereby preparing the clearing mechanism in the multiplying unit to clear out the group multiplier set in by the first card. The "Repeat" key being still depressed, the following card 694 containing the new group multiplier will set the factor in the machine.

Reference is now made to Fig. 65 which shows the timing of the operation of the separate mechanism of the multiplying unit under control of the cross head 280, the travel of which is shown in inches. It is to be understood, however, that the chart really only shows proportional movements which may be varied without in any way affecting the general operation of the machine.

As described above, at about 235 degrees in the cycle of the base mechanism, the latch 293 in the multiplying mechanism is released, permitting bumper 287 to close the contacts 303, thereby starting the motor which drives the cross head 280 to the left.

At the start of the travel the pin 200 in the head 280 is in engagement with the lever 201 which is rocked clockwise the distance O—A at which time the depressed keys are locked down and the remainder are locked against accidental depression. In the travel from A—B there is no effective work done. Upon reaching point B the pin 200 contacts lever 210 and immediately thereafter the bail 215 is raised, thereby releasing the set-up bars 22 and the multiplicant slides 72. The tappets 57 controlling the partial product plates 46 start up at this time. By the time the cross head has travelled from B—C the tappets 57 will be fully up in position to select the desired partial product plates. At point D the pin 200 leaves contact with the lever 210 and at point E enters the cam lever 221. Immediately thereafter the partial product plates 46 are released by the rocking of the cross head 64 to permit the bar 61 to rotate in order to position the tappets 57 in contact with the partial product plates. The release of the partial product plates is completed at point F in the cross head travel. At this point the rollers 226 enter the grooves 240, thereby rotating the shafts 227 and 230. The rotation of shaft 230 permits the hollow receiver shafts 91 to rotate under the power of their internal springs to set the receivers 93 which have been positioned by the combined action of partial product plates 46 and the plates 72 to correspond to the digits of the partial products.

When the cross head reaches the point G the pin 200 contacts lever 233 which controls the setting of the totalizers. The timing of operation of the totalizers is shown in a separate chart, Fig. 27 of Patent 2,084,831, will be described hereinafter. It will be noted that the time of rotation of the shaft 227 overlaps that of the rotation of lever 233 from G—H.

When the cross head reaches the point I the lever 242 is picked up and rocked together with lever 233. Immediately after the lever 233 starts to move, the bail 251 is raised and the sectors 126 are positioned in accordance with the product in the product cups 110 on the ends of shafts 91. The positioning of the sectors 126 also positions the sectors 140 preparatory to entering the product in the accumulator wheels 147 of the totalizer. The plates 555 are positioned at this time to prepare for setting the punch gags 589 in accordance with the multiplier, multiplicand and product. At point J the lever 242 stops rotating and the pin 200 moves along the flat portion of the lever. Lever 233 continues rotating, however, until the point K is reached by the cross head at which time the bell-crank 238 is rocked by link 239 to lower the punch gags into contact with the pins 617 of the punch translator. The pins 617 are connected by Bowden wires to the stop pins 443 which are locked up to await the operation of the punch on the next cycle of the base. At point L the toe of lever 233 contacts the pin 458 on the lever 459. Travel from L to M will cause the bail 158 to be raised locking up the carry racks 154 and the punch gags will be fully lowered at the point M which is the extreme limit of the travel of the cross head.

As described above the clutches on the cross head are reversed at the end of the rearward travel and the head starts back. The lever 233 is rotated in a reverse direction and at N the punch gags 589 are fully restored. At O the pin 200 moves off of the flat portion of arm 242 and enters the slot therein and rotates it from O to P at which point the sectors 126 and plates 555 are restored. The sectors 140, during their return, roll the product into the accumulators 147. At O the rolls 226 enter the grooves 240, thereby rotating the shaft 227 to restore the shaft 91 to normal against the internal spring.

At approximately the point R in the travel the pin 200 engages arm 422, thereby unlocking the bell-crank 461, permitting the bail 158 to release the carry racks 154. The shaft 227 is rotated until the cross head reaches S when the pin 200 enters the groove 241 therein.

The partial product plates are restored to normal by cam lever 221 between the points T to V. At V the lever 210 is again engaged and moved to W where the tappets 57, set-up bars 22 and multiplicand slides 72 are started back to normal which condition they reach when the cross head reaches X.

At the point Y the lever 201 is engaged and immediately thereafter the keys are released. The cross head continues to move until almost the point Z where the lever 201 rocks the lever 220 which raises the link 500 restarting the base drive mechanism. At Z the cross head opens the contacts 303, thereby stopping the drive motor for the multiplying unit.

The multiplying mechanism operates as described above in all types of problems with the exception of the control of the base by the link 500 which is determined by the setting of the lever 505.

The cam plates 151 and 152 (Fig. 6 of Patent 2,084,831) secured to the shaft 234 are adapted to shift the rams 186 and 193 which control the engagement and disengagement of the accumulator wheels 147 with the sectors 140 in accordance with whichever control key is operated.

If the "Non-add" key is depressed the mechanism of Fig. 52 is positioned to effect the operation shown at (1) Fig. 27 of Patent 2,084,831. The parts are in normal position at the point P. As the multiplier and a multiplicand have been set in the keyboard and the various partial products consolidated into the final product it is now necessary to control the accumulators 147 to prevent the entering of the product therein. As the sectors 140 move from I to J no movement of the carrier arm 145 will take place. As the sectors, however, come to rest at J and during the period from J to L, the carrier 145 is oscillated to mesh the accumulators 147 alternately with the sectors 140 and the carry racks 154. This is accomplished by what now amounts to a direct connection between the ram 186 and the link 178, without lost motion, there being no connection at this time between the link 178 and the ram 193. At the close of the period J to L, therefore, during which time the sectors 140 are stationary, the accumulators 147 have been moved into and out of mesh with the sectors without receiving any movement therefrom, the return movement from L to M taking place after the accumulators 147 have moved out of mesh with the sectors. Accordingly, the product will not be added into the totalizer but it will be printed and punched in the card.

The carry mechanism becomes operative at point K at which time the accumulators 147 are in mesh with the sectors 140 and the carry racks 154 are free to be elevated. The racks remain in this position until the point N is reached and during the period N to O, at which time the sectors are in mesh with the racks, they are released and permitted to be lowered to effect the carry.

When the "Non-add" key is released the machine is in its normal condition, i. e., prepared to add the separate products into the totalizer. In the normal position of the parts shown in Figs. 53 and 54 the lug 179 is held so as to be in the path of the upper shoulder on ram 193 and to lie within the slot in the ram 186. These rams are operated in succession by the cam arms 151 and 152, the cam arm 152 operating to shift the ram 193 to the left (Fig. 54) during the period from H to L (Fig. 27 of Patent 2,084,831 (2)) and to the right during the period M to N. The cam arm 151, however, shifts the ram 186 to the left during the period J to K and to the right during the period K to L.

It will be seen that during period H to I there is no movement of the link 178 for the upper shoulder on ram 193 is drawn away from the lug 179. During the period J to K the ram 186 in moving to the left will engage lug 179 with the right hand shoulder and shift the link 178 so as to rock lever 144 and shaft 149 to cam the accumulators 147 into mesh with the sectors 140. This occurs as is shown in the timing chart after the sectors have been set in accordance with the product in the receivers 110.

On the return of the ram 186 during the period K to L the lug 179 will move freely in the slot in the ram, thereby leaving the accumulators in mesh with the sectors for the period L to M during which time the sectors are returned to normal. Thus the product will be set in the accumulators. During the period M to N, the return of ram 193 by cam 151 will cause the upper shoulder to engage the lug 179 and rock the accumulators out of mesh with the sectors and into mesh with the carry racks. Here as described above the carry racks are moved up at K and down during period N to O to cause carry of the surplus from one accumulator to the next higher.

When the "Sub-total" key is operated the lugs 179 and 181 are so positioned that the ram 193 alone is effective, the lug 179 being positioned in the slot in ram 186 and in line to engage the shoulder of ram 193. When the ram 193 is moved to the left during the period H to I and to the right during the period M to N it is apparent that the accumulators 147 are brought into mesh with the sectors before they are positioned and remain in mesh until they are returned, thereby rolling the total out to control the positioning of the sectors for printing and punching and then rolling the total back into the accumulator for further use. The accumulators 147 are rotated on the downward movement of the sectors, i. e., I to J, until the zero stop teeth 160 contact the pawl 161 with the result that the amount in the totalizer is set in the sectors which amount is printed during period J to K.

As described in the above mentioned patents to Baumann et al. an arm similar to 173 (Fig. 53) is adapted to be operated by the "Sub-total" and "Total" keys for shifting the cam plate 146 to move plate 117 into position to set the stops 119 in line with the "9" steps 94 on the receivers 110, thereby locking them from rotation when the sectors 126 are released to permit the sectors 140 free movement in total taking.

In taking a straight-total, i. e., a series of products or items set in the totalizer, the total then appearing is set in the type bars and the punch gags by the sectors and printed and set up in the punch and thereafter the accumulator in the totalizer is cleared, i. e., restored to zero. To accomplish this the accumulators 147 are moved into mesh with the sectors 140 before they are released, and disengaged before they are restored to normal.

Upon depression of the "Total" key the link 180 is raised so as to place its lug 181 between the shoulders 194 of the ram 193 while the link 178 is raised to clear its lug 179 from the notch in the ram 186. As the ram 193 moves forward from position H to I (Fig. 27 of Patent 2,084,831 (4)), the lug 181 carries link 180 to the left (Fig. 53) rocking the accumulators 147 into mesh with the sectors 140. During the movement of link 180 the pin 181 thereon moves over the arm 192 raising the cam end 187. On the return movement of the ram 186 the pin 185 thereon engages the cam 187 and raises the link 180, thereby placing the lug 181 thereon in the slot 192 as well as moves the lug 190 into the path of the latch 188. As the ram 186 continues its return movement during the period K to L the link 180 will be carried with it, while the lug 181 slides free in the slot 192. When the pin 182 reaches the end of arm 183, the link 180 is disengaged. The subsequent return of ram 193 during the period M to N aligns the lug 181 with the shoulders 194 and permits the link 180 to drop to normal position.

The product cups 110 are locked in their "9" position by the same means as described under the taking of a sub-total.

Subtraction is performed by operating the "Subtract" key which causes the accumulators to go through the same phases of operation as in adding except that the six higher order product cups 110 are locked in the "9" position.

To start this type of operation the start button 465 is operated thus feeding the first card into the sensing feed rolls where it is held. The factor not punched in the card is set up manually on the keyboard and the starting button is again operated. This causes the card to be fed into the sensing chamber and the factor sensed, is set up in the keyboard. The two factors are now used to compute the product which is punched in the card and printed on a record sheet. After this computation is completed the cross head returns to its home position but with the lever 505 in the mid position the link 500 is no longer effective to restart the base drive mechanism. In the meantime the second card in the stack has been fed into the sensing feed rolls. After a second factor has been set up in the keyboard by the operator and the starting button 465 operated the second card is sensed and the computation started. At the same time the first card is fed into the punch and the missing factor and product perforated therein.

It is obvious that there will be times when it is undesirable that the factors or product be punched in the cards. If this is the case the gag slides of any particular part or all of the factors and product may be blocked by stops 515 to prevent the punching of the undesired item in the card.

Another type of semi-automatic operation is for use with blank cards. The multiplication factors are set up in the keyboard manually and the machine operates through a single cycle and stops permitting the operator to set up the new set of factors after which the machine is started again. The multiplication factors and product are punched in the blank cards.

In manual operation the control lever 505 is set in the lowermost position and the motor 313 in the base is stopped by operating switch 314. The cross head 280 of the multiplying mechanism is now under control of the trip bar 7 and the factors are set in manually and printed on a record sheet but not perforated in a card.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a calculating machine, card sensing mechanism adapted to sense multiplication factors from punched cards, a keyboard, a set pin basket adapted to be controlled by said sensing mechanism, a decoder containing selectable stop members said keyboard and set pin basket individually controlling said decoder, said set pin basket having a group of set pins through which a multi-digit group multiplication factor sensed from one card controls the selection of stop members in said decoder and a second set of pins through which multi-digit factors sensed from succeeding cards are set up in said decoder, a repeat mechanism in said decoder associated with said first set of pins, adapted to control the release of said stop members by a special perforation and a multiplying mechanism adapted to perform concurrent multi-digital computations under control of the stop members in said decoder to obtain the product of the group factor and each individual factor sensed from a card.

2. In a calculating machine, a card sensing mechanism adapted to sense multiplication factors from punched cards, a keyboard, a set pin basket adapted to be controlled by said sensing mechanism, a decoder containing selectable stop members said keyboard and set pin basket individually controlling said decoder, said set pin basket having a group of set pins through which a multi-digit group multiplication factor sensed from one card controls the selection of stop members in said decoder and a second set of pins through which multi-digit factors sensed from succeeding cards are set up in said decoder, a locking bar in said decoder for maintaining the setting of each of said groups of stop members, said locking bar being actuated once each machine cycle to wipe out said set-up, a repeat mechanism in said decoder associated with said first set of pins adapted to disable the rocking of said bar to prevent the release of said stop members containing the group factor set up, said repeat mechanism being controlled by a special perforation to permit release of said stop members, and a multiplying mechanism adapted to perform concurrent multi-digit computations under control of said decoder to obtain the product of the group factor and each individual factor sensed from a card.

3. In a calculating mechanism, a card sensing means adapted to sense multiplication factors from punched cards, a keyboard a set pin basket adapted to be controlled by said sensing means, a decoder containing selectable stop members, said keyboard and set pin basket individually controlling said decoder, said keyboard having a group of keys through which the stop members representing a multi-digit group multiplication factor may be set up in said decoder, said pin basket having a set of set pins through which stop members in said decoder representing multi-digit factors sensed from a group of cards may be set up, a repeat mechanism in said decoder adapted to control the release of stop members of that section of said decoder associated with said group of keys by a special perforation and a multiplying mechanism adapted to perform concurrent multi-digital computations under control of said decoder to obtain the product of the group factor set in said keyboard and each individual factor sensed from a series of cards.

4. In a calculating machine, a card sensing mechanism adapted to sense multiplication factors from punched cards, a keyboard, a set pin basket adapted to be controlled by said sensing mechanism, a decoder containing selectable stop members, said keyboard and set pin basket individually controlling said decoder, said keyboard having a group of keys through which the stop members representing a multi-digit group multiplication factor may be set up in said decoder, said pin basket having a set of pins through which stop members representing multi-digit factors sensed from a group of cards may be set up, a locking bar in said decoder for maintaining the setting of said stop members actuated by said keys and pins, and locking bar being actuated once each cycle to wipe out said set up, a repeat mechanism in said decoder associated with said group of keys adapted to disable the rocking of said bar to prevent the wipe out of said set up, said repeat mechanism being controlled by a special perforation to permit the wipe out of said set up, and a multiplying mechanism adapted to perform concurrent multi-digit computations under control of said decoder to obtain the product of the group factor set in the keyboard and the factors sensed from said group of cards.

5. In a calculating machine, a sensing mechanism, a multiplying mechanism controlled by said sensing mechanism to perform concurrent multi-digit computations, a drive for each mechanism, a uni-cycle clutch adapted to control the drive of said sensing mechanism, a crosshead having controls therein to drive said multiplying mechanism through one cycle and then stop, means actuated by said crosshead near the end of its travel to actuate said clutch to cause a cycle of said sensing mechanism, and a cam in said sensing mechanism for tripping said crosshead controls thereby releasing said crosshead to effect continuous successive operation of the machine.

6. In a calculating machine, a sensing mechanism, a multiplying mechanism controlled by said sensing mechanism to perform concurrent multi-digit computations, a drive for each mechanism, a uni-cycle clutch adapted to control the drive of said sensing mechanism, a crosshead having controls therein to drive said multiplying mechanism through one cycle and then stop, means actuated by said crosshead near the end of its travel to actuate said clutch, a cam in said sensing mechanism for tripping said crosshead controls thereby releasing said crosshead, a manually operated means in said multiplying mechanism for tripping the controls of said crosshead, and a control means for disabling said cam operated crosshead tripping means thus placing said crosshead under control of said manually operated means to effect manual control of both said sensing and multiplying mechanisms.

7. In a calculating machine, a sensing mechanism, a multiplying mechanism controlled by said sensing mechanism to perform concurrent multi-digit computations, a drive for each mechanism, a uni-cycle clutch adapted to control the drive of said sensing mechanism, a crosshead in said multiplying mechanism, a continuously rotating shaft, a latch on said crosshead adapted to connect said crosshead to said shaft to drive said multiplying mechanism through one cycle and then stop, a link actuated by said crosshead near the end of its travel to actuate said clutch to cause a cycle of said sensing mechanism, a cam associated with said sensing mechanism, a second link actuated by said cam for releasing said latch to make said crosshead effective and manual means for disabling either of said links to permit independent operation of said sensing and multiplying mechanisms.

ELMER H. DREHER.